US006920388B2

(12) United States Patent
 Yasui

(10) Patent No.: US 6,920,388 B2
(45) Date of Patent: Jul. 19, 2005

(54) DEVICE, METHOD, AND PROGRAM RECORDING MEDIUM FOR CONTROL OF AIR-FUEL RATIO OF INTERNAL COMBUSTION ENGINE

(75) Inventor: Yuji Yasui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/481,244

(22) PCT Filed: Jun. 19, 2002

(86) PCT No.: PCT/JP02/06108

§ 371 (c)(1),
(2), (4) Date: Dec. 18, 2003

(87) PCT Pub. No.: WO02/103182

PCT Pub. Date: Dec. 27, 2002

(65) Prior Publication Data

US 2004/0193358 A1 Sep. 30, 2004

(30) Foreign Application Priority Data

Jun. 19, 2001 (JP) ........................ 2001-185555

(51) Int. Cl.[7] .............................. F02D 41/14
(52) U.S. Cl. .................. 701/109; 60/276; 73/118.1
(58) Field of Search ................ 701/109, 108, 701/115, 103; 60/274, 277, 276, 278, 285; 73/118.1

(56) References Cited

U.S. PATENT DOCUMENTS 5,948,974 A * 9/1999 Mitsutani .................... 701/109

6,079,205 A * 6/2000 Yasui et al. .................. 60/285
6,698,186 B2 * 3/2004 Ueno et al. ................. 701/115

FOREIGN PATENT DOCUMENTS

| EP | 1 010 881 A | 6/2000 |
| EP | 1 013 915 A | 6/2000 |
| EP | 1 045 124 A | 10/2000 |
| JP | 11-324767 | 11/1999 |
| JP | 2001-115881 | 4/2001 |

* cited by examiner

*Primary Examiner*—Hieu T. Vo
(74) *Attorney, Agent, or Firm*—Squire, Sanders & Dempsey L.L.P.

(57) ABSTRACT

An apparatus for controlling the air-fuel ratio of an internal combustion engine to compensate for the effect of the dead times of an exhaust system including a catalytic converter, etc. and to increase the purifying capability of the catalytic converter. An exhaust-side control unit 7a sequentially variably sets a dead time of an exhaust system E depending on the flow rate of an exhaust gas supplied to a catalytic converter 3 and a dead time of an air-fuel ratio manipulating system comprising an internal combustion engine 1 and an engine-side control unit 7b, and sequentially estimates an output of an $O_2$ sensor 6 after a total set dead time which is the sum of the above set dead times. The exhaust-side control unit 7a sequentially generates a target air-fuel ratio KCMD to converge the output of the $O_2$ sensor 6 to a target value using the estimated value, and manipulates the air-fuel ratio of the internal combustion engine 1. Using the set dead time of the exhaust system E as a dead time of an exhaust system model which serves as a basis for estimating the output of the $O_2$ sensor 6, a parameter of the exhaust system model is sequentially identified.

18 Claims, 15 Drawing Sheets

DEVICE, METHOD, AND PROGRAM RECORDING MEDIUM FOR CONTROL OF AIR-FUEL RATIO OF INTERNAL COMBUSTION ENGINE

TECHNICAL FIELD

The present invention relates to an apparatus for and a method of controlling the air-fuel ratio of an internal combustion engine, and a recording medium storing a program for controlling the air-fuel ratio of an internal combustion engine.

BACKGROUND ART

There have already been proposed by the applicant of the present application techniques for controlling the air-fuel ratio of an air-fuel mixture to be combusted by an internal combustion engine for converging the output of an exhaust gas sensor, e.g., an $O_2$ sensor (oxygen concentration sensor), disposed downstream of a catalytic converter, to a predetermined target value (constant value) in order to achieve the appropriate purifying capability of the catalytic converter, such as a three-way catalyst or the like, disposed in the exhaust gas passage of the internal combustion engine (e.g., see Japanese laid-open patent publication No. 11-324767 or U.S. Pat. No. 6,188,953, and Japanese laid-open patent publication No. 2000-179385 or U.S. Pat. No. 6,230,486).

According to these techniques, an exhaust system ranging from a position upstream of the catalytic converter to the $O_2$ sensor disposed downstream of the catalytic converter is an object to be controlled which has an input quantity represented by the air-fuel ratio of the exhaust gas that enters the catalytic converter and an output quantity represented by the output of the $O_2$ sensor. A manipulated variable which determines the input quantity of the exhaust system, e.g., a target value for the input quantity of the exhaust system, is sequentially generated by a feedback control process, or specifically an adaptive sliding mode control process, for converging the output of the $O_2$ sensor to the target value, and the air-fuel ratio of the air-fuel mixture to be combusted by the internal combustion engine is controlled depending on the manipulated variable.

Generally, the exhaust system including the catalytic converter has a relatively long dead time. The dead time of a system for generating an actual input quantity of the exhaust system from the manipulated variable, i.e., an air-fuel ratio manipulating system comprising the internal combustion engine, etc., is generally smaller than the dead time of the exhaust system, but may become relatively long depending on the operating state of the internal combustion engine. These dead times tend to present an obstacle to efforts to smoothly controlling the output of the $O_2$ sensor at the target value.

According to the above techniques, data representing an estimated value of the output of the $O_2$ sensor after the dead time of the exhaust system, or after a total dead time which is the sum of the dead time of the exhaust system and the dead time of the air-fuel ratio manipulating system, is sequentially calculated according to a predetermined estimating algorithm that is constructed based on a predetermined model of the exhaust system, etc. In the feedback control process for generating the manipulated variable, the estimated value of the output of the $O_2$ sensor is used to generate the manipulated variable. That is, the manipulated variable is generated to converge the estimated value to the target value.

According to the above techniques, the value of a predetermined parameter of the model of the exhaust system which serves as a basis for the estimating algorithm is sequentially identified using sampled data of the output of an air-fuel ratio sensor disposed upstream of the catalytic converter and the output of the $O_2$ sensor. The estimating algorithm uses the identified value of the parameter of the model of the exhaust system to estimate the output of the $O_2$ sensor.

By performing the above control procedure, the above techniques can compensate for the effect of the dead times of the exhaust system and the air-fuel ratio manipulating system and also for the effect of behavioral changes of the exhaust system, and stably and smoothly perform the control process for converging the output of the $O_2$ sensor to the target value, or stated otherwise, the control process for achieving an appropriate purifying capability of the catalytic converter.

According to the above techniques, basically, the dead times of the exhaust system and the dead time of the air-fuel ratio manipulating system are regarded as of constant values, and preset fixed dead times are used as the values of those dead times. In the process of estimating the output of the $O_2$ sensor, the output of the $O_2$ sensor after the preset dead time of the exhaust system, and the output of the $O_2$ sensor after the total preset fixed dead time which is the sum of the preset dead time of the exhaust system and the preset dead time of the air-fuel ratio manipulating system are sequentially estimated.

The inventors of the present application have found that the actual dead times of the exhaust system and the air-fuel ratio manipulating system vary depending on the state, such as the rotational speed, of the internal combustion engine. Particularly, the range in which the dead time of the exhaust system is variable may become relatively large depending on the operating state of the internal combustion engine. Consequently, depending on the operating state of the internal combustion engine, the estimated value of the output of the $O_2$ sensor may have a large error with respect to the output of the $O_2$ sensor after the actual dead time. In the process of identifying the parameter of the model of the exhaust system, the identified value of the parameter may vary largely due to an error between the preset dead time of the model and the actual dead time thereof, i.e., a modeling error relative to a dead time element of the exhaust system, possibly resulting in an increased error of the estimated value of the output of the $O_2$ sensor which is determined using the identified value.

According to the above techniques, since a highly stable control process such as an adaptive sliding mode control process is used as the feedback control process for generating the manipulated variable, it basically is possible to avoid a situation where the stability of the control process for converging the output of the $O_2$ sensor to the target value would significantly be impaired.

In circumstances where the error of the estimated value of the output of the $O_2$ sensor is relatively large, however, when the manipulated variable is generated using the estimated value and the air-fuel ratio of the air-fuel mixture is manipulated depending on the manipulated variable, the output of the $O_2$ sensor tends to vary with respect to the target value, and the quick response of the control process converging the output of the $O_2$ sensor to the target value is liable to be lowered.

The applicant of the present application has proposed a technique for variably setting the preset dead time of the air-fuel manipulating system depending on the rotational speed, etc. of the internal combustion engine in view of the fact that the actual dead time of the air-fuel manipulating system changes depending on the rotational speed, etc. of the internal combustion engine, as disclosed in Japanese laid-open patent publication No. 11-324767 or U.S. Pat. No. 6,188,953. The proposed technique, however, does not take into account the fact that the dead time of the exhaust system, which affects the control of the output of the $O_2$ sensor more largely than the dead time of the air-fuel ratio manipulating system, changes depending on the operating state of the internal combustion engine, and has a predetermined fixed value as the preset dead time of the exhaust system. Therefore, the technique disclosed in the above publication also causes the above drawbacks.

The present invention has been made in view of the above background. It is an object of the present invention to provide an apparatus for and a method of controlling the air-fuel ratio of an internal combustion engine to compensate for the effect of the dead times of an exhaust system including a catalytic converter and an air-fuel ratio manipulating system including the internal combustion engine and hence to increase the purifying capability of the catalytic converter in a system for manipulating the air-fuel ratio to converge the output of an exhaust gas sensor such as an $O_2$ sensor or the like disposed downstream of the catalytic converter to a predetermined target value to achieve an appropriate purifying capability of the catalytic converter. It is also an object of the present invention to provide a recording medium storing a program for controlling an air-fuel ratio appropriately with a computer.

DISCLOSURE OF THE INVENTION

According to the findings of the inventors of the present application, the actual dead time of an exhaust system including a catalytic converter is closely related particularly to the flow rate of an exhaust gas supplied to the catalytic converter such that the actual dead time of the exhaust system is longer as the flow rate of the exhaust gas is smaller (see the solid-line curve c in FIG. 4). Furthermore, the dead time of an air-fuel ratio manipulating system including an internal combustion engine is also highly correlated to the flow rate of the exhaust gas such that the dead time of the air-fuel ratio manipulating system is longer as the flow rate of the exhaust gas is smaller (see the solid-line curve d in FIG. 4).

The present invention is based on the above phenomenon, and has a first aspect capable of compensating for the effect of the dead time of an exhaust system including a catalytic converter and a second aspect capable of compensating for the effect of the dead time of an air-fuel ratio manipulating system including an internal combustion engine, in addition to the dead time of the exhaust system.

According to the first aspect of the present invention, there is provided an apparatus for controlling the air-fuel ratio of an internal combustion engine having an exhaust gas sensor disposed downstream of a catalytic converter disposed in an exhaust passage of the internal combustion engine, for detecting the concentration of a particular component in an exhaust gas which has passed through the catalytic converter, estimating means for sequentially generating data representative of an estimated value of an output of said exhaust gas sensor after a set dead time which is set as a dead time of an exhaust system ranging from a position upstream of said catalytic converter to said exhaust gas sensor and including said catalytic converter, manipulated variable generating means for generating a manipulated variable to determine an air-fuel ratio of the exhaust gas which enters said catalytic converter to converge the output of said exhaust gas sensor to a predetermined target value, using the data generated by said estimating means, and air-fuel ratio manipulating means for manipulating the air-fuel ratio of an air-fuel mixture to be combusted by the internal combustion engine depending on the manipulated variable, said apparatus comprising flow rate data generating means for sequentially generating data representative of a flow rate of the exhaust gas supplied to the catalytic converter, and dead time setting means for variably setting a value of said set dead time depending on the value of the data generated by said flow rate data generating means, wherein there is established a predetermined model of said exhaust system for expressing a behavior of the exhaust system which is regarded as a system for generating the output of said exhaust gas sensor via a dead time element and a response delay element of said set dead time from the air-fuel ratio of the exhaust gas which enters said catalytic converter, further comprising identifying means for sequentially identifying the value of a predetermined parameter of said model using the value of the set dead time set by said dead time setting means, wherein said estimating means generates the data representative of the estimated value of the output of said exhaust gas sensor using the identified value of said parameter determined by said identifying means, according to a predetermined estimating algorithm which is constructed based on the model of said exhaust system, and wherein said identifying means determines the identified value of the parameter of the model of said exhaust system by limiting the identified value to a value within a predetermined range depending on the value of the data generated by said flow rate data generating means.

According to the first aspect of the present invention, there is provided a method of controlling the air-fuel ratio of an internal combustion engine, comprising the steps of sequentially generating data representative of an estimated value of an output of an exhaust gas sensor disposed downstream of a catalytic converter disposed in an exhaust passage of the internal combustion engine, for detecting the concentration of a particular component in an exhaust gas which has passed through the catalytic converter, after a set dead time which is set as a dead time of an exhaust system ranging from a position upstream of said catalytic converter to said exhaust gas sensor and including said catalytic converter, and generating a manipulated variable to determine an air-fuel ratio of the exhaust gas which enters said catalytic converter to converge the output of said exhaust gas sensor to a predetermined target value, using the data representative of the estimated value, wherein the air-fuel ratio of an air-fuel mixture to be combusted by the internal combustion engine is manipulated depending on the manipulated variable said method comprising the steps of sequentially generating data representative of a flow rate of the exhaust gas supplied to the catalytic converter, and variably setting a value of said set dead time depending on the value of the data representative of the flow rate of the exhaust gas, wherein there is established a predetermined model of said exhaust system for expressing a behavior of the exhaust system which is regarded as a system for generating the output of said exhaust gas sensor via a dead time element and a response delay element of said set dead time from the air-fuel ratio of the exhaust gas which enters said catalytic converter, further comprising the step of sequentially identifying the value of a predetermined parameter of said model using the value of said set dead time, wherein said step of generating data representative of the estimated value of the output of the exhaust gas sensor generates the data representative of the estimated value of the output of said exhaust gas sensor using the identified value of said parameter, according to a predetermined estimating algorithm which is constructed based on the model of said exhaust system, and wherein said step of identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

According to the first aspect of the present invention, there is provided a recording medium readable by a computer and storing an air-fuel ratio control program for enabling said computer to perform a process of sequentially generating data representative of an estimated value of an output of an exhaust gas sensor disposed downstream of a catalytic converter disposed in an exhaust passage of the internal combustion engine, for detecting the concentration of a particular component in an exhaust gas which has passed through the catalytic converter, after a set dead time which is set as a dead time of an exhaust system ranging from a position upstream of said catalytic converter to said exhaust gas sensor and including said catalytic converter, a process of generating a manipulated variable to determine an air-fuel ratio of the exhaust gas which enters said catalytic converter to converge the output of said exhaust gas sensor to a predetermined target value, using the data representative of the estimated value, and a process of manipulating the air-fuel ratio of an air-fuel mixture to be combusted by the internal combustion engine depending on the manipulated variable, said air-fuel ratio control program comprising a program of enabling the computer to perform a process of sequentially generate data representative of a flow rate of the exhaust gas supplied to the catalytic converter, and variably setting a value of said set dead time depending on the value of the data representative of the flow rate of the exhaust gas, wherein there is established a predetermined model of said exhaust system for expressing a behavior of the exhaust system which is regarded as a system for generating the output of said exhaust gas sensor via a dead time element and a response delay element of said set dead time from the air-fuel ratio of the exhaust gas which enters said catalytic converter, said air-fuel ratio control program includes a program for enabling the computer to perform a process of sequentially identifying the value of a predetermined parameter of said model using the value of the set dead time set by said dead time setting means, wherein the program of said air-fuel ratio control program for generating the data representative of the estimated value of the output of the exhaust gas sensor enables the computer to generate the data representative of the estimated value of the output of said exhaust gas sensor using the identified value of said parameter, according to a predetermined estimating algorithm which is constructed based on the model of said exhaust system, and wherein the program of said air-fuel ratio control program for identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

According to the first aspect of the present invention, the value of the set dead time of the exhaust system established depending on the value of the data representiative of the flow rate of the exhaust gas supplied to the catalytic converter. Therefore, the set dead time can be brought into conformity with the actual dead time of the exhaust system with accuracy. Basically, the set dead time is established such that it is greater as the flow rate of the exhaust gas supplied to the catalytic converter is smaller.

According to the first aspect of the present invention, the data representative of the estimated value of the output of the exhaust gas sensor after the set dead time is sequentially generated using the set dead time thus established. Therefore, the estimated value of the output of the exhaust gas sensor which is represented by the data is highly reliable as the estimated value of the output of the exhaust gas sensor after the actual dead time of the exhaust system, and the accuracy of the estimated value is increased. Using the highly reliable data as the data representative of the estimated value of the output of the exhaust gas sensor after the actual dead time of the exhaust system, the manipulated variable is generated, and the air-fuel ratio of the air-fuel mixture to be combusted by the internal combustion engine is manipulated depending on the manipulated variable. Therefore, the effect of the dead time can appropriately be compensated for depending on the length of the actual dead time of the exhaust system, and hence the accuracy and quick response of the control process for converging the output of the exhaust gas sensor to the target value is increased. As a result, the purifying capability of the catalytic converter is increased.

According to the second aspect of the present invention, there is provided an apparatus for controlling the air-fuel ratio of an internal combustion engine having an exhaust gas sensor disposed downstream of a catalytic converter disposed in an exhaust passage of the internal combustion engine, for detecting the concentration of a particular component in an exhaust gas which has passed through the catalytic converter, manipulated variable generating means for sequentially generating a manipulated variable to determine an air-fuel ratio of the exhaust gas which enters the catalytic converter to converge an output of the exhaust gas sensor to a predetermined target value, air-fuel ratio manipulating means for manipulating the air-fuel ratio of an air-fuel mixture to be combusted by the internal combustion engine depending on the manipulated variable, and estimating means for sequentially generating data representative of an estimated value of the output of the exhaust gas sensor after a total set dead time which is the sum of a first set dead time and a second set dead time, the first set dead time being set as a dead time of an exhaust system ranging from a position upstream of the catalytic converter to the exhaust gas sensor and including the catalytic converter, said second set dead time being set as a dead time of an air-fuel ratio manipulating system comprising said air-fuel ratio manipulating means and said internal combustion engine, wherein said manipulated variable generating means generates said manipulated variable using the data generated by said estimating means, said apparatus comprising flow rate data generating means for sequentially generating data representative of a flow rate of the exhaust gas supplied to the catalytic converter, and dead time setting means for variably setting values of said first set dead time and said second set dead time depending on the value of the data generated by said flow rate data generating means, wherein there is established a predetermined model of said exhaust system for expressing a behavior of the exhaust system which is regarded as a system for generating the output of said exhaust gas sensor via a dead time element and a response delay element of said first set dead time from the air-fuel ratio of the exhaust gas which enters said catalytic converter, further comprising identifying means for sequentially identifying the value of a predetermined parameter of said model using the value of the first set dead time set by said dead time setting means, wherein said estimating means generates the estimated value of the output of said exhaust gas sensor using the identified value of said parameter determined by said identifying means, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time, and wherein said identifying means determines the identified value of the parameter of the model of said exhaust system by limiting the identified value to a value within a predetermined range depending on the value of the data generated by said flow rate data generating means.

According to the second aspect of the present invention, there is provided a method of controlling the air-fuel ratio of an internal combustion engine, comprising the steps of sequentially generating a manipulated variable to determine an air-fuel ratio of the exhaust gas which enters said catalytic converter to converge an output of an exhaust gas sensor, which is disposed downstream of a catalytic converter disposed in an exhaust passage of the internal combustion engine, for detecting the concentration of a particular component in an exhaust gas which has passed through the catalytic converter, to a predetermined target value, manipulating the air-fuel ratio of an air-fuel mixture to be combusted by the internal combustion engine depending on the manipulated variable, and sequentially generating data representative of an estimated value of the output of said exhaust gas sensor after a total set dead time which is the sum of a first set dead time and a second set dead time, said first set dead time being set as a dead time of an exhaust system ranging from a position upstream of said catalytic converter to said exhaust gas sensor and including said catalytic converter, said second set dead time being set as a dead time of an air-fuel ratio manipulating system comprising said air-fuel ratio manipulating means and said internal combustion engine, wherein said step of generating said manipulated variable uses the data representative of the estimated value of the output of the exhaust gas sensor in order to generate said manipulated variable, said method comprising the steps of by sequentially generating data representative of a flow rate of the exhaust gas supplied to the catalytic converter, and variably setting values of said first set dead time and said second set dead time depending on the value of the data representative of the flow rate of the exhaust gas, wherein there is established a predetermined model of said exhaust system for expressing a behavior of the exhaust system which is regarded as a system for generating the output of said exhaust gas sensor via a dead time element and a response delay element of said first set dead time from the air-fuel ratio of the exhaust gas which enters said catalytic converter, further comprising the step of sequentially identifying the value of a predetermined parameter of said model using the value of said first set dead time, wherein said step of generating the data representative of the estimated value of the output of said exhaust gas sensor generates the estimated value of the output of said exhaust gas sensor using the identified value of said parameter of the model of said exhaust system, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time, and said step of identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

According to the second aspect of the present invention, there is provided a recording medium readable by a computer and storing an air-fuel ratio control program for enabling said computer to perform a process of sequentially generating a manipulated variable to determine an air-fuel ratio of the exhaust gas which enters the catalytic converter to converge an output of an exhaust gas sensor, which is disposed downstream of a catalytic converter disposed in an exhaust passage of the internal combustion engine, for detecting the concentration of a particular component in an exhaust gas which has passed through the catalytic converter, to a predetermined target value, a process of manipulating the air-fuel ratio of an air-fuel mixture to be combusted by the internal combustion engine depending on the manipulated variable, and a process of sequentially generating data representative of an estimated value of the output of the exhaust gas sensor after a total set dead time which is the sum of a first set dead time and a second set dead time, the first set dead time being set as a dead time of an exhaust system ranging from a position upstream of the catalytic converter to the exhaust gas sensor and including the catalytic converter, the second set dead time being set as a dead time of an air-fuel ratio manipulating system comprising the air-fuel ratio manipulating means and the internal combustion engine, wherein the program of the air-fuel ratio control program for generating the manipulated variable is constructed of an algorithm for generating the manipulated variable using the data representative of the estimated value of the output of the exhaust gas sensor, the air-fuel ratio control program comprising a program for enabling the computer to perform a process of sequentially generating data representative of a flow rate of the exhaust gas supplied to the catalytic converter, and variably setting values of said first set dead time and said second set dead time depending on the value of the data representative of the flow rate of the exhaust gas, wherein there is established a predetermined model of said exhaust system for expressing a behavior of the exhaust system which is regarded as a system for generating the output-of said exhaust gas sensor via a dead time element and a response delay element of said first set dead time from the air-fuel ratio of the exhaust gas which enters said catalytic converter, said air-fuel ratio control program includes a program for enabling the computer to perform a process of sequentially identifying the value of a predetermined parameter of said model using the value of said first set dead time, wherein the program of said air-fuel ratio control program for generating the data representative of the estimated value of the output of said exhaust gas sensor enables the computer to generate the estimated value of the output of said exhaust gas sensor using the identified value of said parameter of the model of said exhaust system, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time, and wherein the program of said air-fuel ratio control program for identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

According to the second aspect of the present invention, the first set dead time as the dead time of the exhaust system and the second set dead time as the dead time of the air-fuel ratio manipulating system are established depending on the value of the data representative of the flow rate of the exhaust gas supplied to the catalytic converter. Therefore, the first and second set dead times can be brought into conformity with the actual dead time of the exhaust system and the actual dead time of the air-fuel ratio manipulating system with accuracy. Basically, the first set dead time and the second set dead time are established such that they are greater as the flow rate of the exhaust gas supplied to the catalytic converter is smaller.

According to the second aspect of the present invention, the data representative of the estimated value of the output of the exhaust gas sensor after a total set dead time which is the sum of the first set dead time and the sound set dead time is generated using the first and second set dead times thus established. Therefore, the estimated value of the output of the exhaust gas sensor which is represented by the data is highly reliable as the estimated value of the output of the exhaust gas sensor after the actual total dead time which is the sum of the actual dead time of the exhaust system and the actual dead time of the air-fuel ratio manipulating system, and the accuracy of the estimated value is increased. According to the second aspect of the present invention, using the highly reliable data as the data representative of the estimated value of the output of the exhaust gas sensor after the actual total dead time, the manipulated variable is generated, and the air-fuel ratio of the air-fuel mixture to be combusted by the internal combustion engine is manipulated depending on the manipulated variable. Therefore, the effect of the dead times can appropriately be compensated for depending on the length of the actual dead times of the exhaust system and the air-fuel ratio manipulating system, and hence the accuracy and quick response of the control process for converging the output of the exhaust gas sensor to the target value is increased. As a result, the purifying capability of the catalytic converter is increased.

The first aspect of the present invention is suitable when the dead time of the air-fuel ratio manipulating system is sufficiently smaller than the dead time of the exhaust system, and the second aspect of the present invention is suitable when the dead time of the air-fuel ratio manipulating system is relatively long. According to the first and second aspects of the present invention, in order to generate the suitable manipulated variable for compensating for the effect of the dead time of the exhaust system or the effect of the total dead time which is the sum of the dead time of the exhaust system and the dead time of the air-fuel ratio manipulating system, it is preferable to generate the manipulated variable according to a feedback control process for converging the estimated value of the output of the exhaust gas sensor to the target value. The manipulated variable may be, for example, a target value for the air-fuel ratio (target air-fuel ratio) of the exhaust gas that enters the catalytic converter or a corrective quantity for the amount of fuel supplied to the internal combustion engine. If the manipulated variable is the target air-fuel ratio, then an air-fuel ratio sensor for detecting the air-fuel ratio of the exhaust gas that enters the catalytic converter is preferably disposed upstream of the catalytic converter, and the air-fuel ratio of an air-fuel mixture to be combusted by the internal combustion engine is preferably manipulated according to a feedback control process for converting the output of the air-fuel ratio sensor (detected value of the air-fuel ratio) to the target air-fuel ratio.

In the apparatus for controlling the air-fuel ratio according to the first aspect of the present invention, preferably, there is established a predetermined model of the exhaust system for expressing a behavior of the exhaust system which is regarded as a system for generating the output of the exhaust gas sensor via a dead time element and a response delay element of the set dead time from the air-fuel ratio of the exhaust gas which enters the catalytic converter, the apparatus further comprising identifying means for sequentially identifying the value of a predetermined parameter of the model using the value of the set dead time set by the dead time setting means, wherein the estimating means generates the data representative of the estimated value of the output of the exhaust gas sensor using the identified value of the parameter determined by the identifying means, according to a predetermined estimating algorithm which is constructed based on the model of the exhaust system.

In the method of controlling the air-fuel ratio according to the first aspect of the present invention, similarly, there is established a predetermined model of the exhaust system for expressing a behavior of the exhaust system which is regarded as a system for generating the output of the exhaust gas sensor via a dead time element and a response delay element of the set dead time from the air-fuel ratio of the exhaust gas which enters the catalytic converter, the method further comprising the step of sequentially identifying the value of a predetermined parameter of the model using the value of the set dead time, wherein the step of generating data representative of the estimated value of the output of the exhaust gas sensor generates the data representative of the estimated value of the output of the exhaust gas sensor using the identified value of the parameter, according to a predetermined estimating algorithm which is constructed based on the model of the exhaust system.

In the recording medium storing the air-fuel ratio control program according to the first aspect of the present invention, preferably, there is established a predetermined model of the exhaust system for expressing a behavior of the exhaust system which is regarded as a system for generating the output of the exhaust gas sensor via a dead time element and a response delay element of the set dead time from the air-fuel ratio of the exhaust gas which enters the catalytic converter, wherein the air-fuel ratio control program includes a program for enabling the computer to perform a process of sequentially identifying the value of a predetermined parameter of the model using the value of the set dead time, and the program of the air-fuel ratio control program for generating the data representative of the estimated value of the output of the exhaust gas sensor enables the computer to generate the data representative of the estimated value of the output of the exhaust gas sensor using the identified value of the parameter, according to an algorithm which is constructed based on the model of the exhaust system.

Specifically, an estimating algorithm capable of appropriately generating the data representative of the estimated value of the output of the exhaust gas sensor after the set dead time of the exhaust system can be constructed based on the model of the exhaust system established as described above. The estimating algorithm requires not only the value of the set dead time, but also the value of a predetermined parameter of the model of the exhaust system (a parameter to be set to a certain value for determining the behavior of the model, e.g., a coefficient parameter relative to the dead time element and the response delay element of the model of the exhaust system). The value of the parameter of the model that matches the actual behavior of the exhaust system generally changes depending on changes in the behavior and characteristics of the exhaust system. According to the present invention, therefore, the value of the parameter of the model is sequentially identified in order to compensate for the affect of changes in the behavior and characteristics of the exhaust system. In the identifying process, the set dead time established by the dead time setting means, i.e., the value of the set dead time that well matches the actual dead time of the exhaust system with accuracy, is used as the dead time of the dead time element of the model of the exhaust system, so that matching between the behavior of the model of the exhaust model and the behavior of the actual exhaust system is increased, thus increasing the reliability of the identified value of the parameter of the model. When the estimating means generates the data representative of the output of the exhaust gas sensor according to the estimating algorithm using the identified value of the parameter according to the estimating algorithm, it is possible to generate highly reliable data as the data representative of the estimated value of the output of the exhaust gas sensor after the actual dead time of the exhaust system, irrespective of changes in the behavior of the exhaust system. As a consequence, the accuracy and quick response of the control process for converging the output of the exhaust gas sensor to the target value is increased, and hence the purifying capability of the catalytic converter is increased.

In the apparatus for controlling the air-fuel ratio according to the second aspect of the present invention, preferably, there is established a predetermined model of the exhaust system for expressing a behavior of the exhaust system which is regarded as a system for generating the output of the exhaust gas sensor via a dead time element and a response delay element of the first set dead time from the air-fuel ratio of the exhaust gas which enters the catalytic converter, the apparatus further comprising identifying means for sequentially identifying the value of a predetermined parameter of the model using the value of the first set dead time set by the dead time setting means, wherein the estimating means generates the estimated value of the output of the exhaust gas sensor using the identified value of the parameter determined by the identifying means, according to a predetermined estimating algorithm which is constructed based on the model of the exhaust system and a predetermined model of the air-fuel ratio manipulating means for expressing a behavior of the air-fuel ratio manipulating means which is regarded as a system for generating the air-fuel ratio detected by the air-fuel ratio sensor from the manipulated variable via a dead time element of the second set dead time.

In the method of controlling the air-fuel ratio according to the second aspect of the present invention, similarly, there is established a predetermined model of the exhaust system for expressing a behavior of the exhaust system which is regarded as a system for generating the output of the exhaust gas sensor via a dead time element and a response delay element of the first set dead time from the air-fuel ratio of the exhaust gas which enters the catalytic converter, the method further comprising the step of sequentially identifying the value of a predetermined parameter of the model using the value of the first set dead time set by the dead time setting means, wherein the step of generating the data representative of the estimated value of the output of the exhaust gas sensor generates the estimated value of the output of the exhaust gas sensor using the identified value of the parameter of the model of the exhaust system, according to a predetermined estimating algorithm which is constructed based on the model of the exhaust system and a predetermined model of the air-fuel ratio manipulating means for expressing a behavior of the air-fuel ratio manipulating means which is regarded as a system for generating the air-fuel ratio detected by the air-fuel ratio sensor from the manipulated variable via a dead time element of the second set dead time.

In the recording medium storing the air-fuel ratio control program according to the second aspect of the present invention, preferably, there is established a predetermined model of the exhaust system for expressing a behavior of the exhaust system which is regarded as a system for generating the output of the exhaust gas sensor via a dead time element and a response delay element of the first set dead time from the air-fuel ratio of the exhaust gas which enters the catalytic converter, wherein the air-fuel ratio control program includes a program for enabling the computer to perform a process of sequentially identifying the value of a predetermined parameter of the model using the value of the first set dead time set by the dead time setting means, wherein the program of the air-fuel ratio control program for generating the data representative of the estimated value of the output of the exhaust gas sensor enables the computer to generate the estimated value of the output of the exhaust gas sensor using the identified value of the parameter of the model of the exhaust system, according to an algorithm which is constructed based on the model of the exhaust system and a predetermined model of the air-fuel ratio manipulating means for expressing a behavior of the air-fuel ratio manipulating means which is regarded as a system for generating the air-fuel ratio detected by the air-fuel ratio sensor from the manipulated variable via a dead time element of the second set dead time.

According to the second aspect of the present invention, the estimating algorithm capable of appropriately generating the data representative of the estimated value of the output of the exhaust gas sensor after the total set dead time can be constructed based on the model of the exhaust system and the model of the air-fuel ratio manipulating means. As with the first aspect, the estimating algorithm requires not only the values of the first and second set dead times, but also the value of a predetermined parameter of the model of the exhaust system. According to the present invention, as with the first aspect, the value of the parameter is sequentially identified in order to compensate for the affect of changes in the behavior and characteristics of the exhaust system. In the identifying process, the first set dead time established by the dead time setting means (that well matches the actual dead time of the exhaust system with accuracy) is used as the dead time of the dead time element of the model of the exhaust system in order to determine the identified value of the model of the exhaust system. Therefore, matching between the behavior of the model of the exhaust model and the behavior of the actual exhaust system is increased, thus increasing the reliability of the identified value of the parameter of the model of the exhaust system. When the estimating means generates the data representative of the output of the exhaust gas sensor according to the estimating algorithm using the identified value of the parameter according to the estimating algorithm, it is possible to generate highly reliable data as the data representative of the estimated value of the output of the exhaust gas sensor after the actual total dead time, which is the sum of the actual dead time of the exhaust system and the actual dead time of the air-fuel ratio manipulating system, irrespective of changes in the behavior of the exhaust system. As a consequence, the accuracy and quick response of the control process for converging the output of the exhaust gas sensor to the target value is increased, and hence the purifying capability of the catalytic converter is increased.

In the estimating algorithm according to the first aspect of the present invention, more specifically, it is possible to appropriately generate the data representative of the estimated value of the output of the exhaust gas sensor, using the data (time-series data) of the air-fuel ratio of the exhaust gas that enters the catalytic converter (which may hereinafter be referred to as "upstream-of-catalyst air-fuel ratio"), the data of the output of the exhaust gas sensor, the value of the set dead time of the exhaust system, and the identified value of the parameter of the model of the exhaust system, for example. Likewise, in the estimating algorithm according to the second aspect of the present invention, it is possible to appropriately generate the data representative of the estimated value of the output of the exhaust gas sensor, using the data (time-series data) representative of the upstream-of-catalyst air-fuel ratio, the data of the output of the exhaust gas sensor, the values of the first and second set dead times, and the identified value of the parameter of the model of the exhaust system, for example. In either of the aspects, since the upstream-of-catalyst air-fuel ratio is determined by the manipulated variable, the data of the manipulated variable can be used as the data representative of the upstream-of-catalyst air-fuel ratio. For making the data representative of the upstream-of-catalyst air-fuel ratio more adequate, it is preferable to provide an air-fuel ratio sensor for detecting the upstream-of-catalyst air-fuel ratio upstream of the catalytic converter and use the data of an output of the air-fuel ratio sensor, or to use both the data of the output of the air-fuel ratio sensor and the data of the manipulated variable.

According to the first and second aspects of the present invention, more specifically, it is possible to identify the parameter of the model of the exhaust system according the algorithm of a sequential method of weighted least squares, using the data representative of the upstream-of-catalyst air-fuel ratio and the value of the set dead time of the model of the exhaust system (the first set dead time in the second aspect). As with the estimating algorithm, the data of the manipulated variable can be used as the data representative of the upstream-of-catalyst air-fuel ratio, but it is preferable to provide an air-fuel ratio sensor for detecting the upstream-of-catalyst air-fuel ratio upstream of the catalytic converter and use the data of an output of the air-fuel ratio sensor The model of the exhaust system according to the first and second aspects of the present invention should preferably be a model which expresses the data of the output of the exhaust gas sensor in each given control cycle with the data of the output of the exhaust gas sensor in a past control cycle prior to the control cycle and the data representative of the upstream-of-catalyst air-fuel ratio (the data of the output of the air-fuel ratio sensor, the data of the manipulated variable, or the like) in a control cycle prior to the set dead time of the exhaust system, for example. Stated otherwise, the model should preferably be an autoregressive model where the upstream-of-catalyst air-fuel ratio as an input quantity to the exhaust system has a dead time (the set dead time of the exhaust system), for example. The parameter of the model comprises a coefficient relative to the data (autoregressive term relative to an output quantity of the exhaust system) of the output of the exhaust gas sensor in the past control cycle, or a coefficient relative to the data (input quantity to the exhaust system) representative of the upstream-of-catalyst air-fuel ratio. The model of the air-fuel ratio manipulating system in the second aspect is expressed as a system where the upstream-of-catalyst air-fuel ratio in each given control cycle coincides with the air-fuel ratio that is determined by the manipulated variable prior to the second set dead time.

In the apparatus for controlling the air-fuel ratio according to the first and second aspects of the present invention to identify the parameter of the model of the exhaust model, the identifying means determines the identified value of the parameter of the model of the exhaust system by limiting the identified value to a value within a predetermined range depending on the value of the data generated by the flow rate data generating means.

In the method of controlling the air-fuel ratio according to the first and second aspects of the present invention, the step of identifying the parameter of the model of the exhaust system determines the identified value of the parameter of the model of the exhaust system by limiting the identified value to a value within a predetermined range depending on the value of the data generated by the flow rate data generating means.

In the recording medium storing the air-fuel ratio control program according to the first and second aspects of the present invention, preferably, the program of the air-fuel ratio control program for identifying the parameter of the model of the exhaust system determines the identified value of the parameter of the model of the exhaust system by limiting the identified value to a value within a predetermined range depending on the value of the data generated by the flow rate data generating means.

Specifically, the identified value of the parameter which is suitable for generating the manipulated variable capable of converging the output of the exhaust gas sensor smoothly to the target value in order to increase the accuracy of the data representative of the estimated value of the output of the exhaust gas sensor is generally affected by the actual dead time of the exhaust system. According to the first and second aspects of the present invention, the identified value is limited to a value within a predetermined range depending on the value of the data representative of the flow rate of the exhaust gas supplied to the catalytic converter. It is thus possible to determine the identified value suitable for generating the manipulated variable capable of converging the output of the exhaust gas sensor smoothly to the target value.

If there are a plurality of parameters to be identified of the model of the exhaust system, then the predetermined range within which to limit the identified values of those parameters may be a range for each of the identified values of those parameters or a range for a combination of the identified values of those parameters. For example, if the model of the exhaust system is an autoregressive model and its autoregressive terms include primary and secondary autoregressive terms (which correspond to the response delay element of the exhaust system), then it is preferable to limit a combination of the identified values of two parameters relative to the respective autoregressive terms within a predetermined range (specifically, a predetermined area on a coordinate plane having the values of the two parameters as representing two coordinate axes). The identified value of a parameter relative to the upstream-of-catalyst air-fuel ratio of the autoregressive model should preferably be limited to a value within a predetermined range (a range having upper and lower limit values).

In the apparatus for controlling the air-fuel ratio according to the first and second aspects of the present invention to identify the parameter of the model of the exhaust model, preferably, the identifying means comprises means for identifying the value of the parameter according to an algorithm for minimizing an error between the output of the exhaust gas sensor in the model of the exhaust system and an actual output of the exhaust gas sensor, e.g., the algorithm of a method of weighted least squares, and the apparatus further comprises means for variably setting the value of a weighted parameter of the algorithm depending on the value of the data generated by the flow rate data generating means.

In the method of controlling the air-fuel ratio according to the first and second aspects of the present invention, similarly, the step of identifying the parameter of the model of the exhaust system identifies the value of the parameter according to an algorithm for minimizing an error between the output of the exhaust gas sensor in the model of the exhaust system and an actual output of the exhaust gas sensor, and variably sets the value of a weighted parameter of the algorithm depending on the value of the data representative of the flow rate of the exhaust gas.

In the recording medium storing the air-fuel ratio control program according to the first and second aspects of the present invention, preferably, the program of the air-fuel ratio control program for identifying the parameter of the model of the exhaust system identifies the value of the parameter according to an algorithm for minimizing an error between the output of the exhaust gas sensor in the model of the exhaust system and an actual output of the exhaust gas sensor, and variably sets the value of a weighted parameter of the algorithm depending on the value of the data representing the flow rate of the exhaust gas.

Specifically, the algorithm for identifying the parameter of the model of the exhaust system may be any one of various specific algorithms including a method of least squares, a method of weighted least squares, a fixed gain method, a degressive gain method, etc. According to the findings of the inventors of the present application, as the actual dead time of the exhaust system is longer, the identified value of the parameter of the model of the exhaust system is more liable to vary. According to the findings of the inventors of the present application, furthermore, as the flow rate of the exhaust gas is lower, the actual response delay element of the exhaust system is longer, and the identified value of the parameter of the model of the exhaust system is more liable to suffer an error. The data representative of the estimated value of the output of the exhaust gas sensor is also more liable to suffer an error, tending to impair the quick response of the process for controlling the output of the exhaust gas sensor at the target value. According to the algorithm of the method of weighted least squares, it is possible to suppress variations of the identified value of the parameter of the model of the exhaust system and also to suppress an error of the identified value by adjusting the value of the weighted parameter.

According to the present invention, an algorithm such as a method of weighted least squares (an algorithm for minimizing an error between the output of the exhaust sensor in the model of the exhaust system and the actual output of the exhaust sensor) is used to identify the value of the parameter of the model of the exhaust system. The value of the weighted parameter is variably set depending on the value of the data representative of the flow rate of the exhaust gas supplied to the catalytic converter. It is thus possible to adjust the value of the weighted parameter in accordance with the actual dead time and response delay characteristics of the exhaust system. As a result, it is possible to suppress variations and errors of the identified value of the parameter of the model of the exhaust system and increase the accuracy of the data representative of the estimated value of the output of the exhaust gas sensor. Hence, the quick response and accuracy of the control process for converging the output of the exhaust gas sensor to the target value can be increased.

In the apparatus for controlling the air-fuel ratio according to the first and second aspects of the present invention to identify the parameter of the model of the exhaust model, preferably, the manipulated variable generating means generates the manipulated variable using the identified value, determined by the identifying means, of the parameter of the model of the exhaust system.

In the method of controlling the air-fuel ratio according to the first and second aspects of the present invention, similarly, the step of generating the manipulated variable uses the identified value of the parameter of the model of the exhaust system determined by the identifying means in order to generate the manipulated variable.

In the recording medium storing the air-fuel ratio control program according to the first and second aspects of the present invention, preferably, the program of the air-fuel ratio control program for generating the manipulated variable is constructed of an algorithm for using the identified value of the parameter of the model of the exhaust system in order to generate the manipulated variable.

With the above arrangement, the manipulated variable can be generated so as to reflect the actual behavior and characteristics of the model of the exhaust system. Consequently, it is possible to generate a manipulated variable that is more suitable for converging the output of the exhaust gas sensor to the target value. Thus, the quick response and accuracy of the control process for converging the output of the exhaust gas sensor to the target value can be increased, increasing the purifying capability of the catalytic converter. In particular, when the identified value of the parameter of the model of the exhaust system is limited within a predetermined range depending on the data representative of the flow rate of the exhaust gas supplied to the catalytic converter, or the value of the weighted parameter of the algorithm of the identifying process is established depending on the data representative of the flow rate of the exhaust gas, the adequacy of the identified value of the parameter of the model of the exhaust system is increased. Therefore, the above advantages are enhanced.

The feedback control process for generating the manipulated variable should preferably be an adaptive control process, or more specifically, a sliding mode control process. The sliding mode control process may be an ordinary sliding mode control process based on a control law relative to an equivalent control input and a reaching law, but should preferably be an adaptive sliding mode control process with an adaptive law (adaptive algorithm) added to those control laws.

BEST MODE FOR CARRYING OUT THE INVENTION

A first embodiment of the present invention will be described below with reference to FIGS. 1 through 17. The present embodiment is an embodiment relating to the second aspect of the present invention.

Figure 1:
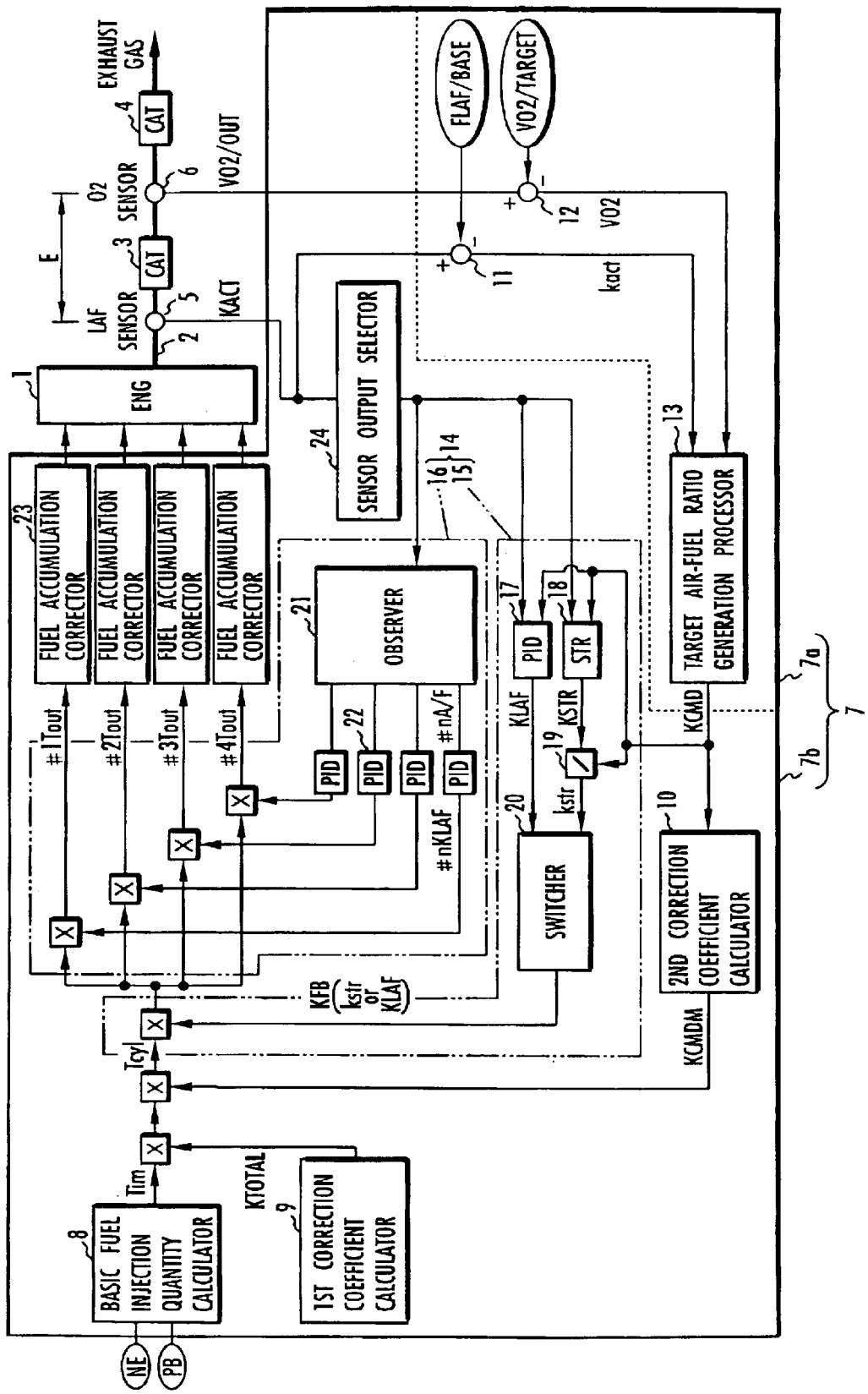
FIG. 1 is a block diagram of an overall system arrangement of an apparatus for controlling the air-fuel ratio of an internal combustion engine according to a first embodiment of the present invention.

FIG. 1 shows in block form an overall system arrangement of an apparatus for controlling the air-fuel ratio of an internal combustion engine according to the present embodiment. As shown in FIG. 1, an internal combustion engine 1 such as a four-cylinder internal combustion engine is mounted as a propulsion source on an automobile or a hybrid vehicle, for example. When a mixture of fuel and air is combusted in each cylinder of the internal combustion engine 1, an exhaust gas is generated and emitted from each cylinder into a common discharge pipe 2 (exhaust passage) positioned near the internal combustion engine 1, from which the exhaust gas is discharged into the atmosphere. Two three-way catalytic converters 3, 4, each comprising a three-way catalyst for purifying the exhaust gas, are mounted in the common exhaust pipe 2 at successively downstream locations thereon. The downstream catalytic converter 4 may be dispensed with.

The system according to the present embodiment serves to control the air-fuel ratio of the internal combustion engine 1 (or more accurately, the air-fuel ratio of the mixture of fuel and air to be combusted by the internal combustion engine 1) in order to achieve an optimum purifying capability of the catalytic converter 3. In order to perform the above control process, the system according to the present embodiment has an air-fuel ratio sensor 5 mounted on the exhaust pipe 2 upstream of the catalytic converter 3 (or more specifically at a position where exhaust gases from the cylinders of the internal combustion engine 1 are put together), an $O_2$ sensor (oxygen concentration sensor) 6 mounted as an exhaust gas sensor on the exhaust pipe 2 downstream of the catalytic converter 3 (upstream of the catalytic converter 4), and a control unit 7 for carrying out a control process (described later on) based on outputs (detected values) from the sensors 5, 6. The control unit 7 is supplied with outputs from various sensors (not shown) for detecting operating conditions of the internal combustion engine 1, including a engine speed sensor, an intake pressure sensor, a coolant temperature sensor, etc.

The $O_2$ sensor 6 comprises an ordinary $O_2$ sensor for generating an output VO2/OUT having a level depending on the oxygen concentration in the exhaust gas that has passed through the catalytic converter 3 (an output representing a detected value of the oxygen concentration of the exhaust gas). The oxygen concentration in the exhaust gas is commensurate with the air-fuel ratio of an air-fuel mixture which, when combusted, produces the exhaust gas. The output VO2/OUT from the $O_2$ sensor 6 will change with high sensitivity substantially linearly in proportion to the oxygen concentration in the exhaust gas, with the air-fuel ratio corresponding to the oxygen concentration in the exhaust gas being in a relatively narrow range Δ close to a stoichiometric air-fuel ratio, as indicated by the solid-line curve a in FIG. 2. At oxygen concentrations corresponding to air-fuel ratios outside of the range Δ, the output VO2/OUT from the $O_2$ sensor 6 is saturated and is of a substantially constant level.

The air-fuel ratio sensor 5 generates an out-put KACT representing a detected value of the air-fuel ratio of the exhaust gas that enters the catalytic converter 3 (more specifically, an air-fuel ratio which is recognized from the concentration of oxygen in the exhaust gas that enters the catalytic converter 3). The air-fuel ratio sensor 5 comprises a wide-range air-fuel ration sensor disclosed in Japanese laid-open patent publication No. 4-369471 or U.S. Pat. No. 5,391,282 by the applicant of the present application. As indicated by the solid-line curve b in FIG. 2, the air-fuel ratio sensor 5 generates an output KACT whose level is proportional to the concentration of oxygen in the exhaust gas in a wider range than the $O_2$ sensor 6. In the description which follows, the air-fuel ratio sensor 5 will be referred to as "LAF sensor 5", and the air-fuel ratio of the exhaust gas that enters the catalytic converter 3 as "upstream-of-catalyst air-fuel ratio".

The control unit 7 comprises a microcomputer including a CPU, a RAM, and a ROM (not shown), and has an exhaust-side control unit 7a for performing, in predetermined control cycles, a process of sequentially generating a target air-fuel ratio KCMD for the upstream-of-catalyst air-fuel ratio (which is also a target value for the output KACT of the LAF sensor 5) as a manipulated variable for determining the upstream-of-catalyst air-fuel ratio, and an engine-side control unit 7b for sequentially carryout out, in predetermined control cycles, a process of manipulating the upstream-of-catalyst air-fuel ratio by adjusting an amount of fuel supplied to the internal combustion engine 1 depending on the target air-fuel ratio KCMD. These control units 7a, 7b correspond respectively to a manipulated variable generating means and an air-fuel ratio manipulating means according to the present invention. The control unit 7 has a program stored in advance in the ROM for enabling the CPU to perform the control processes of the exhaust-side control unit 7a and the engine-side control unit 7b as described later on. The control unit 7 has the ROM as a recording medium according to the present invention.

In the present embodiments, the control cycles in which the control units 7a, 7b perform their respective processing sequences are different from each other. Specifically, the control cycles of the processing sequence of the exhaust-side control unit 7a have a predetermined fixed period (e.g., ranging from 30 to 100 ms) in view of the relatively long dead time present in an exhaust system E (described later on) including the catalytic converter 3, calculating loads, etc. The control cycles of the processing sequence of the engine-side control unit 7b have a period in synchronism with the crankshaft angle period (so-called TDC) of the internal combustion engine 1 because the process of adjusting the amount of fuel supplied to the internal combustion engine 1 needs to be in synchronism with combustion cycles of the internal combustion engine 1. The period of the control cycles of the exhaust-side control unit 7a is longer than the crankshaft angle period (TDC) of the internal combustion engine 1.

The processing sequences of the control units 7a, 7b will be described below. The engine-side control unit 7b has, as its functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity (an amount of supplied fuel) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1 (the proportion of an exhaust gas contained in an air-fuel mixture introduced into the internal combustion engine 10), an amount of purged fuel supplied to the internal combustion engine 1 when a canister (not shown) is purged, a coolant temperature, an intake temperature, etc. of the internal combustion engine 1.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD which is determined by the exhaust-side control unit 7a, as described later on.

The engine-side control unit 7b corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630 by the applicant of the present application, and will not be described below. The engine-side control unit 7b also has, in addition to the above functions, a feedback controller 14 for feedback-controlling the air-fuel ratio of the internal combustion engine 1 by adjusting a fuel injection quantity of the internal combustion engine 1 so as to converge the output KACT of the LAF sensor 5 (the detected value of the upstream-of-catalyst air-fuel ratio) to the target air-fuel ratio KCMD which is sequentially calculated by the exhaust-side control unit 7a (to be described in detail later).

The feedback controller 14 comprises a general feedback controller 15 for feedback-controlling a total air-fuel ratio of the cylinders of the internal combustion engine 1 and a local feedback controller 16 for feedback-controlling an air-fuel ratio of each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output KACT from the LAF sensor 5 to the target air-fuel ratio KCMD. The general feedback controller 15 comprises a PID controller 17 for generating a feedback manipulated variable KLAF as the feedback correction coefficient KFB depending on the difference between the output KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feedback correction coefficient KFB in view of changes in operating state of the internal combustion engine 1 or characteristic changes thereof from the output KACT from the LAF sensor 5 and the target air-fuel ratio KCMD.

In the present embodiment, the feedback manipulated variable KLAF generated by the PID controller 17 is of "1" and can be used directly as the feedback correction coefficient KFB when the output KACT (the detected value of the upstream-of-catalyst air-fuel ratio) from the LAF sensor 5 coincides with the target air-fuel ratio KCMD. The feedback manipulated variable KSTR generated by the adaptive controller 18 becomes the target air-fuel ratio KCMD when the output KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the upstream-of-catalyst air-fuel ratio. Based on the modeled system, a real air-fuel ratio #nA/F of each of the cylinders is estimated from the output KACT from the LAF sensor 5.

Details of the observer 21 are disclosed in Japanese laid-open patent publication No. 7-83094 or U.S. Pat. No. 5,531,208 by the applicant of the present application, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the engine-side control unit 7b. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 or U.S. Pat. No. 5,568,799 by the applicant of the present application, and will not be described in detail below. A sensor output selector 24 shown in FIG. 1 serves to select the output KACT from the LAF sensor 5, which is suitable for the estimation of a real air-fuel ratio #nA/F of each cylinder with the observer 21, depending on the operating state of the internal combustion engine 1. Details of the sensor output selector 24 are disclosed in detail in Japanese laid-open patent publication No. 7-259588 or U.S. Pat. No. 5,540,209 by the applicant of the present application, and will not be described in detail below.

The exhaust-side control unit 7a has a subtractor 11 for sequentially determining a difference kact (=KACT−FLAF/BASE) between the output KACT from the LAF sensor 5 and a predetermined air-fuel ratio reference value FLAF/BASE and a subtractor 12 for sequentially determining a difference VO2 (=VO2/OUT−VO2/TARGET) between the output VO2/OUT from the $O_2$ sensor 6 and a target value VO2/TARGET therefor.

Figure 2:
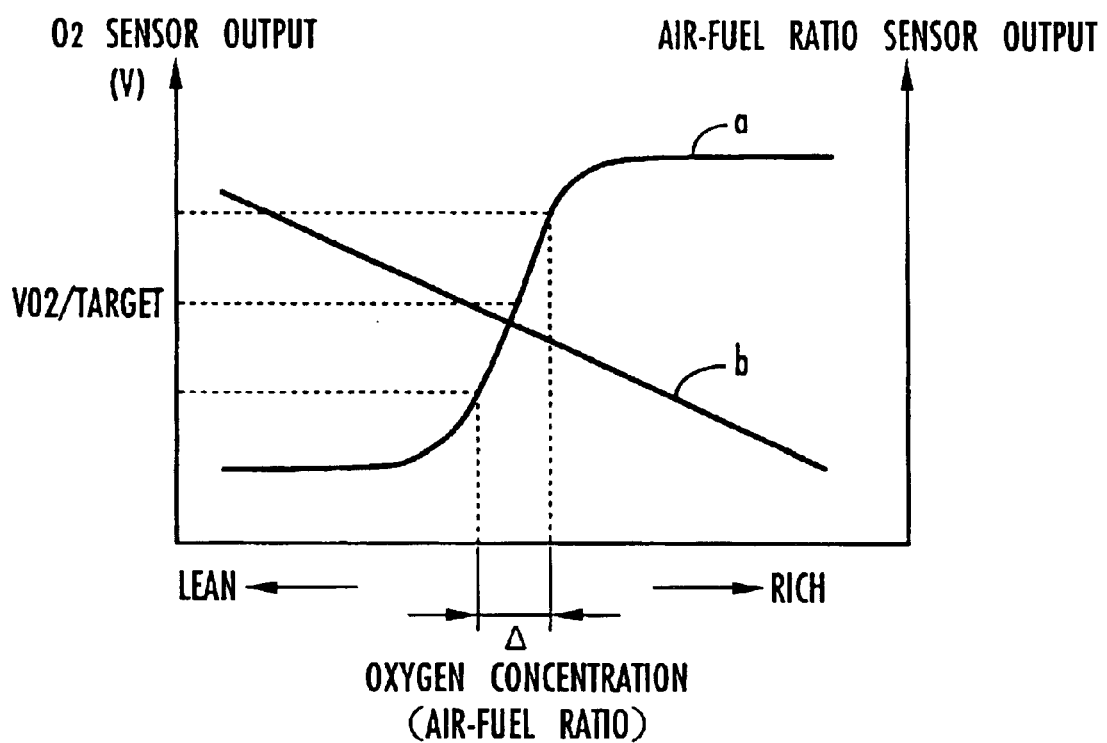
FIG. 2 is a diagram showing output characteristics of an $O_2$ sensor used in the apparatus shown in FIG. 1.

The target value VO2/TARGET for the output VO2/OUT from the $O_2$ sensor 6 is a predetermined value as an output value of the $O_2$ sensor 6 in order to achieve an optimum purifying capability of the catalytic converter 3 (specifically, purification ratios for NOx, HC, CO, etc. in the exhaust gas), and is an output value that can be generated by the $O_2$ sensor 6 in a situation where the air-fuel ratio of the exhaust gas is present in the range a close to a stoichiometric air-fuel ratio as shown in FIG. 2. In the present embodiment, the reference value FLAF/BASE with respect to the output KACT from the LAF sensor 5 is set to a "stoichiometric air-fuel ratio" (constant value).

In the description which follows, the differences kact, VO2 determined respectively by the subtractors 11, 12 are referred to as a differential output kact of the LAF sensor 5 and a differential output VO2 of the $O_2$ sensor 6, respectively.

The exhaust-side control unit 7a also has a target air-fuel ratio generation processor 13 for sequentially calculating the target air-fuel ratio KCMD (the target value for the upstream-of-catalyst air-fuel ratio) based on the data of the differential outputs kact, VO2 used respectively as the data of the output from the LAF sensor 5 and the output of the $O_2$ sensor 6.

The target air-fuel ratio generation processor 13 serves to control, as an object control system, an exhaust system (denoted by E in FIG. 1) including the catalytic converter 3, which ranges from the LAF sensor 5 to the $O_2$ sensor 6 along the exhaust pipe 2. The target air-fuel ratio generation processor 13 sequentially determines the target air-fuel ratio KCMD for the internal combustion engine 1 so as to converge (settle) the output VO2/OUT of the $O_2$ sensor 6 to the target value VO2/TARGET therefor according to a sliding mode control process (specifically an adaptive sliding mode control process) in view of a dead time present in the exhaust system E, a dead time present in an air-fuel ratio manipulating system comprising the internal combustion engine 1 and the engine-side control unit 7b, and behavioral changes of the exhaust system E.

In order to carry out the control process of the target air-fuel ratio generation processor 13, according to present embodiment, the exhaust system E is regarded as a system for generating the output VO2/OUT of the $O_2$ sensor 6 from the output KACT of the LAF sensor 5 (the upstream-of-catalyst air-fuel ratio detected by the LAF sensor 5) via a dead time element and a response delay element, and a model is constructed for expressing the behavior of the exhaust system E. The air-fuel ratio manipulating system comprising the internal combustion engine 1 and the engine-side control unit 7b is regarded as a system for generating the output KACT of the LAF sensor 5 from the target air-fuel ratio KCMD via a dead time element, and a model is constructed for expressing the behavior of the air-fuel ratio manipulating system.

With respect to the model of the exhaust system E (hereinafter referred to as "exhaust system model"), the behavior of the exhaust system E is expressed by an autoregressive model of a discrete time system according to the equation (1) shown below (specifically, an autoregressive model having a dead time in the differential output kact as the input quantity of the exhaust system E), using the differential output kact (=KACT−FLAF/BASE) from the LAF sensor 5 as the input quantity of the exhaust system E and the differential output VO2 (=VO2/OUT−VO2/TARGET) from the O₂ sensor 6 as the output quantity of the exhaust system E, instead of the output KACT of the LAF sensor 5 and the output VO2/OUT of the O₂ sensor 6.

$$VO2(k+1)=a1 \cdot VO2(k)+a2 \cdot VO2(k-1)+b1 \cdot kact(k-d1) \quad (1)$$

In the equation (1), "k" represents the ordinal number of a discrete-time control cycle of the exhaust-side control unit 7a, and "d1" the dead time of the exhaust system E (more specifically, the dead time required until the upstream-of-catalyst air-fuel ratio detected at each point of time by the LAF sensor 5 is reflected in the output VO2/OUT of the O₂ sensor 6) as represented by the number of control cycles. The actual dead time of the exhaust system E is closely related to the flow rate of the exhaust gas supplied to the catalytic converter 3, and is basically longer as the flow rate of the exhaust gas is smaller. This is because as the flow rate of the exhaust gas is smaller, the time required for the exhaust gas to pass through the catalytic converter 3 is longer. In the present embodiment, the flow rate of the exhaust gas supplied to the catalytic converter 3 is sequentially grasped, and the value of the dead time d1 in the exhaust system model according to the equation (1) is variably set (the set value of the dead time d1 will hereinafter be referred to as "set dead time d1").

The first and second terms of the right side of the equation (1) correspond to a response delay element of the exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients a1, a2 are relative to the differential output VO2 of the O₂ sensor 6 as an output quantity of the exhaust system E.

The third term of the right side of the equation (1) corresponds to a dead time element of the exhaust system E, and represents the differential output kact of the LAF sensor 5 as an input quantity of the object exhaust system E, including the dead time d1 of the exhaust system E. In the third term, "b1" represents a gain coefficient relative to the dead time element (an input quantity having the dead time d1).

These gain coefficients "a1", "a2", "b1" are parameters to be set to certain values for defining the behavior of the model of the exhaust system E, and are sequentially identified by an identifier which will be described later on according to the present embodiment.

The exhaust system model expressed by the equation (1) thus expresses the differential output VO2(k+1) of the O₂ sensor as the input quantity of the exhaust system E in each control cycle of the exhaust-side control unit 7a, with the differential outputs VO2(k), VO2(k−1) in past control cycles prior to that control cycle and the differential output kact (k−d1) of the LAF sensor 5 as the input quantity (upstream-of-catalyst air-fuel ratio) of the exhaust system E in a control cycle prior to the dead time d1 of the exhaust system E.

With respect to the model of the air-fuel ratio manipulating system comprising the internal combustion engine 1 and the engine-side control unit 7b (hereinafter referred to as "air-fuel ratio manipulating system"), the difference kcmd (=KCMD−FLAF/BASE, hereinafter referred to as "target differential air-fuel ratio kcmd") between the target air-fuel ratio KCMD and the air-fuel ratio reference value FLAF/BASE is regarded as an input quantity of the air-fuel ratio manipulating system, the differential output kact of the LAF sensor 5 as an output quantity of the air-fuel ratio manipulating system, and the behavior of the air-fuel ratio manipulating system model is expressed by a model according to the following equation (2):

$$kact(k)=kcmd(k-d2) \quad (2)$$

In the equation (2), "d2" represents the dead time of the air-fuel ratio manipulating system (more specifically, the dead time required until the target air-fuel ratio KCMD at each point of time is reflected in the output KACT of the LAF sensor 5) in terms of the number of control cycles of the exhaust-side control unit 7a. The actual dead time of the air-fuel ratio manipulating system is closely related to the flow rate of the exhaust gas supplied to the catalytic converter 3, as with the dead time of the exhaust system E, and is basically loner as the flow rate of the exhaust gas is smaller. This because as the flow rate of the exhaust gas is smaller, the rotational speed of the internal combustion engine 1 is lower (the crankshaft angle period is longer), and the period of the control cycles of the engine-side control unit 7b of the air-fuel ratio manipulating system is longer. In the present embodiment, therefore, the flow rate of the exhaust gas supplied to the catalytic converter 3 is sequentially recognized, and the value of the dead time t2 in the air-fuel ratio manipulating system according to the equation (2) is variably set (the set value of the dead time d2 will hereinafter be referred to as "set dead time d2").

The air-fuel ratio manipulating system model expressed by the equation (2) regards the air-fuel ratio manipulating system as a system wherein the differential output kact of the LAF sensor 5 as the output quantity (upstream-of-catalyst air-fuel ratio) of the air-fuel ratio manipulating system coincides with the target differential air-fuel ratio kcmd as the input quantity of the air-fuel ratio manipulating system at a time prior to the dead time t2 in the air-fuel ratio manipulating system, and expresses the behavior of the air-fuel ratio manipulating system.

The air-fuel ratio manipulating system actually includes a response delay element caused by the internal combustion engine 1, other than a dead time element. Since a response delay of the upstream-of-catalyst air-fuel ratio with respect to the target air-fuel ratio KCMD is basically compensated for by the feedback controller 14 (particularly the adaptive controller 18) of the engine-side control unit 7b, there will arise no problem if a response delay element caused by the internal combustion engine 1 is not taken into account in the air-fuel ratio manipulating system as viewed from the exhaust-side control unit 7a.

Figure 3:
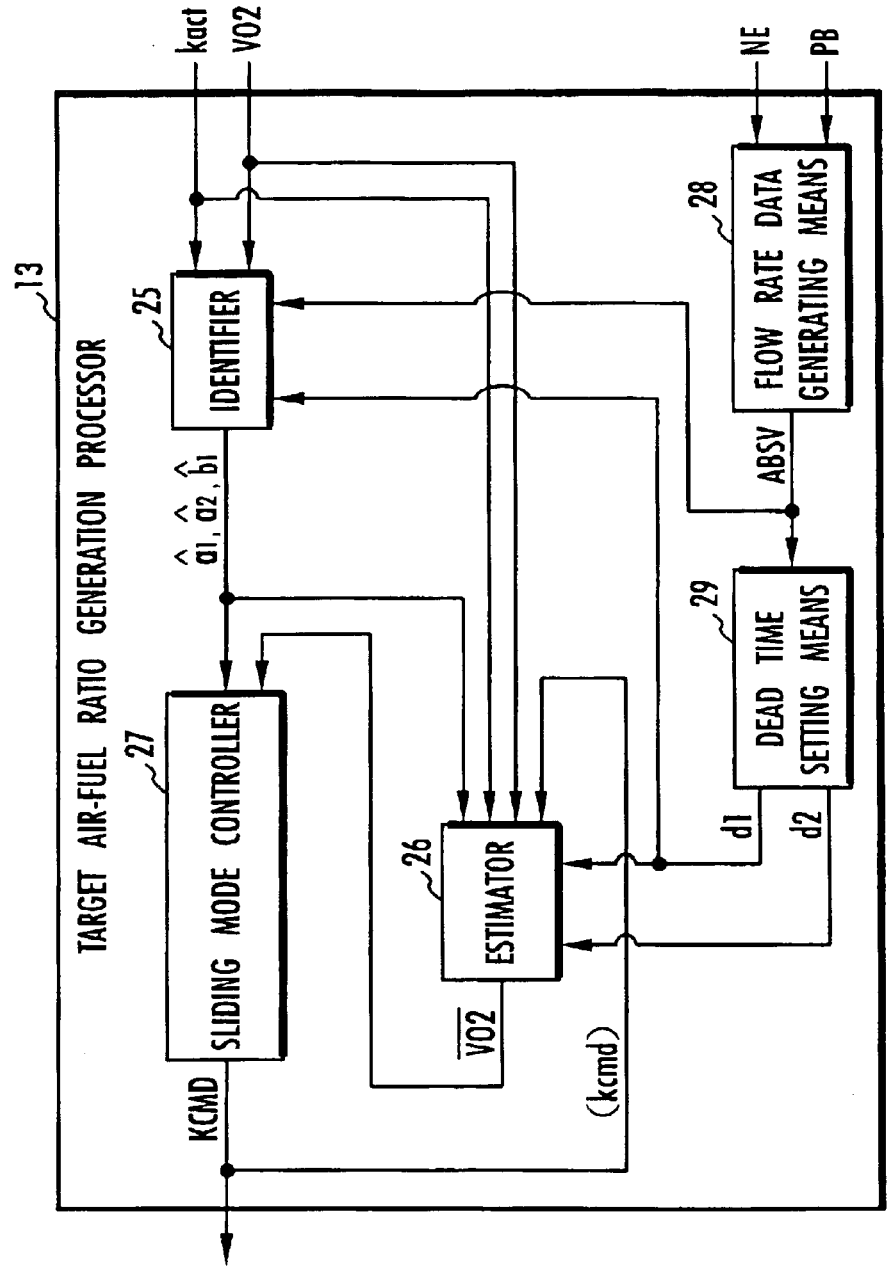
FIG. 3 is a block diagram showing a basic arrangement of a target air-fuel ratio generation processor of the apparatus shown in FIG. 1.

The target air-fuel ratio generation processor 13 according to the present invention carries out the process for sequentially calculating the target air-fuel ratio KCMD according to an algorithm that is constructed based on the exhaust system model expressed by the equation (1) and the air-fuel ratio manipulating system model expressed by the equation (2) in control cycles of the exhaust-side control unit 7a. In order to carry out the above process, the target air-fuel ratio generation processor 13 has its functions as shown in FIG. 3.

The target air-fuel ratio generation processor 13 comprises a flow rate data generating means 28 for sequentially calculating an estimated value ABSV of the flow rate of the exhaust gas supplied to the catalytic converter 3 (hereinafter referred to as "estimated exhaust gas volume ABSV") from the detected values of the rotational speed NE and the intake pressure PB of the internal combustion engine 1, and a dead time setting means 29 for sequentially setting the set dead times d1, d2 of the exhaust system model and the air-fuel ratio manipulating system model, respectively, depending on the estimated exhaust gas volume ABSV.

Since the flow rate of the exhaust gas supplied to the catalytic converter 3 is proportional to the product of the rotational speed NE and the intake pressure PB of the internal combustion engine 1, the dead time setting means 29 sequentially calculates the estimated exhaust gas volume ABSV from the detected values (present values) of the rotational speed NE and the intake pressure PB of the internal combustion engine 1 according to the following equation (3):

$$ABSV = \frac{NE}{1500} \cdot PB \cdot SVPRA \tag{3}$$

In the equation (3), SVPRA represents a predetermined constant depending on the displacement (cylinder volume) of the internal combustion engine 1. In the present embodiment, the flow rate of the exhaust gas when the rotational speed NE of the internal combustion engine 1 is 1500 rpm is used as a reference. Therefore, the rotational speed NE is divided by "1500" in the above equation (3).

Figure 4:
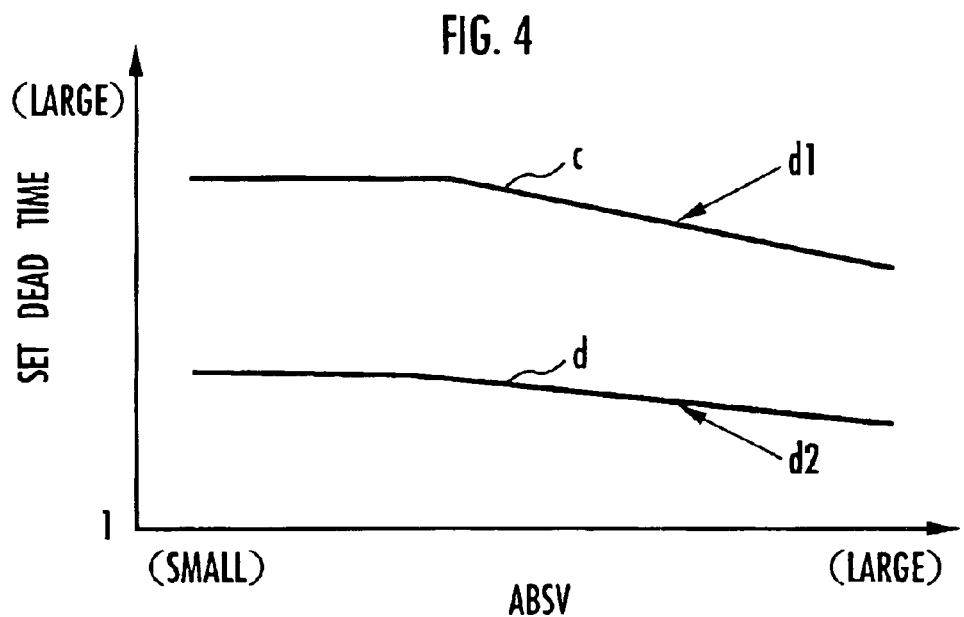
FIG. 4 is a diagram illustrative of a process performed by a dead time setting means of the target air-fuel ratio generation processor shown in FIG. 3.

The dead time setting means 29 sequentially determines the set dead time d1 as a value representing the actual dead time of the exhaust system E from the value of the estimated gas volume ABSV sequentially calculated by the flow rate data generating means 28 according to a data table that is preset as indicated by the solid-line curve c in FIG. 4, for example. Similarly, the dead time setting means 29 sequentially determines the set dead time d2 as a value representing the actual dead time of the air-fuel ratio manipulating system from the value of the estimated gas volume ABSV according to a data table that is preset as indicated by the solid-line curve d in FIG. 4.

The above data tables are established based on experimentation or simulation. Since the actual dead time of the exhaust system E is basically longer as the flow rate of the exhaust gas supplied to the catalytic converter 3 is smaller, as described above, the set dead time d1 represented by the solid-line curve c in FIG. 4 varies according to such a tendency with respect to the estimated gas volume ABSV. Likewise, since the actual dead time of the air-fuel ratio manipulating system is basically longer as the flow rate of the exhaust gas supplied to the catalytic converter 3 is smaller, the set dead time d2 represented by the solid-line curve d in FIG. 4 varies according to such a tendency with respect to the estimated gas volume ABSV. Moreover, inasmuch as the degree of changes of the actual dead time of the air-fuel ratio manipulating system with respect to the flow rate of the exhaust gas is smaller than the degree of changes of the actual dead time of the exhaust system E, the degree of changes of the set dead time d2 with respect to the estimated gas volume ABSV is smaller than the degree of changes of the set dead time d1 in the data table shown in FIG. 4.

In the data table shown in FIG. 4, the set dead times d1, d2 continuously change with respect to the estimated gas volume ABSV. Since the set dead times d1, d2 in the exhaust system model and the air-fuel ratio manipulating system model are expressed in terms of the number of control cycles of the exhaust-side control unit 7a, the set dead times d1, d2 need to be of integral values. Therefore, the dead time setting means 29 actually determines, as set dead times d1, d2, values that are produced by rounding off the fractions of the values of the set dead times d1, d2 that are determined based on the data table shown in FIG. 4, for example.

In the present embodiment, the flow rate of the exhaust gas supplied to the catalytic converter 3 is estimated from the rotational speed NE and the intake pressure PB of the internal combustion engine 1. However, the flow rate of the exhaust gas may be directly determined using a flow sensor or the like.

The target air-fuel ratio generation processor 13 comprises an identifier (identifying means) 25 for sequentially identifying values of the gain coefficients a1, a2, b1 that are parameters for the exhaust system model, an estimator (estimating means) 26 for sequentially determining in each control cycle an estimated value VO2 bar of the differential output VO2 from the $O_2$ sensor 6 (hereinafter referred to as "estimated differential output VO2 bar") after the total set dead time d (=d1+d2) which is the sum of the set dead time d1 of the exhaust system E and the set dead time d2 of the air-fuel ratio manipulating system, and a sliding mode controller 27 for sequentially determining the target air-fuel ratio KCMD according to an adaptive sliding mode control process.

The algorithm of a processing operation to be carried out by the identifier 25, the estimator 26, and the sliding mode controller 27 is constructed based on the exhaust system model and the air-fuel ratio manipulating system model, as follows:

With respect to the identifier 25, the gain coefficients of the actual exhaust system E which correspond to the gain coefficients a1, a2, b1 of the exhaust system model generally change depending on the behavior of the exhaust system E and chronological characteristic changes of the exhaust system E. Therefore, in order to minimize a modeling error of the exhaust system model (the equation (1)) with respect to the actual exhaust system E for increasing the accuracy of the model, it is preferable to identify the gain coefficients a1, a2, b1 in real-time suitably depending on the actual behavior of the exhaust system E.

The identifier 25 serves to identify the gain coefficients a1, a2, b1 sequentially on a real-time basis for the purpose of minimizing a modeling error of the exhaust system model. The identifier 25 carries out its identifying process as follows:

In each control cycle of the exhaust-side control unit 7a, the identifier 25 determines an identified value VO2(k) hat of the differential output VO2 from the $O_2$ sensor 6 (hereinafter referred to as "identified differential output VO2(k) hat") on the exhaust system model, using the identified gain coefficients a1 hat, a2 hat, b1 hat of the presently established exhaust system model, i.e., identified gain coefficients a1(k−1) hat, a2(k−1) hat, b1(k−1) hat determined in a preceding control cycle, past data of the differential output kact from the LAF sensor 5 and the differential output VO2 from the $O_2$ sensor 6, and the latest value of the set dead time d1 of the exhaust system E that has been set by the dead time setting means 29, according to the following equation (4):

$$V\hat{O}2(k) = \hat{a}1(k-1) \cdot VO2(k-1) + \hat{a}2(k-1) \cdot VO2(k-2) + \hat{b}1(k-1) \cdot kact(k-d1-1) \tag{4}$$

The equation (4) corresponds to the equation (1) which is shifted into the past by one control cycle with the gain coefficients a1, a2, b1 being replaced with the respective identified gain coefficients a1(k−1) hat, a2(k−1) hat, b1(k−1) hat, and the latest value of the set dead time d1 used as the dead time d1 of the exhaust system E.

If vectors Θ, ζ defined by the following equations (5), (6) are introduced (the letter T in the equations (5), (6) represents a transposition), then the equation (4) is expressed by the equation (7):

$$\Theta^T(k)=[\hat{a}1(k)\hat{a}2(k)\hat{b}1(k)] \quad (5)$$

$$\zeta^T(k)=[VO2(k-1)VO2(k-2)kact(k-d1-1)] \quad (6)$$

$$V\hat{O}2(k)=\Theta^T(k-1)\cdot\zeta(k) \quad (7)$$

The identifier 25 also determines a difference id/e(k) between the identified differential output VO2(k) hat from the $O_2$ sensor 6 which is determined by the equation (4) or (7) and the present differential output VO2(k) from the $O_2$ sensor 6, as representing a modeling error of the exhaust system model with respect to the actual exhaust system E (hereinafter the difference id/e will be referred to as "identified error id/e"), according to the following equation (8):

$$id/e(k)=VO2(k)-V\hat{O}2(k) \quad (8)$$

The identifier 25 further determines new identified gain coefficients a1(k) hat, a2(k) hat, b1(k) hat, stated otherwise, a new vector $\Theta(k)$ having these identified gain coefficients as elements (hereinafter the new vector $\Theta(k)$ will be referred to as "identified gain coefficient vector $\Theta$"), in order to minimize the identified error id/e, according to the equation (9) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k)=\Theta(k-1)+K\theta(k)\cdot id/e(k) \quad (9)$$

where $K\theta$ represents a cubic vector determined by the following equation (10) (a gain coefficient vector for determining a change depending on the identified error id/e of each of the identified gain coefficients a1 hat, a2 hat, b1 hat):

$$K\theta(k) = \frac{P(k-1)\cdot\xi(k)}{1+\xi^T(k)\cdot P(k-1)\cdot\xi(k)} \quad (10)$$

where P represents a cubic square matrix determined by a recursive formula expressed by the following equation (11):

$$P(k) = \frac{1}{\lambda_1(k)}\cdot\left[I - \frac{\lambda_2(k)\cdot P(k-1)\cdot\xi(k)\cdot\xi^T(k)}{\lambda_2(k)+\lambda_2(k)\cdot\xi^T(k)\cdot P(k-1)\cdot\xi(k)}\right]\cdot P(K-1) \quad (11)$$

where I represents a unit matrix.

In the equation (11), $\lambda_1$, $\lambda_2$ are established to satisfy the conditions $0<\lambda_1\leq 1$ and $0<\lambda_2<2$, and an initial value P(0) of P represents a diagonal matrix whose diagonal components are positive numbers.

Depending on how the values of $\lambda_1$, $\lambda_2$ in the equation (11) are established, any one of various specific algorithms including a fixed gain method, a degressive gain method, a method of weighted least squares, a method of least squares, a fixed tracing method, etc. may be employed. According to the present embodiment, the algorithm of a method of weighted least squares is employed, and the values of $\lambda_1$, $\lambda_2$ are that $0<\lambda_1<1$, $\lambda_2=1$.

"$\lambda_1$" represents a weighted parameter according to a method of weighted least squares. In the present embodiment, the value of the weighted parameter $\lambda_1$ is variably set depending on the estimated exhaust gas volume ABSV that is sequentially calculated by the flow rate data generating means 28 (as a result, depending on the set dead time d1).

Figure 5:
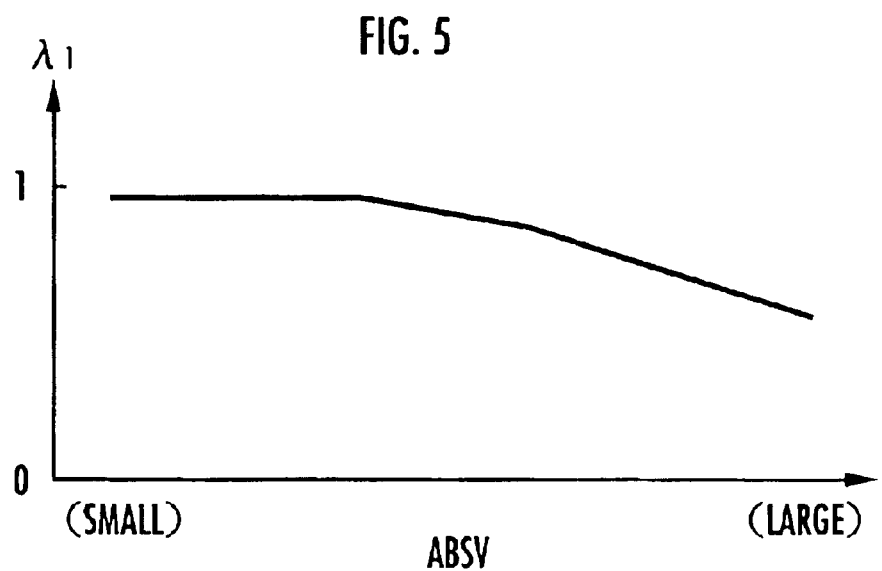
FIG. 5 is a diagram illustrative of a process performed by an identifier of the target air-fuel ratio generation processor shown in FIG. 3.

Specifically, in the present embodiment, the identifier 25 sets, in each control cycle of the exhaust-side control unit 7a, the value of the weighted parameter $\lambda_1$ from the latest value of the estimated exhaust gas volume ABSV determined by the flow rate data generating means 28, based on a predetermined data table shown in FIG. 5. In the data table shown in FIG. 5, the value of the weighted parameter $\lambda_1$ is greater, approaching "1", as the estimated exhaust gas volume ABSV is smaller. The identifier 25 uses the value of the weighted parameter $\lambda_1$ thus set depending on the estimated exhaust gas volume ABSV for updating the matrix P(k) according to the equation (11) in each control cycle.

Basically, the identifier 25 sequentially determines in each control cycle the identified gain coefficients a1 hat, a2 hat, b1 hat of the exhaust system model according to the above algorithm (calculating operation), i.e., the algorithm of a sequential method of weighted least squares, in order to minimize the identified error id/e.

The calculating operation described above is the basic algorithm that is carried out by the identifier 25. The identifier 25 performs additional processes such as a limiting process, on the identified gain coefficients a1 hat, a2 hat, b1 hat in order to determine them. Such operations of the identifier 25 will be described later on.

The estimator 26 sequentially determines in each control cycle the estimated differential output VO2 bar which is an estimated value of the differential output VO2 from the $O_2$ sensor 6 after the total set dead time d (=d1+d2) in order to compensate for the effect of the dead time d1 of the exhaust system E and the effect of the dead time d2 of the air-fuel ratio manipulating system for the calculation of the target air-fuel ratio KCMD with the sliding mode controller 27 as described in detail later on. The algorithm for the estimator 26 to determine the estimated differential output VO2 bar is constructed as follows:

If the equation (2) expressing the air-fuel ratio manipulating system model is applied to the equation (1) expressing the exhaust system model, then the equation (1) can be rewritten as the following equation (12):

$$VO2(k+1) = a1\cdot VO2(k) + a2\cdot VO2(k-1) + b1\cdot kcmd(k-d1-d2) \quad (12)$$
$$= a1\cdot VO2(k) + a2\cdot VO2(k-1) + b1\cdot kcmd(k-d)$$

The equation (12) expresses the behavior of a system which is a combination of the exhaust system E and the air-fuel manipulating system as a discrete time system, regarding such a system as a system for generating the differential output VO2 from the $O_2$ sensor 6 from the target differential air-fuel ratio kcmd via dead time elements of the exhaust system E and the air-fuel manipulating system and a response delay element of the exhaust system E.

By using the equation (12), the estimated differential output VO2(k+d) bar after the total set dead time d in each control cycle can be expressed using time-series data VO2(k), VO2(k−1) of present and past values of the differential output VO2 of the $O_2$ sensor 6 and time-series data kcmd(k−j) (j=1, 2, . . . , d) of the past values of the target differential air-fuel ratio kcmd (=KCMD−FLAF/BASE) which corresponds to the target air-fuel ratio KCMD determined by the sliding mode controller 27 (its specific process of determining the target air-fuel ratio KCMD will be described later on), according to the following equation (13):

$$\overline{VO2}(k+d) = \alpha 1 \cdot VO2(k) + \alpha 2 \cdot VO2(k-1) + \sum_{j=1}^{d} \beta j \cdot kcmd(k-j) \quad (13)$$

where
  $\alpha 1$=the first-row, first-column element of $A^d$,
  $\alpha 2$=the first-row, second-column element of $A^d$,
  $\beta j$=the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

In the equation (13), "$\alpha 1$", "$\alpha 2$" represent the first-row, first-column element and the first-row, second-column element, respectively, of the power $A^d$ (d: total dead time) of the matrix A defined as described above with respect to the equation (13), and "$\beta j$" (j=1, 2, . . . , d) represents the first-row elements of the product $A^{j-1} \cdot B$ of the power $A^{j-1}$ (j=1, 2, . . . , d) of the matrix A and the vector B defined as described above with respect to the equation (13).

Of the time-series data kcmd(k−j) (j=1, 2, . . . , d) of the past values of the target combined differential air-fuel ratio kcmd according to the equation (13), the time-series data kcmd(k−d2), kcmd(k−d2−1), . . . , kcmd(k−d) from the present prior to the dead time d2 of the air-fuel manipulating system can be replaced respectively with data kact(k), kact(k−1), . . . , kact(k−d+d2) obtained prior to the present time of the differential output kact of the LAF sensor 5 according the above equation (2). When the time-series data are thus replaced, the following equation (14) is obtained:

$$\overline{VO2}(k+d) = \alpha 1 \cdot VO2(k) + \alpha 2 \cdot VO2(k-1) + \quad (14)$$

$$\sum_{j=1}^{d2-1} \beta j \cdot kcmd(k-j) +$$

$$\sum_{i=0}^{d-d2} \beta i + d2 \cdot kact(k-i)$$

$$= \alpha 1 \cdot VO2(k) + \alpha 2 \cdot VO2(k-1) +$$

$$\sum_{j=1}^{d2-1} \beta j \cdot kcmd(k-j) +$$

$$\sum_{i=0}^{d1} \beta i + d2 \cdot kact(k-1)$$

The equation (14) is a basic formula for the estimator 26 to sequentially determine the estimated differential output VO2(k+d) bar. Stated otherwise, the estimator 26 determines, in each control cycle, the estimated differential output VO2(k+d) bar of the $O_2$ sensor 6 according to the equation (14), using the time-series data VO2(k), VO2(k−1) of the present and past values of the differential output VO2 of the $O_2$ sensor 6, the time-series data kcmd(k−j) (j=1, . . . , d2−1) of the past values of the target differential air-fuel ratio kcmd which represents the target air-fuel ratio KCMD determined in the past by the sliding mode controller 27, and the time-series data kact(k−i) (i=0, . . . , d1) of the present and past values of the differential output kact of the LAF sensor 5.

The values of the coefficients $\alpha 1$, $\alpha 2$, $\beta j$ (j=1, 2, . . . , d) required to calculate the estimated differential output VO2 (k+d) bar according to the equation (14) basically employ the identified gain coefficients a1(k) hat, a2(k) hat, b1(k) hat which are the latest identified values of the gain coefficients a1, a2, b1 (which are elements of the vectors A, B defined with respect to the equation (13)). The values of the dead times d1, d2 required in the equation (14) comprise the latest values of the set dead times d1, d2 that are set by the dead time setting means 29 as described above.

In the present embodiment, the set dead times d1, d2 used in the equation (14) change depending on the estimated exhaust gas volume ABSV, and the number of data of the target differential air-fuel ratio kcmd and data of the differential output kact of the LAF sensor 5 which are required to calculate the estimated differential output VO(k+d) bar according to the equation (14) also changes depending on the set dead times d1, d2. In this case, the set dead time d2 of the air-fuel ratio manipulating system may become "1" (in the present embodiment d1>d2≧1, see FIG. 4). If the dead time d2 of the air-fuel ratio manipulating system becomes "1", then all the time-series data kcmd(k−j) (j=1, 2, . . . , d) of the past values of the target differential air-fuel ratio kcmd in the equation (13) may be replaced with the time-series data kact(k), kact(k−1), . . . , kact(k−d+d2), respectively, prior to the present time, of the differential output kact of the LAF sensor 5. In this case, the equation (13) is rewritten into the following equation (15) which does not include the data of the target differential air-fuel ratio kcmd:

$$\overline{VO2}(k+d) = \alpha 1 \cdot VO2(k) + \alpha 2 \cdot VO2(k-1) + \sum_{j=1}^{d-1} \beta j + 1 \cdot kact(k-j) \quad (15)$$

Specifically, if the value of the set dead time d2 is "1", then the estimated differential output VO2(k+d) bar of the $O_2$ sensor 6 can be determined using the time-series data VO2(k), VO2(k−1) of the differential output VO2 of the $O_2$ sensor 6, the time-series data kact(k−j) (j=0, 1, . . . , d−1) of the present and past values of the differential output kact of the LAF sensor 5, the coefficients $\alpha 1$, $\alpha 2$, $\beta j$ (j=1, 2, . . . , d) determined by the identified gain coefficients a1 hat, a2 hat, b1 hat, and the total set dead time d (=d1+d2) which is the sum of the set dead times d1, d2.

In the present embodiment, therefore, if the set dead time d2 is d2>1, then the estimator 26 determines the estimated differential output VO2(k+d) bar according to the equation (14), and if the set dead time d2 is d2=1, then the estimator 26 determines the estimated differential output VO2(k+d) bar according to the equation (15).

The estimated differential output VO2(k+d) bar may be determined according to the equation (13) without using the data of the differential output kact of the LAF sensor 5. In this case, the estimated differential output VO2(k+d) bar of the $O_2$ sensor 6 is determined using the time-series data VO2(k), VO2(k−1) of the differential output VO2 of the $O_2$ sensor 6, the time-series data kcmd(k−j) (j=1, 2, . . . , d) of the past values of the target differential air-fuel ratio kcmd, the coefficients $\alpha 1$, $\alpha 2$, $\beta j$ (j=1, 2, . . . , d) determined by the identified gain coefficients a1 hat, a2 hat, b1 hat, and the total set dead time d (=d1+d2) which is the sum of the set dead times d1, d2. It is also possible to determine the estimated differential output VO2(k+d) bar according to an equation where only a portion of the time-series data of the target differential air-fuel ratio kcmd prior to the set dead time d2 in the equation (13) is replaced with the differential output kact of the LAF sensor 5. However, for increasing the reliability of the estimated differential output VO2(k+d) bar, it is preferable to determine the estimated differential output VO2(k+d) bar according to the equation (14) or (15) which uses, as much as possible, the data of the differential output kact of the LAF sensor 5 that reflects the actual behavior of the internal combustion engine 1, etc.

The algorithm described above is a basic algorithm for the estimator 26 to determine, in each control cycle, the estimated differential output VO2(k+d) bar that is an estimated value after the total dead time d of the differential output VO2 of the $O_2$ sensor 6.

The sliding mode controller 27 will be described in detail below.

The sliding mode controller 27 sequentially calculates an input quantity to be given to the exhaust system E (which is specifically a target value for the difference between the output KACT of the LAF sensor 5 (the detected value of the air-fuel ratio) and the air-fuel ratio reference value FLAF/BASE, which is equal to the target differential air-fuel ratio kcmd, the input quantity will be referred to as "SLD manipulating input Usl") in order to cause the output VO2/OUT of the $O_2$ sensor 6 to converge to the target value VO2/TARGET (to converge the differential output VO2 of the $O_2$ sensor 6 to "0") according to an adaptive sliding mode control process which incorporates an adaptive control law (adaptive algorithm) for minimizing the effect of a disturbance, in a normal sliding mode control process, and sequentially determines the target air-fuel ratio KCMD from the calculated SLD manipulating input Usl. An algorithm for carrying out the adaptive sliding mode control process is constructed as follows:

A switching function required for the adaptive sliding mode control process carried out by the sliding mode controller 27 and a hyperplane defined by the switching function (also referred to as a slip plane) will first be described below.

According to a basic concept of the sliding mode control process in the present embodiment, the differential output VO2(k) of the $O_2$ sensor 6 obtained in each control cycle and the differential output VO2(k−1) obtained in a preceding control cycle are used as a state quantity to be controlled, and a switching function σ for the sliding mode control process is defined according to the equation (16) shown below. Specifically, the switching function σ is defined by a linear function whose components are represented by the time-series data VO2(k), VO2(k−1) of the differential output VO2 of the $O_2$ sensor 6.

$$\sigma(k) = s1 \cdot VO2(k) + s2 \cdot VO2(k-1) = S \cdot X \quad (16)$$

where $$S = [s1 \ s2],$$
$$X = \begin{bmatrix} VO2(k) \\ VO2(k-1) \end{bmatrix}$$

The coefficients s1, s2 relative to the respective components VO2(k), VO2(k−1) of the switching function a are set in order to meet the condition of the following equation (17):

$$-1 < \frac{s2}{s1} < 1 \quad (17)$$

In the present embodiment, for the sake of brevity, the coefficient s1 is set to s1=1 (s2/s1=s2), and the value of the coefficient s2 is established to satisfy the condition: −1<s2<1.

Figure 6:
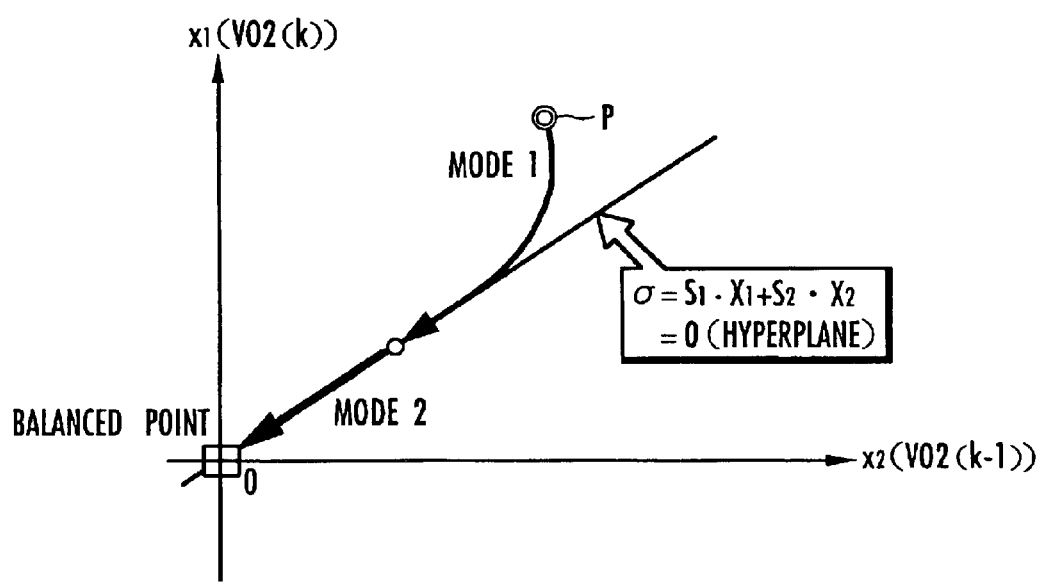
FIG. 6 is a diagram with respect to a sliding mode controller of the target air-fuel ratio generation processor shown in FIG. 3.

With the switching function σ thus defined, the hyperplane for the sliding mode control process is defined by the equation σ=0. Since the state quantity X is of the second degree, the hyperplane σ=0 is represented by a straight line as shown in FIG. 6. The hyperplane is called a switching line or a switching plane depending on the degree of a topological space.

In the present embodiment, the time-series data of the estimated differential output VO2 bar determined by the estimator 26 is used as a state quantity representative of the variable components of the switching function, as described later on.

The adaptive sliding mode control process used in the present embodiment serves to converge the state quantity X onto the hyperplane σ=0 according to a reaching law which is a control law for converging the state quantity X (=VO2 (k), VO2(k−1)) onto the hyperplane σ=0 (for converging the value of the switching function σ to "0") and an adaptive law (adaptive algorithm) which is a control law for compensating for the effect of a disturbance in converging the state quantity X onto the hyperplane σ=0 (mode 1 in FIG. 6). While holding the state quantity X onto the hyperplane σ=0 according to a so-called equivalent control input, the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the $O_2$ sensor 6 are equal to the target value VO2/TARGET (mode 2 in FIG. 6).

The SLD manipulating input Usl (=the target differential air-fuel ratio kcmd) to be generated by the sliding mode controller 27 for converging the state quantity X toward the balanced point on the hyperplane σ=0 is expressed as the sum of an equivalent control input Ueq to be applied to the exhaust system E according to the control law for converging the state quantity X onto the hyperplane σ=0, an input quantity Urch (hereinafter referred to as "reaching law input Urch") to be applied to the exhaust system E according to the reaching law, and an input quantity component Uadp (hereinafter referred to as "adaptive law input Uadp") to be applied to the exhaust system E according to the adaptive law, according to the following equation (18).

$$Usl = Ueq + Urch + Uadp \quad (18)$$

In the present embodiment, the equivalent control input Ueq, the reaching law input Urch, and the adaptive law input Uadp are determined on the basis of the above equation (12) where the exhaust system model and the air-fuel ratio manipulating system model are combined, as follows:

The equivalent control input Ueq which is an input quantity component to be applied to the exhaust system E for holding the state quantity X on the hyperplane σ=0 is the target differential air-fuel ratio kcmd which satisfies the condition: a(k+1)=σ(k)=0. Using the equations (12), (16), the equivalent control input Ueq which satisfies the above condition is given by the following equation (19):

$$Ueq(k) = -(S \cdot B)^{-1} \cdot \{S \cdot (A-1)\} \cdot X(k+d) \quad (19)$$
$$= \frac{-1}{s1b1} \cdot \{[s1 \cdot (a1-1) + s2] \cdot VO2(k+d) +$$
$$(s1 \cdot a2 - s2) \cdot VO2(k+d-1)\}$$

The equation (19) is a basic formula for determining the equivalent control input Ueq(k) in each control cycle.

According to the present embodiment, the reaching law input Urch is basically determined according to the following equation (20):

$$Urch(k) = -(S \cdot B)^{-1} \cdot F \cdot \sigma(k+d) \quad (20)$$

$$= \frac{-1}{s1b1} \cdot F \cdot \sigma(k+d)$$

Specifically, the reaching law input Urch is determined in proportion to the value $\sigma(k+d)$ of the switching function a after the total dead time d, in view of the dead times of the exhaust system E and the air-fuel ratio manipulating system.

The coefficient F in the equation (20) (which determines the gain of the reaching law) is established to satisfy the condition expressed by the following equation (21):

$$0 < F < 2 \quad (21)$$

(preferably, $0 < F < 1$)

The condition of the equation (21) is a condition for stably converging the value of the switching function a onto the hyperplane $\sigma=0$. The preferable condition in the equation (21) is a condition suitable for preventing the value of the switching function a from oscillating (so-called chattering) with respect to the hyperplane $\sigma=0$.

In the present embodiment, the adaptive law input Uadp is basically determined according to the following equation (22) ($\Delta T$ in the equation (22) represents the period of the control cycles of the exhaust-side control unit 7a):

$$Uadp(k) = -(S \cdot B)^{-1} \cdot G \cdot \sum_{i=0}^{k+d} (\sigma(i) \cdot \Delta T) \quad (22)$$

$$= \frac{-1}{s1b1} \cdot G \cdot \sum_{i=0}^{k+d} (\sigma(i) \cdot \Delta T)$$

The adaptive law input Uadp is determined in proportion to an integrated value (which corresponds to an integral of the values of the switching function $\sigma$) of the product of values of the switching function $\sigma$ and the period $\Delta T$ of the control cycles of the exhaust-side control unit 7a until after the total dead time d, in view of the dead times of the exhaust system E and the air-fuel ratio manipulating system.

The coefficient G (which determines the gain of the adaptive law) in the equation (22) is established to satisfy the condition of the following equation (23):

$$G = J \cdot \frac{2-F}{\Delta T} \quad (23)$$

$$(0 < J < 2)$$

The condition of the equation (23) is a condition for converging the value of the switching function $\sigma$ stably onto the hyperplane $\sigma=0$ regardless of disturbances, etc.

A specific process of deriving conditions for establishing the equations (17), (21), (23) is described in detail in Japanese patent application No. 11-93741 or U.S. Pat. No. 6,082,099 by the applicant of the present application, and will not be described in detail below.

In the present embodiment, the sliding mode controller 27 determines the sum (Ueq+Urch+Uadp) of the equivalent control input Ueq, the reaching law input Urch, and the adaptive law input Uadp determined according to the respective equations (19), (20), (22) as the SLD manipulating input Usl to be applied to the exhaust system E. However, the differential outputs VO2(K+d), VO2(k+d−1) of the $O_2$ sensor 6 and the value $\sigma(k+d)$ of the switching function $\sigma$, etc. used in the equations (19), (20), (22) cannot directly be obtained as they are values in the future.

According to the present embodiment, therefore, the sliding mode controller 27 actually uses the estimated differential outputs VO2(k+d) bar, VO2(k+d−1) bar determined by the estimator 26, instead of the differential outputs VO2(K+d), VO2(k+d−1) from the $O_2$ sensor 6 for determining the equivalent control input Ueq according to the equation (19), and calculates the equivalent control input Ueq in each control cycle according to the following equation (24):

$$Ueq(k) = \frac{-1}{s1b1}\{[s1 \cdot (a1-1)+s2] \cdot \overline{VO2}(k+d) + \quad (24)$$

$$(s1 \cdot a2 - s2) \cdot \overline{VO2}(k+d-1)\}$$

According to the present embodiment, furthermore, the sliding mode controller 27 actually uses time-series data of the estimated differential output VO2 bar sequentially determined by the estimator 26 as described above as a state quantity to be controlled, and defines a switching function a bar according to the following equation (25) (the switching function a bar corresponds to time-series data of the differential output VO2 in the equation (16) which is replaced with time-series data of the estimated differential output VO2 bar), in place of the switching function a established according to the equation (16):

$$\overline{\sigma}(k) = s1 \cdot \overline{VO2}(k) + s2 \cdot \overline{VO2}(k-1) \quad (25)$$

The sliding mode controller 27 calculates the reaching law input Urch in each control cycle according to the following equation (26), using the switching function a bar represented by the equation (25), rather than the value of the switching function $\sigma$ for determining the reaching law input Urch according to the equation (20):

$$Urch(k) = \frac{-1}{s1 \cdot b1} \cdot F \cdot \overline{\sigma}(k+d) \quad (26)$$

Similarly, the sliding mode controller 27 calculates the adaptive law input Uadp in each control cycle according to the following equation (27), using the value of the switching function a bar represented by the equation (25), rather than the value of the switching function $\sigma$ for determining the adaptive law input Uadp according to the equation (22):

$$Uadp(k) = \frac{-1}{s1 \cdot b1} \cdot G \cdot \sum_{i=0}^{k+d} (\overline{\sigma}(i) \cdot \Delta T) \quad (27)$$

The latest identified gain coefficients a1(k) hat, a2(k) hat, b1(k) hat which have been determined by the identifier 25 are basically used as the gain coefficients a1, a1, b1 that are required to calculate the equivalent control input Ueq, the reaching law input Urch, and the adaptive law input Uadp according to the equations (24), (26), (27). The values of the switching function a bar in each control cycle which are required to calculate the reaching law input Urch and the adaptive law input Uadp are represented by the latest estimated differential output VO2(k+1) bar determined by the estimator 26 and the estimated differential output VO2 (k+d−1) bar determined by the estimator 26 in the preceding control cycle.

The sliding mode controller 27 determines the sum of the equivalent control input Ueq, the reaching law input Urch, and the adaptive law input Uadp determined according to the equations (24), (26), (27), as the SLD manipulating input Usl to be applied to the exhaust system E (see the equation (18)). The conditions for establishing the coefficients s1, s2, F, G used in the equations (24), (26), (27) are as described above.

The above process is a basic algorithm for the sliding mode controller 27 to determine the SLD manipulating input Usl (=target differential air-fuel ratio kcmd) to be applied to the exhaust system E. According to the above algorithm, the SLD manipulating input Usl is determined to converge the estimated differential output VO2 bar from the $O_2$ sensor 6 to "0" (as a result, to converge the output VO2/OUT from the $O_2$ sensor 6 to the target value VO2/TARGET).

The sliding mode controller 27 eventually sequentially determines the target air-fuel ratio KCMD in each control cycle. The SLD manipulating input Usl determined as described above signifies a target value for the difference between the upstream-of-catalyst air-fuel ratio detected by the LAF sensor 5 and the air-fuel ratio reference value FLAF/BASE, i.e., the target differential air-fuel ratio kcmd. Consequently, the sliding mode controller 27 eventually determines the target air-fuel ratio KCMD by adding the reference value FLAF/BASE to the determined SLD manipulating input Usl in each control cycle according to the following equation (28):

$$KCMD(k) = Usl(k) + FLAF/BASE \quad (28)$$
$$= Ueq(k) + Urch(k) + Uadp(k) + FLAF/BASE$$

The above process is a basic algorithm for the sliding mode controller 27 to sequentially determine the target air-fuel ratio KCMD according to the present embodiment.

In the present embodiment, the stability of the adaptive sliding mode control process carried out by the sliding mode controller 27 is checked for limiting the value of the SLD manipulating input Usl. Details of such a checking process will be described later on.

The general feedback controller 15 of the engine-side control unit 7b, particularly, the adaptive controller 18, will further be described below.

In FIG. 1, the general feedback controller 15 effects a feedback control process to converge the output KACT from the LAF sensor 5 to the target air-fuel ratio KCMD as described above. If such a feedback control process were carried out under the known PID control only, it would be difficult to keep stable controllability against dynamic behavioral changes including changes in the operating state of the internal combustion engine 1, characteristic changes due to aging of the internal combustion engine 1, etc.

Figure 7:
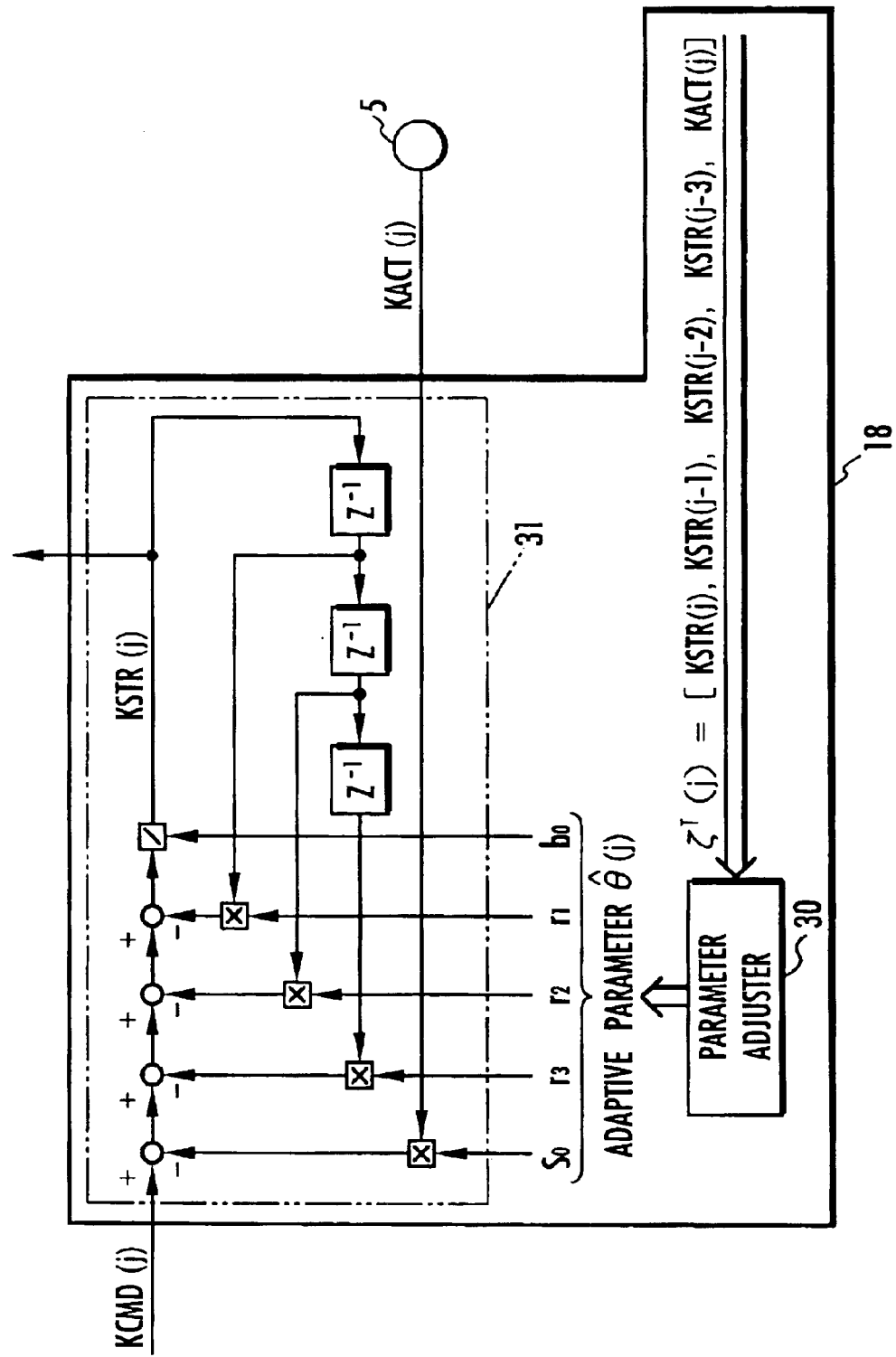
FIG. 7 is a block diagram showing a basic arrangement of an adaptive controller of the apparatus shown in FIG. 1.

The adaptive controller 18 is a recursive-type controller which makes it possible to carry out a feedback control process while compensating for dynamic behavioral changes of the internal combustion engine 1. As shown in FIG. 7, the adaptive controller 18 comprises a parameter adjuster 30 for establishing a plurality of adaptive parameters using the parameter adjusting law proposed by I. D. Landau, et al., and a manipulated variable calculator 31 for calculating the feedback manipulated variable KSTR using the established adaptive parameters.

The parameter adjuster 30 will be described below. According to the adjusting law proposed by I. D. Landau, et al., when polynomials of the denominator and the numerator of a transfer function $B(Z^{-1})/A(Z^{-1})$ of a discrete-system object to be controlled are generally expressed respectively by equations (29), (30), given below, an adaptive parameter $\theta$ hat (j) (j indicates the ordinal number of a control cycle of the engine-side control unit 7b) established by the parameter adjuster 30 is represented by a vector (transposed vector) according to the equation (31) given below. An input $\zeta(j)$ to the parameter adjuster 30 is expressed by the equation (32) given below. In the present embodiment, it is assumed that the internal combustion engine 1, which is an object to be controlled by the general feedback controller 15, is considered to be a plant of a first-order system having a dead time dp (the time of three combustion cycles of the internal combustion engine 1), and m=n=1, dp=3 in the equations (29)–(32), and five adaptive parameters s0, r1, r2, r3, b0 are established (see FIG. 7). In the upper and middle expressions of the equation (34), us, ys generally represent an input (manipulated variable) to the object to be controlled and an output (controlled variable) from the object to be controlled. In the present embodiment, the input is the feedback manipulated variable KSTR and the output from the object to be controlled (the internal combustion engine 1) is the output KACT (upstream-of-catalyst air-fuel ratio) from the LAF sensor 5, and the input $\zeta(j)$ to the parameter adjuster 30 is expressed by the lower expression of the equation (32) (see FIG. 7).

$$A(Z^{-1}) = 1 + a1Z^{-1} + \ldots + anZ^{-n} \quad (29)$$

$$B(Z^{-1}) = b0 + b1Z^{-1} + \ldots + bmZ^{-m} \quad (30)$$

$$\hat{\theta}^T(j) = [\hat{b}0(j), \hat{B}R(Z^{-1}, j), \hat{S}(Z^{-1}, j)] \quad (31)$$
$$= [b0(j), r1(j), \ldots, rm+dp-1(j), s0(j), \ldots, sn-1(j)]$$
$$= [b0(j), r1(j), r2(j), r3(j), s0(j)]$$

$$\zeta^T(j) = [us(j), \ldots, us(j-m-dp+1), ys(j), \ldots, ys(j-n+1)] \quad (32)$$
$$= [us(j), us(j-1), us(j-2), us(j-3), ys(j)]$$
$$= [KSTR(j), KSTR(j-1), KSTR(j-2), KSTR(j-3), KACT(j)]$$

The adaptive parameter $\theta$ hat expressed by the equation (31) is made up of a scalar quantity element b0 hat (j) for determining the gain of the adaptive controller 18, a control element BR hat $(Z^{-1},j)$ expressed using a manipulated variable, and a control element S $(Z^{-1},j)$ expressed using a controlled variable, which are expressed respectively by the following equations (33) through (35) (see the block of the manipulated variable calculator 31 shown in FIG. 7);

$$\hat{b}0^{-1}(j) = \frac{1}{b0} \quad (33)$$

$$\hat{B}R(Z^{-1}, j) = r1Z^{-1} + r2Z^{-2} + \ldots + rm+dp-1Z^{-(n+dp-1)} \quad (34)$$
$$= r1Z^{-1} + r2Z^{-2} + r3Z^{-3}$$

$$\hat{S}(Z^{-1}, j) = s0 + s1Z^{-1} + \ldots + sn-1Z^{-(n-1)} \quad (35)$$
$$= s0$$

The parameter adjuster 30 establishes coefficients of the scalar quantity element and the control elements, described above, and supplies them as the adaptive parameter $\theta$ hat expressed by the equation (31) to the manipulated variable calculator 31. The parameter adjuster 30 calculates the adaptive parameter $\theta$ hat so that the output KACT from the LAF sensor 5 will agree with the target air-fuel ratio KCMD, using time-series data of the feedback manipulated variable KSTR from the present to the past and the output KACT from the LAF sensor 5.

Specifically, the parameter adjuster 30 calculates the adaptive parameter $\theta$ hat according to the following equation (36):

$$\hat{\theta}(j) = \hat{\theta}(j-1) + \Gamma(j-1) \cdot \zeta(j-dp) \cdot e^*(j) \quad (36)$$

where $\Gamma(j)$ represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (37), (38):

$$\Gamma(j) = \frac{1}{\lambda 1(j)} \left[ \Gamma(j-1) - \frac{\lambda 2(j) \cdot \Gamma(j-1) \cdot \zeta(j-dp) \cdot \zeta^T(j-dp) \cdot \Gamma(j-1)}{\lambda 1(j) + \lambda 2(j) \cdot \zeta^T(j-dp) \cdot \Gamma(j-1) \cdot \zeta(j-dp)} \right] \quad (37)$$

where $0 < \lambda 1(j) \leq 1$, $0 \leq \lambda 2(j) < 2$, $\Gamma(0) > 0$.

$$e*(j) = \frac{D(Z^{-1}) \cdot KACT(j) - \hat{\theta}^T(j-1) \cdot \zeta(j-dp)}{1 + \zeta^T(j-dp) \cdot \Gamma(j-1) \cdot \zeta(j-dp)} \quad (38)$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed tracing algorithm, and the fixed gain algorithm are obtained depending on how λ1(j), λ2(j) in the equation (37) are selected. For a time-dependent plant such as a fuel injection process, an air-fuel ratio, or the like of the internal combustion engine 1, either one of the degressive gain algorithm, the variable gain algorithm, the fixed gain algorithm, and the fixed tracing algorithm is suitable.

Using the adaptive parameter θ hat (s0, r1, r2, r3, b0) established by the parameter adjuster 30 and the target air-fuel ratio KCMD determined by the target air-fuel ratio generation processor 13, the manipulated variable calculator 31 determines the feedback manipulated variable KSTR according to a recursive formula expressed by the following equation (39):

$$KSTR = \frac{KCMD(j) - S0 \cdot KACT(j) - r1 \cdot KSTR(j-1) - r2 \cdot KSTR(j-2) - r3 \cdot KSTR(j-3)}{b0} \quad (39)$$

The manipulated variable calculator 31 shown in FIG. 7 represents a block diagram of the calculations according to the equation (39).

The feedback manipulated variable KSTR determined according to the equation (39) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 15, calculates a proportional term (P term), an integral term (I term), and a derivative term (D term) from the difference between the output KACT of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT of the LAF sensor 5 quickly to the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 or U.S. Pat. No. 5,558,075 by the applicant of the present application, and will not be described in detail below.

Operation of the apparatus according to the present embodiment will be described below.

First, a process carried out by the engine-side control unit 7b will be described below with reference to FIG. 8. The engine-side control unit 7b calculates an output fuel injection quantity #nTout for each of the cylinders in synchronism with a crankshaft angle period (TDC) of the internal combustion engine 1 as follows:

The engine-side control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine-side control unit 7b decides whether the operation mode of the internal combustion engine 1 is an operation mode (hereinafter referred to as "normal operation mode") in which the fuel injection quantity is adjusted using the target air-fuel ratio KCMD generated by the target air-fuel ratio generation processor 13, and sets a value of a flag f/prism/on in STEPd. When the value of the flag f/prism/on is "1", it means that the operation mode of the internal combustion engine 1 is the normal operation mode, and when the value of the flag f/prism/on is "0", it means that the operation mode of the internal combustion engine 1 is not the normal operation mode.

Figure 9:
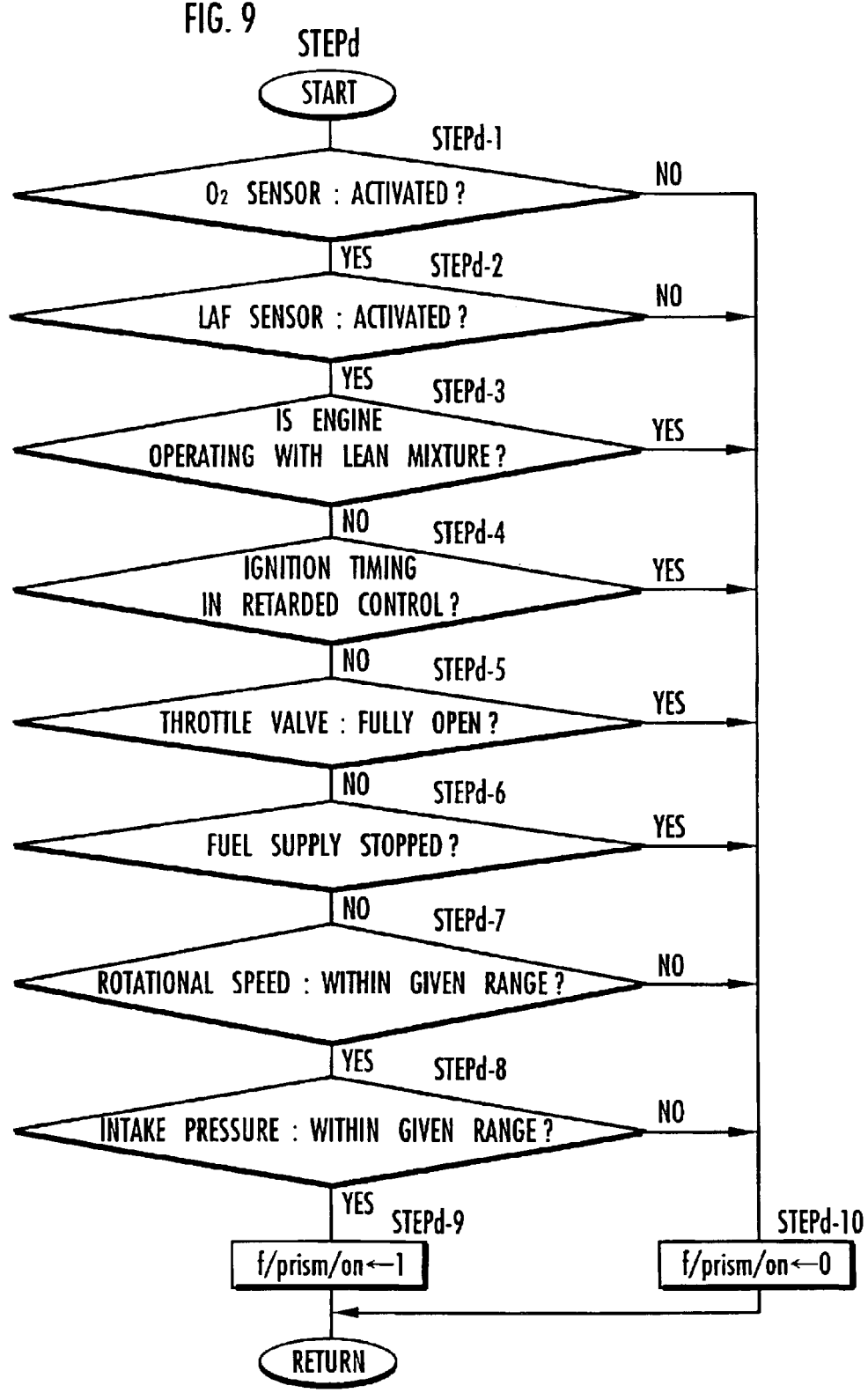
FIG. 9 is a flowchart of a subroutine of the flowchart shown in FIG. 8.

The deciding subroutine of STEPd is shown in detail in FIG. 9. As shown in FIG. 9, the engine-side control unit 7b decides whether the $O_2$ sensor 6 and the LAF sensor 5 are activated or not respectively in STEPd-1, STEPd-2. If neither one of the $O_2$ sensor 6 and the LAF sensor 5 is activated, since detected data from the $O_2$ sensor 6 and the LAF sensor 5 for use by the target air-fuel ratio generation processor 13 are not accurate enough, the operation mode of the internal combustion engine 1 is not the normal operation mode, and the value of the flag f/prism/on is set to "0" in STEPd-10.

Then, the engine-side control unit 7b decides whether the internal combustion engine 1 is operating with a lean air-fuel mixture or not in STEPd-3. The engine-side control unit 7b decides whether the ignition timing of the internal combustion engine 1 is retarded for early activation of the catalytic converter 3 immediately after the start of the internal combustion engine 1 or not in STEPd-4. The engine-side control unit 7b decides whether the throttle valve of the internal combustion engine 1 is substantially fully open or not in STEPd-5. The engine-side control unit 7b decides whether the supply of fuel to the internal combustion engine 1 is being stopped or not in STEPd-6. If either one of the conditions of these steps is satisfied, then since it is not preferable or not possible to control the supply of fuel to the internal combustion engine 1 using the target air-fuel ratio KCMD generated by the target air-fuel ratio generation processor 13, the operation mode of the internal combustion engine 1 is not the normal operation mode, and the value of the flag f/prism/on is set to "0" in STEPd-10.

The engine-side control unit 7b then decides whether the rotational speed NE and the intake pressure PB of the internal combustion engine 1 fall within respective given ranges (normal ranges) or not respectively in STEPd-7, STEPd-8. If either one of the rotational speed NE and the intake pressure PB does not fall within its given range, then since it is not preferable to control the supply of fuel to the internal combustion engine 1 using the target air-fuel ratio KCMD generated by the target air-fuel ratio generation processor 13, the operation mode of the internal combustion engine 1 is not the normal operation mode, and the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (at this time, the internal combustion engine 1 is in the normal operation mode), then the operation mode of the internal combustion engine 1 is judged as the normal operation mode, and the value of the flag f/prism/on is set to "1" in STEPd-9.

Figure 8:
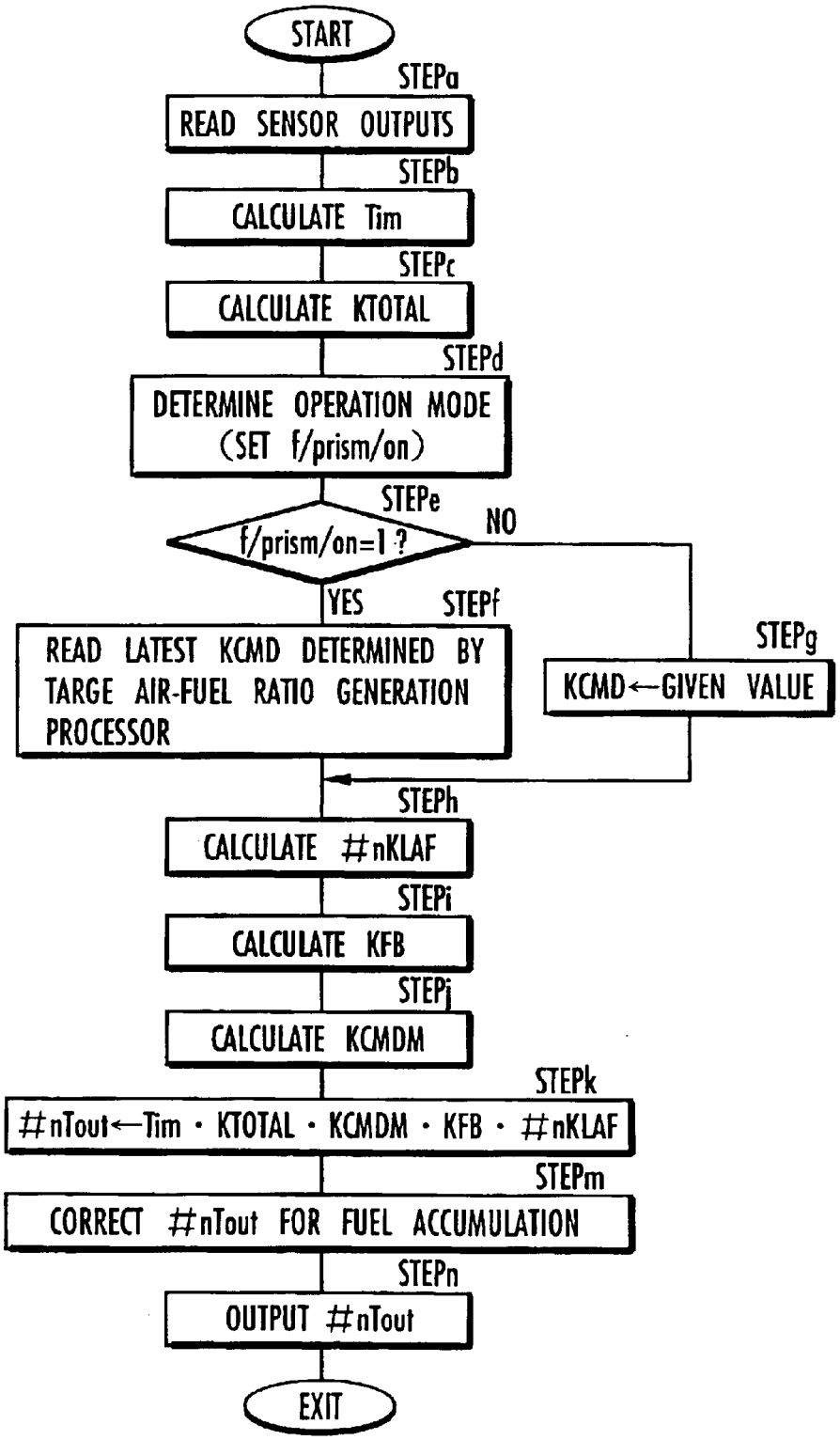
FIG. 8 is a flowchart of a processing sequence of an engine-side control unit (7b) of the apparatus shown in FIG. 1.

In FIG. 8, after the value of the flag f/prism/on has been set, the engine-side control unit 7b determines the value of the flag f/prism/on in STEPe. If f/prism/on=1, then the engine-side control unit 7b reads the target air-fuel ratio KCMD generated by the exhaust-side main processor 13 in STEPf. If f/prism/on=0, then the engine-side control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controller 22 calculates respective feedback correction coefficients #nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB in STEPi.

Depending on the operating state of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr from the adaptive controller 18). The switcher 20 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the cycle time for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the engine-side control unit 7b multiplies the basic fuel injection quantity Tim determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are output to the non-illustrated fuel injectors of the internal combustion engine 1 in STEPn. In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected value of the upstream-of-catalyst air-fuel ratio) to the target air-fuel ratio KCMD. While the feedback manipulated variable kstr from the adaptive controller 18 is being used as the feedback correction coefficient KFB, the output KACT of the LAF sensor 5 is quickly converged to the target air-fuel ratio KCMD with high stability against behavioral changes such as changes in the operating state of the internal combustion engine 1 or characteristic changes thereof. A response delay of the internal combustion engine 1 is also appropriately compensated for.

Figure 13:
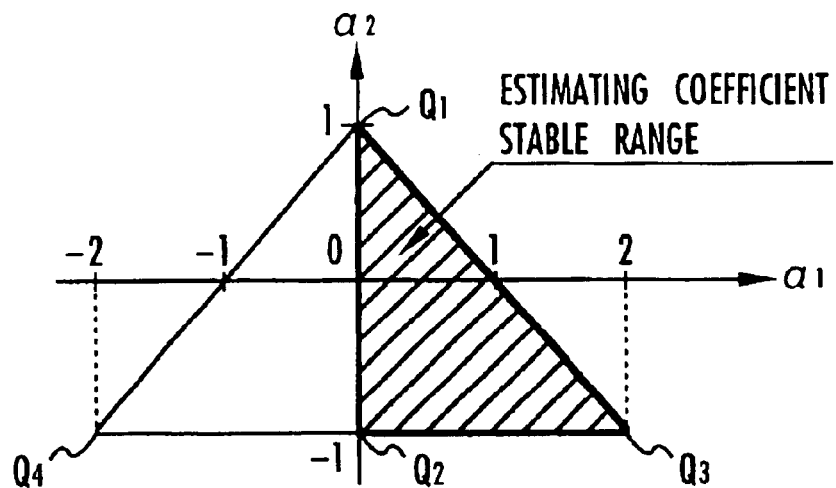
FIGS. 13 through 15 are diagrams illustrating partial processes of the flowchart shown in FIG. 12.

Concurrent with the above fuel control for the internal combustion engine 1, the exhaust-side control unit 7a executes a flowchart of FIG. 13 in control cycles of a constant period.

As shown in FIG. 13, the exhaust-side control unit 7a decides whether the processing of the target air-fuel ratio generation processor 13 (specifically, the processing of the identifier 25, the estimator 26, and the sliding mode controller 27) is to be executed or not, and sets a value of a flag f/prim/cal indicative of whether the processing is to be executed or not in STEP1. When the value of the flag f/prim/cal is "0", it means that the processing of the target air-fuel ratio generation processor 13 is not to be executed, and when the value of the flag f/prim/cal is "1", it means that the processing of the target air-fuel ratio generation processor 13 is to be executed.

Figure 11:
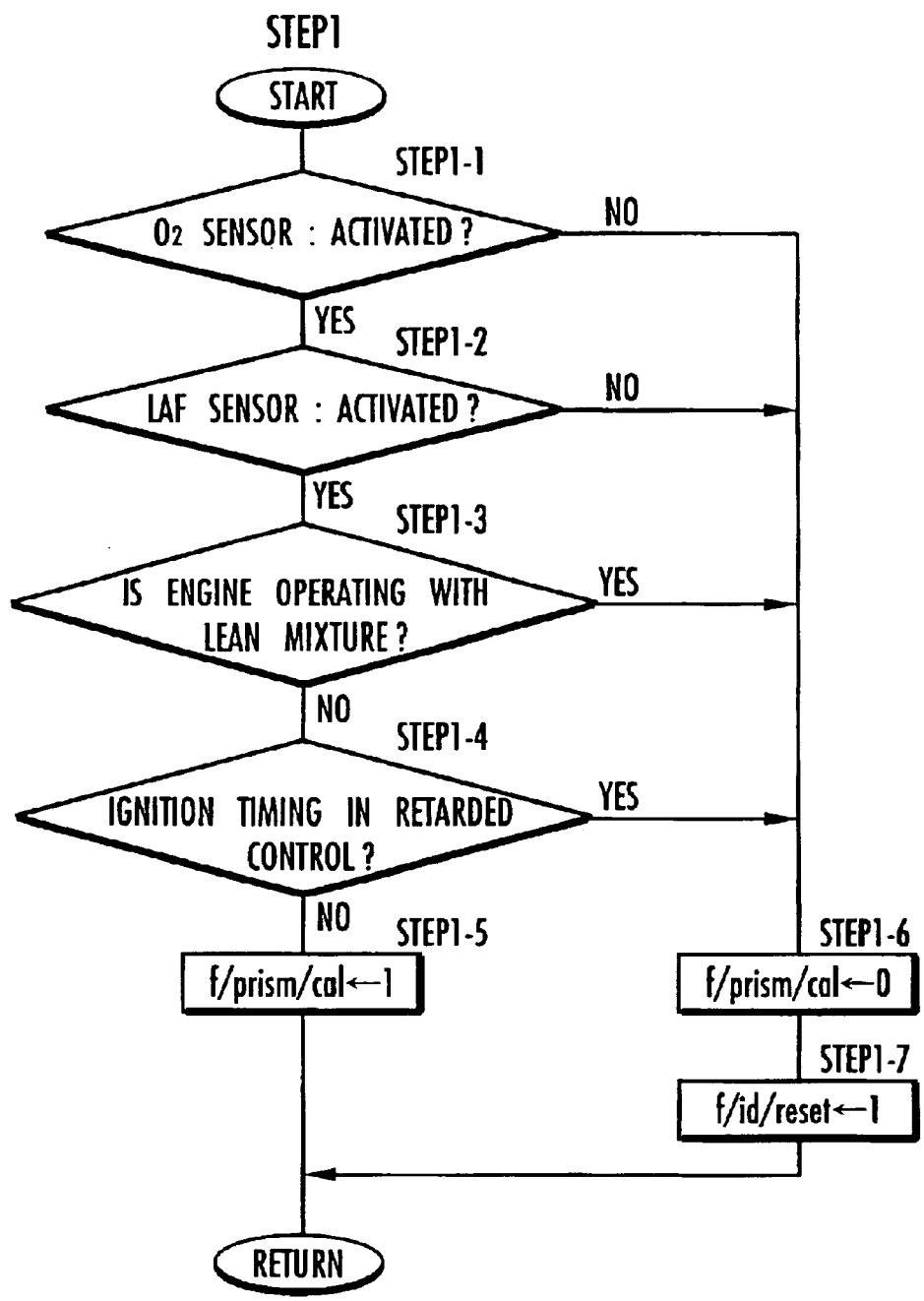
FIGS. 11 and 12 are flowcharts of subroutines of the flowchart shown in FIG. 10.

The deciding subroutine in STEP1 is shown in detail in FIG. 11. As shown in FIG. 11, the exhaust-side control unit 7a decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the target air-fuel ratio generation processor 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The exhaust-side control unit 7a decides whether the internal combustion engine 1 is operating with a lean air-fuel mixture or not in STEP1-3. The exhaust-side control unit 7a decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to adjust the output VO2/OUT of the $O_2$ sensor 6 to the target value VO2/TARGET is not used for the fuel control for the internal combustion engine 1, the value of the flag f/id/cal is set to "0" in STEP1-6, and the value of the flag f/id/reset is set to "1" in order to initialize the identifier 25 in STEP1-7.

Figure 10:
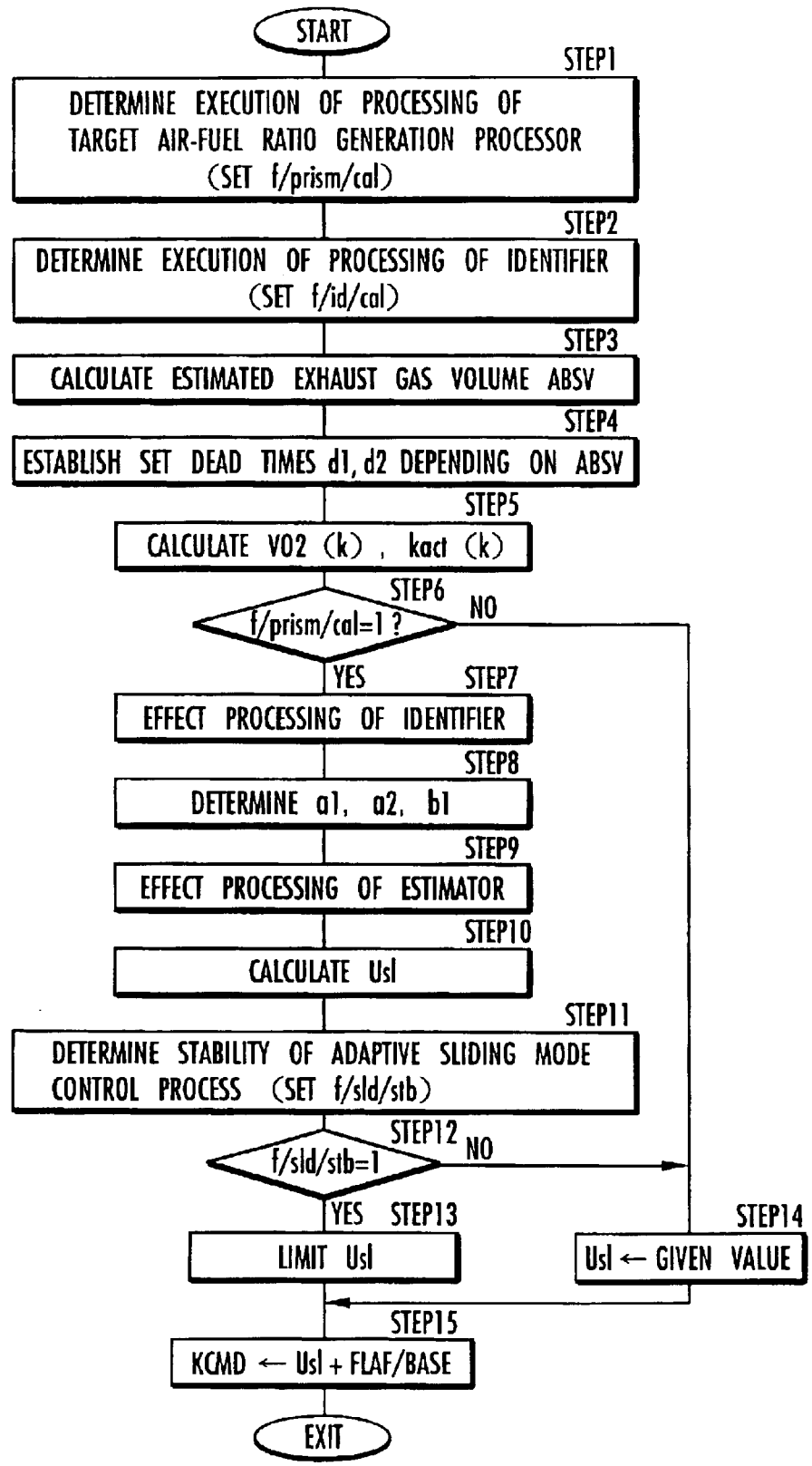
FIG. 10 is a flowchart of an overall processing sequence of an exhaust-side control unit (7a) of the apparatus shown in FIG. 1.

In FIG. 10, after the above deciding subroutine, the exhaust-side control unit 7a decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 is not to be executed, and when the value of the flag f/id/cal is "1", it means that the process of identifying (updating) the gain coefficients a1, a1, b1 is to be executed.

In the deciding process of STEP2, the exhaust-side control unit 7a decides whether the throttle valve of the internal combustion engine 1 is substantially fully open or not, and also decides whether the supply of fuel to the internal combustion engine 1 is being stopped or not. If either one of these conditions is satisfied, then since it is difficult to identify the gain coefficients a1, a1, b1 appropriately, the value of the flag f/id/cal is set to "0". If neither one of these conditions is satisfied, then the value of the flag f/id/cal is set to "1" to identify (update) the gain coefficients a1, a1, b1 with the identifier 25.

The flow rate data generating means 28 calculates an estimated exhaust gas volume ABSV according to the equation (3) from the latest detected values (acquired by the engine-side control unit 7b in STEPa in FIG. 8) of the present rotational speed NE and intake pressure PB of the internal combustion engine 1 in STEP3. Thereafter, the dead time setting means 29 determines the values of respective set dead times d1, d2 of the exhaust system E and the air-fuel ratio manipulating system from the calculated value of the estimated exhaust gas volume ABSV according to the data table shown in FIG. 4 in STEP4. The values of the set dead times d1, d2 determined in STEP4 are integral values which are produced by rounding off the fractions of the values determined from the data table shown in FIG. 4, as described above.

Then, the exhaust-side control unit 7a calculates the latest differential outputs kact(k) (=KACT−FLAF/BASE), VO2 (k) (=VO2/OUT−VO2/TARGET) respectively with the subtractors 11, 12 in STEP5. Specifically, the subtractors 11, 12 select latest ones of the time-series data read and stored in the non-illustrated memory in STEPa shown in FIG. 8, and calculate the differential outputs kact(k), VO2(k). The differential outputs kact(k), VO2(k), as well as data given in the past, are stored in a time-series manner in the non-illustrated memory in the exhaust-side control unit 7a.

Then, in STEP6, the exhaust-side control unit 7a determines the value of the flag f/prism/cal set in STEP1. If the value of the flag f/prism/cal is "0", i.e., if the processing of the target air-fuel ratio generation processor 13 is not to be executed, then the exhaust-side control unit 7a forcibly sets the SLD manipulating input Usl (the target differential air-fuel ratio kcmd) to be determined by the sliding mode controller 27, to a predetermined value in STEP14. The predetermined value may be a fixed value (e.g., "0") or the value of the SLD manipulating input Usl determined in a preceding control cycle.

After the SLD manipulating input Usl is set to the predetermined value, the exhaust-side control unit 7a adds the reference value FLAF/BASE to the SLD manipulating input Usl for thereby determining a target air-fuel ratio KCMD in the present control cycle in STEP 15. Then, the processing in the present control cycle is finished.

If the value of the flag f/prism/cal is "1" in STEP6, i.e., if the processing of the target air-fuel ratio generation processor 13 is to be executed, then the exhaust-side control unit 7a effects the processing of the identifier 25 in STEP7.

Figure 12:
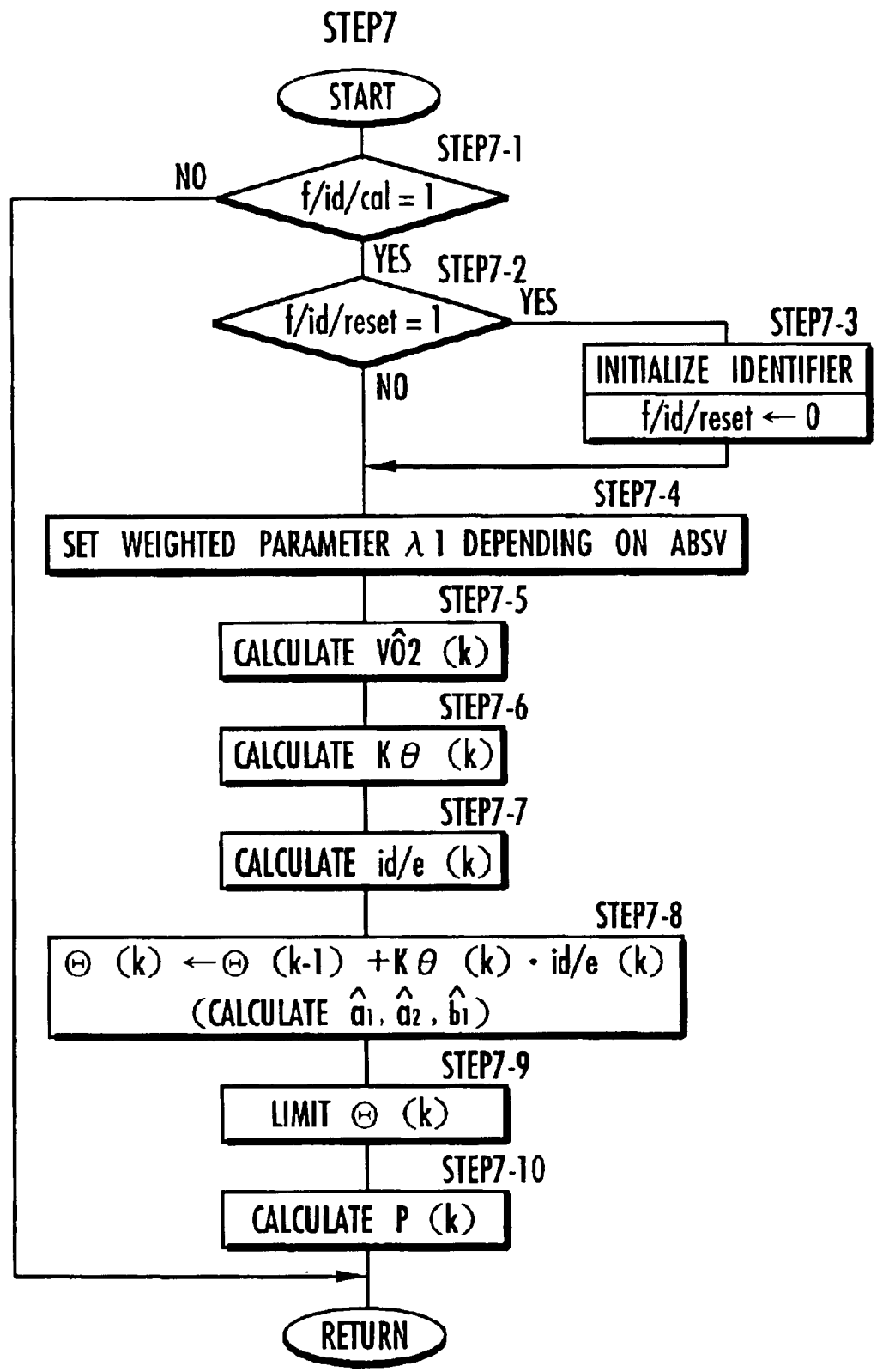

The processing of the identifier 25 is carried out according to a flowchart shown in FIG. 12. The identifier 25 determines the value of the flag f/id/cal set in STEP2 in STEP7-1. If the value of the flag f/id/cal is "0", then since the process of identifying the gain coefficients a1, a1, b1 with the identifier 25 is not carried out, control immediately goes back to the main routine shown in FIG. 10.

If the value of the flag f/id/cal is "1", then the identifier 25 determines the value of the flag f/id/reset set in STEP1 with respect to the initialization of the identifier 25 in STEP7-2. If the value of the flag f/id/reset is "1", the identifier 25 is initialized in STEP7-3. When the identifier 25 is initialized, the identified gain coefficients a1 hat, a2 hat, b1 hat are set to predetermined initial values (the identified gain coefficient vector Θ according to the equation (5) is initialized), and the elements of the matrix P (diagonal matrix) according to the equation (11) are set to predetermined initial values. The value of the flag f/id/reset is reset to "0".

Then, the identifier 25 determines the value of the weighted parameter $\lambda_1$ in the algorithm of the method of weighted least squares of the identifier 25, i.e., the value of the weighted parameter $\lambda_1$ used in the equation (11), from the present value of the estimated exhaust gas volume ABSV determined by the flow rate data generating means 28 in STEP3 according to the data table shown in FIG. 5 in STEP7-4.

Then, the identifier 25 calculates the identified differential output VO2(k) hat using the values of the present identified gain coefficients a1(k−1) hat, a2(k−1) hat, b1(k−1) hat and the past data VO2(k−1), VO2(k−2), kact(k−d1−1) of the differential outputs VO2, kact calculated in each control cycle in STEP5, according to the equation (4) in STEP7-5. Specifically, the differential output kact(k−d1−1) used in the above calculation is a differential output kact at a past time determined by the set dead time d1 of the exhaust system E that is set by the dead time setting means 29 in STEP4, and also a differential output kact obtained in a control cycle that is (d1+1) control cycles prior to the present control cycle.

The identifier 25 then calculates the vector KΘ(k) to be used in determining the new identified gain coefficients a1 hat, a2 hat, b1 hat according to the equation (10) in STEP7-6. Thereafter, the identifier 25 calculates the identified error id/e(k) (the difference between the identified differential output VO2 hat and the actual differential output VO2, see the equation (8)), in STEP7-7.

The identified error id/e(k) may basically be calculated according to the equation (8). In the present embodiment, however, a value (=VO2(k)−VO2(k) hat) calculated according to the equation (8) from the differential output VO2 calculated in each control cycle in STEP3, and the identified differential output VO2 hat calculated in each control cycle in STEP7-5 is filtered with low-pass characteristics to calculate the identified error id/e(k).

This is because since the behavior of the exhaust system E including the catalytic converter 3 generally has low-pass characteristics, it is preferable to attach importance to the low-frequency behavior of the exhaust system E in appropriately identifying the gain coefficients a1, a2, b1 of the exhaust system model.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error id/e(k). The above filtering is carried out by a moving average process which is a digital filtering process.

Thereafter, the identifier 25 calculates a new identified gain coefficient vector Θ(k), i.e., new identified gain coefficients a1(k) hat, a2(k) hat, b1(k) hat, according to the equation (9) using the identified error id/e(k) determined in STEP7-7 and KΘ calculated in SETP7-6 in STEP7-8.

After having calculated the new identified gain coefficients a1(k) hat, a2(k) hat, b1(k) hat, the identifier 25 limits the values of the gain coefficients a1 hat, a2 hat, b1 hat within a predetermined range as described below in STEP7-9. Then, the identifier 25 updates the matrix P(k) according to the equation (11) for the processing of a next control cycle in STEP7-10, after which control returns to the main routine shown in FIG. 10.

The process of limiting the identified gain coefficients a1 hat, a2 hat, b1 hat in STEP7-9 comprises a process of eliminating the situation where the target air-fuel ratio KCMD determined by the sliding mode controller 27 varies in a high-frequency oscillating manner. The inventors of the present invention have found that if the values of the identified gain coefficients a1 hat, a2 hat, b1 hat are not particularly limited, while the output signal VO2/OUT of the $O_2$ sensor 6 is being stably controlled at the target value VO2/TARGET, there are developed a situation in which the target air-fuel ratio KCMD determined by the sliding mode controller 27 changes smoothly with time, and a situation in which the target air-fuel ratio KCMD oscillates with time at a high frequency. Whether the target air-fuel ratio KCMD changes smoothly or oscillates at a high frequency depends on the combinations of the values of the identified gain coefficients a1 hat, a2 hat relative to the response delay element of the exhaust system model (more specifically, the primary autoregressive term and the secondary autoregressive term on the right side of the equation (1)) and the value of the identified gain coefficient b1 hat relative to the dead time element of the exhaust system model.

The limiting process in STEP7-9 is roughly classified into a process of limiting the combination of the values of the identified gain coefficients a1 hat, a2 hat within a given range, and a process of limiting the value of the identified gain coefficient b1 hat within a given range.

The range within which the combination of the values of the identified gain coefficients a1 hat, a2 hat are limited and the range within which the value of the identified gain coefficient b1 hat is limited are established as follows:

With respect to the range within which the combination of the values of the identified gain coefficients a1 hat, a2 hat are limited, a study made by the inventors indicates that whether the target air-fuel ratio KCMD changes smoothly or oscillates at a high frequency is closely related to combinations of the coefficient values $\alpha 1$, $\alpha 2$ used for the estimator 26 to determine the estimated differential output VO2(k+d) bar (these coefficient values $\alpha 1$, $\alpha 2$ are the first-row, first-column element and the first-row, second-column element of the matrix $A^d$ which is a power of the matrix A defined by the equation (13)).

Specifically, as shown in FIG. 13, when a coordinate plane whose coordinate components are represented by the coefficient values $\alpha 1$, $\alpha 2$ is established, if a point on the coordinate plane which is determined by a combination of the coefficient values $\alpha 1$, $\alpha 2$ lies in a hatched range, which is surrounded by a triangle $Q_1 Q_2 Q_3$ (including the boundaries) and will hereinafter be referred to as an estimating coefficient stable range, then the target air-fuel ratio KCMD tends to be smooth. Conversely, if a point determined by a combination of the coefficient values $\alpha 1$, $\alpha 2$ lies outside of the estimating coefficient stable range, then the target air-fuel ratio KCMD is liable to oscillate with time at a high frequency or the controllability of the output VO2/OUT of the $O_2$ sensor 6 at the target value VO2/TARGET is liable to become poor.

Therefore, the combinations of the values of the gain coefficients a1, a2 should be limited such that the point on the coordinate plane shown in FIG. 13 which corresponds to the combination of the coefficient values α1, α2 determined by the values of the identified gain coefficients a1 hat, a2 hat will lie within the estimating coefficient stable range.

In FIG. 13, a triangular range $Q_1Q_4Q_3$ on the coordinate plane which contains the estimating coefficient stable range is a range that determines combinations of the coefficient values α1, α2 which makes theoretically stable a system defined according to the following equation (40), i.e., a system defined by an equation similar to the equation (13) except that VO2(k), VO2(k−1) on the right side of the equation (13) are replaced respectively with VO2(k) bar, VO2(k−1) bar (VO2(k) bar, VO2(k−1) bar mean respectively an estimated differential output determined in each control cycle by the estimator 26 and an estimated differential output determined in a preceding cycle by the estimator 26).

$$\overline{VO2}(k+d) = \alpha 1 \cdot \overline{VO2}(k) + \alpha 2 \cdot \overline{VO2}(k-1) + \sum_{j=1}^{d} \beta_j \cdot kcmd(k-j) \quad (40)$$

The condition for the system defined according to the equation (40) to be stable is that a pole of the system (which is given by the following equation (41)) exists in a unit circle on a complex plane:

Pole of the system according to the equation $$= \frac{\alpha 1 \pm \sqrt{\alpha 1^2 + 4 \cdot \alpha 2}}{2} \quad (41)$$

The triangular range $Q_1Q_4Q_3$ shown in FIG. 13 is a range for determining the combinations of the coefficient values α1, α2 which satisfy the above condition. Therefore, the estimating coefficient stable range is a range indicative of those combinations where α1≧0 of the combinations of the coefficient values α1, α2 which make stable the system defined by the equation (40).

Since the coefficient values α1, α2 are determined by a combination of the values of the gain coefficients α1, α2 when the total set dead time d is determined to be of a certain value, a combination of the values of the gain coefficients α1, α2 is determined from a combination of the coefficient values α1, α2 using the value of the total set dead time d. Therefore, the estimating coefficient stable range shown in FIG. 13 which determines preferable combinations of the coefficient values α1, α2 can be converted into a range on a coordinate plane shown in FIG. 14 whose coordinate components are represented by the gain coefficients a1, a2.

If the above conversion is carried out with the total set dead time d being determined to be of a certain value, then the estimating coefficient stable range is converted into a range enclosed by the imaginary lines in FIG. 14, which is a substantially triangular range having an undulating lower side and will hereinafter be referred to as an identifying coefficient stable range, on the coordinate plane shown in FIG. 14. Stated otherwise, when a point on the coordinate plane shown in FIG. 14 which is determined by a combination of the values of the gain coefficients a1, a2 resides in the identifying coefficient stable range enclosed by the imaginary lines in FIG. 14, a point on the coordinate plane shown in FIG. 13 which corresponds to the combination of the coefficient values α1, α2 determined by those values of the gain coefficients a1, a2 resides in the estimating coefficient stable range. The identifying coefficient stable range changes with the value of the total set dead time d, as described later on. It is assumed for a while in the description below that the total set dead time d is fixed to a certain value (represented by dx).

Figure 14:
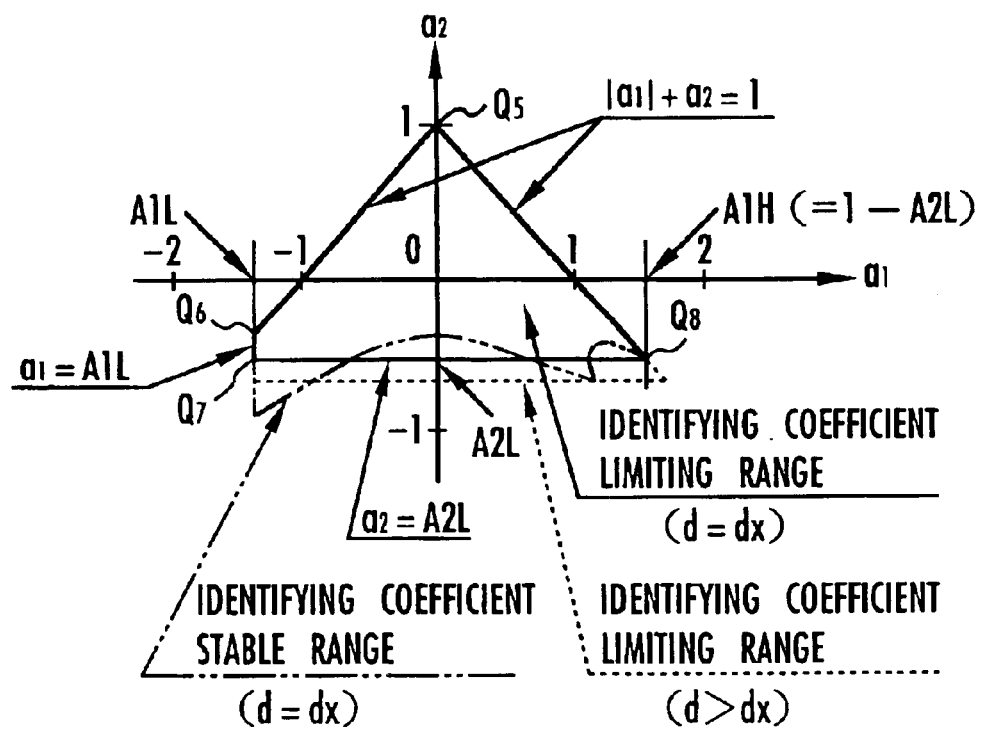

Consequently, the combinations of the values of the identified gain coefficients a1 hat, a2 hat determined by the identifier 25 should preferably be limited within such a range that a point on the coordinate plane shown in FIG. 14 which is determined by those values of the identified gain coefficients a1 hat, a2 hat reside in the identifying coefficient stable range.

However, since a boundary (lower side) of the identifying coefficient stable range indicated by the imaginary lines in FIG. 14 is of a complex undulating shape, a practical process for limiting the point on the coordinate plane shown in FIG. 14 which is determined by the values of the identified gain coefficients a1 hat, a2 hat within the identifying coefficient stable range is liable to be complex.

For this reason, according to the present embodiment, the identifying coefficient stable range (the identifying coefficient stable range corresponding to the total set dead time dx) is substantially approximated by a quadrangular range $Q_5Q_6Q_7Q_8$ enclosed by the solid lines in FIG. 14, which has straight boundaries and will hereinafter be referred to as an identifying coefficient limiting range. As shown in FIG. 14, the identifying coefficient limiting range (the identifying coefficient limiting range corresponding to the total set dead time dx) is a range enclosed by a polygonal line (including line segments $Q_5Q_6$ and $Q_5Q_8$) expressed by a functional expression |a1|+a2=1, a straight line (including a line segment $Q_6Q_7$) expressed by a constant-valued functional expression a1=A1L, and a straight line (including a line segment $Q_7Q_8$) expressed by a constant-valued functional expression a2=A2L. In the present embodiment, the identifying coefficient limiting range is used as the range within which the combinations of the values of the identified gain coefficients a1 hat, a2 hat are limited. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The identifying coefficient stable range which serves as a basis for the identifying coefficient limiting range changes with the value of the total set dead time d, as is apparent from the definition of the coefficient values α1, α2 according to the equation (13). In the present embodiment, the values of the set dead time d1 of the exhaust system E and the set dead time d2 of the air-fuel ratio manipulating system, and hence the value of the total set dead time d, are sequentially variably set depending on the estimated exhaust gas volume ABSV.

The inventors have found that the identifying coefficient stable range, chiefly the shape of only its lower portion (generally an undulating portion from Q7 to Q8 in FIG. 14), varies depending on the value of the total set dead time d, and as the value of the total set dead time d is greater, the lower portion of the identifying coefficient stable range tends to expand more downwardly (in the negative direction along the a2 axis). The shape of the upper portion (generally a portion enclosed by a triangle Q5Q6Q8 in FIG. 14) of the identifying coefficient stable range is almost not affected by the value of the total set dead time d.

In the present embodiment, the lower limit value A2L of the gain coefficient a1 in the identifying coefficient limiting range for limiting the combinations of the values of the identified gain coefficients a1 hat, a2 hat is variably set depending on the estimated exhaust gas volume ABSV which determines the dead times d1, d2 of the exhaust system E and the air-fuel ratio manipulating system. The lower limit value A2L of the gain coefficient a1 is determined from the value (latest value) of the estimated exhaust gas volume ABSV based on a predetermined data table represented by the solid-line curve e in FIG. 15, for example. The data table is determined such that as the value of the estimated exhaust gas volume ABSV is larger (as the total set dead time d is shorter), the lower limit value A2L (<0) is smaller (the absolute value is greater). Thus, the identifying coefficient limiting range is established such that as the estimated exhaust gas volume ABSV is larger (as the total set dead time d is shorter), the identifying coefficient limiting range is expanded more downwardly. For example, if the value of the total set dead time d is longer than the value dx corresponding to the identifying coefficient limiting range indicated by the solid line in FIG. 14, then the lower portion of the identifying coefficient limiting range is expanded below the identifying coefficient limiting range where d=dx.

The above identifying coefficient limiting range is given for illustrative purpose only, and may be equal to or may substantially approximate the identifying coefficient stable range corresponding to each value of the total set dead time d, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability. For example, while the boundary of an upper portion of the identifying coefficient limiting range is defined by the functional expression $|a1|+a2=1$ in the illustrated embodiment, combinations of the values of the gain coefficients a1, a2 which satisfy this functional expression are combinations of theoretical stable limits where a pole of the system defined by the equation (40) exists on a unit circle on a complex plane. Therefore, the boundary of the upper portion of the identifying coefficient limiting range may be determined by a functional expression $|a1|+a2=r$ (r is a value slightly smaller than "1" corresponding to the stable limits, e.g., 0.99) for higher control stability.

The range within which the value of the identified gain coefficient b1 hat is limited is established as follows:

The inventors have found that the situation in which the time-depending change of the target air-fuel ratio KCMD is oscillatory at a high frequency tends to happen also when the value of the identified gain coefficient b1 hat is excessively large or small. Furthermore, the value of the identified gain coefficient b1 hat which is suitable to cause the target air-fuel ratio KCMD to change smoothly with time is affected by the total set dead time d, and tends to be greater as the total set dead time d is shorter. According to the present embodiment, an upper limit value B1H and a lower limit value B1L (B1H>B1L>0) for determining the range of the gain coefficient b1 are sequentially established depending on the value (latest value) of the estimated exhaust gas volume ABSV which determines the value of the total set dead time d, and the value of the identified gain coefficient b1 hat is limited in a range that is determined by the upper limit value B1H and the lower limit value B1L. In the present embodiment, the upper limit value B1H and the lower limit value B1L which determine the range of the value of the gain coefficient b1 are determined based on data tables that are determined in advance through experimentation or simulation as indicated by the solid-line curves f, g in FIG. 15. The data tables are basically established that as the estimated exhaust gas volume ABSV is greater (as the total set dead time d is shorter), the upper limit value B1H and the lower limit value B1L are greater.

Figure 15:
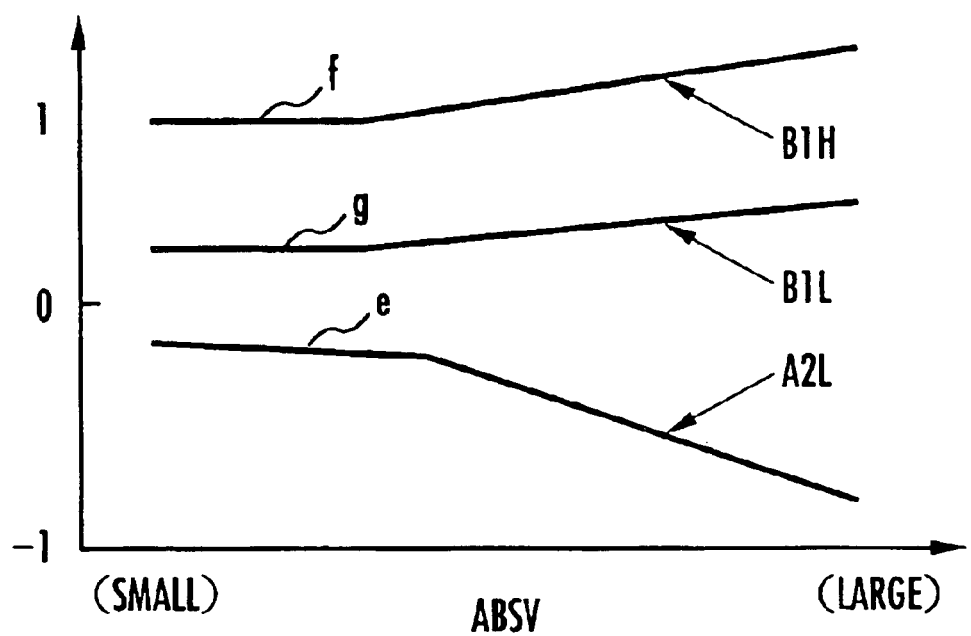
Figure 16:
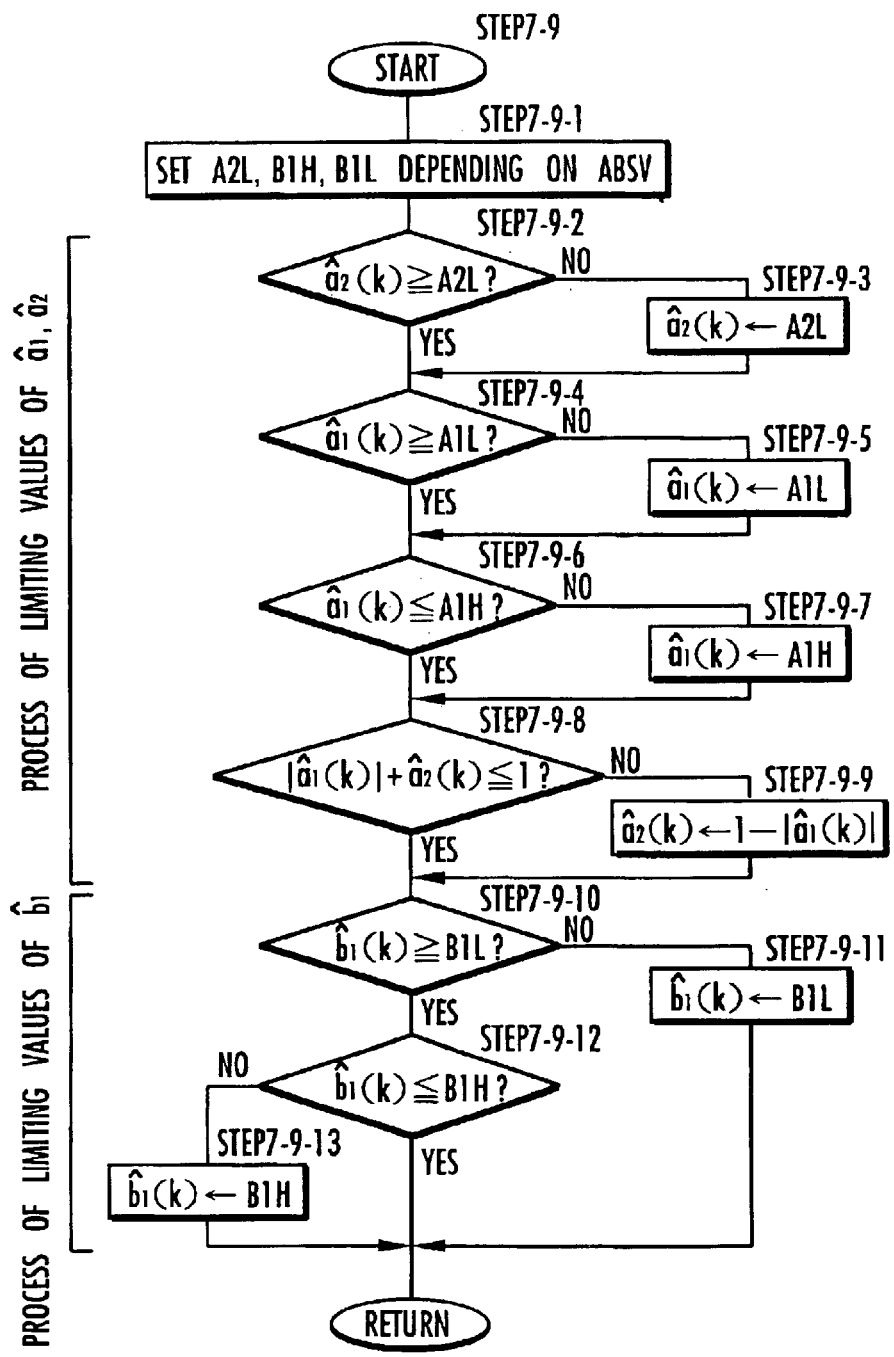
FIG. 16 is a flowchart of a subroutine of the flowchart shown in FIG. 12.

A process of limiting combinations of the values of the identified gain coefficients a1 hat, a2 hat and the range of the value of the identified gain coefficient b1 is carried out as follows:

Referring to a flowchart shown in FIG. 16, the identifier 25 sets the lower limit value A2L of the gain coefficient a2 in the identifying coefficient limiting range and the upper limit value B1H and the lower limit value B1L of the gain coefficient b1 based on the data tables shown in FIG. 15 from the latest value of the estimated exhaust gas volume ABSV determined by the flow rate data generating means 28 in STEP3 shown in FIG. 10, in STEP7-9-1.

The identifier 25 first limits combinations of the identified gain coefficients a1(k) hat, a2(k) hat, of the identified gain coefficients a1(k) hat, a2(k) hat, b1(k) hat that have been determined in STEP7-8 shown in FIG. 12, within the identifying coefficient limiting range in STEP7-9-2 through STEP7-9-9.

Specifically, the identifier 25 decides whether or not the value of the identified gain coefficient a2(k) hat determined in STEP7-8 is equal to or greater than the lower limit value A2L (see FIG. 14) set in STEP7-9-1, in STEP7-9-2.

If A2(k) hat<A2L, then since a point on the coordinate plane shown in FIG. 14 (expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP7-9-3. Thus, the point (a1(k) hat, a2(k) hat) on the coordinate plane shown in FIG. 14 is limited to a point in a region on and above a straight line (the straight line including the line segment $Q_7Q_8$) expressed by at least a2=A2L.

Then, the identifier 25 decides whether or not the value of the identified gain coefficient a1(k) hat determined in STEP7-8 is equal to or greater than a lower limit value A1L for the gain coefficient a1 in the identifying coefficient limiting range in STEP7-9-4, and then decides whether or not the value of the identified gain coefficient a1(k) hat is equal to or smaller than an upper limit value A1H for the gain coefficient a1 in the identifying coefficient limiting range in STEP7-9-5. In the present embodiment, the lower limit value A1L for the gain coefficient a1 is a predetermined fixed value. The upper limit value A1H for the gain coefficient a1 is represented by A1H=1−A2L because it is an a1 coordinate of the point $Q_8$ where the polygonal line $|a1|+a2=1$ (a1>0) and the straight line a2=A2L intersect with each other, as shown in FIG. 14.

If a1(k) hat<A1L or a1(k) hat>A1H, then since the point (a1(k) hat, a2(k) hat) on the coordinate plane shown in FIG. 14 does not reside in the identifying coefficient limiting range, the value of a1(k) hat is forcibly changed to the lower limit value A1L or the upper limit value A1H in STEP7-9-5 and STEP7-9-7.

Thus, the point (a1(k) hat, a2(k) hat) on the coordinate plane shown in FIG. 14 is limited to a region on and between a straight line (the straight line including the line segment $Q_6A_7$) expressed by a1=A1L, and a straight line (the straight line passing through the point $Q_8$ and perpendicular to the a1 axis) expressed by a1=A1H.

The processing in STEP7-9-4 through STEP7-9-7 may be carried out before the processing in STEP7-9-2 and STEP7-9-3.

Then, the identifier 25 decides whether the present values of a1(k) hat, a2(k) hat after STEP7-9-2 through STEP7-9-7 satisfy an inequality |a1|+a2≦1 or not, i.e., whether the point (a1(k) hat, a2(k) hat) is positioned on or below or on or above the polygonal line (including line segments $Q_5Q_6$ and $Q_5Q_8$) expressed by the functional expression |a1|+a2=1 in STEP7-9-8.

If |a1|+a2=1, then the point (a1(k) hat, a2(k) hat) determined by the values of a1(k) hat, a2(k) hat after the processing in STEP7-9-2 through STEP7-9-7 exists in the identifying coefficient limiting range (including its boundaries).

If |a1|+a2>1, then since the point (a1(k) hat, a2(k) hat) deviates upwardly from the identifying coefficient limiting range, the value of the a2(k) hat is forcibly changed to a value (1−|a1(k) hat|) depending on the value of a1(k) hat in STEP7-9-9. Stated otherwise, while the value of a1(k) hat is being kept unchanged, the point (a1(k) hat, a2(k) hat) is moved onto a polygonal line expressed by the functional expression |a1|+a2=1 (onto the line segment $Q_5Q_6$ or the line segment $Q_5Q_8$ which is a boundary of the identifying coefficient limiting range).

Through the above processing in STEP7-9-2 through 7-9-9, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP7-8 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP7-8 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 performs a process of limiting the value of the identified gain coefficient b1(k) hat in STEP7-9-10 through STEP7-9-13.

Specifically, the identifier 25 decides whether or not the value of the identified gain coefficient b1(k) hat determined in STEP7-8 is equal to or greater than the lower limit value B1L for the gain coefficient b1 set in STEP7-9-1 in STEP7-9-10. If B1L>b1(k) hat, then the value of b1(k) hat is forcibly changed to the lower limit value B1L in STEP7-9-11.

The identifier 25 decides whether or not the value of the identified gain coefficient b1(k) hat is equal to or smaller than the upper limit value B1H for the gain coefficient g1 set in STEP7-9-1 in STEP7-9-12. If B1H<b1(k) hat, then the value of b1(k) hat is forcibly changed to the upper limit value B1H in STEP7-9-13.

Through the above processing in STEP7-9-10 through 7-9-13, the value of the identified gain coefficient b1(k) hat is limited to a value in a range between the lower limit value B1L and the upper limit value B1H.

After the identifier 25 has limited the combination of the values of the identified gain coefficients a1(k) hat, a2(k) hat and the identified gain coefficient b1(k) hat, control returns to the flowchart shown in FIG. 12.

The preceding values a1(k−1) hat, a2(k−1) hat, b1(k−1) hat of the identified gain coefficients used for determining the identified gain coefficients a1(k) hat, a2(k) hat, b1(k) hat in STEP7-8 shown in FIG. 12 are the values of the identified gain coefficients limited by the limiting process in STEP7-9 in the preceding control cycle.

The above process is the processing sequence of the identifier 25 which is carried out in STEP7 shown in FIG. 10.

In FIG. 10, after the processing of the identifier 25 has been carried out, the exhaust-side control unit 7a determines the values of the gain coefficients a1, a2, b1 in STEP8. Specifically, if the value of the flag f/id/cal set in STEP2 is "1", i.e., if the gain coefficients a1, a2, b1 have been identified by the identifier 25, then the gain coefficients a1, a2, b1 are set to the latest identified gain coefficients a1(k) hat, a2(k) hat, b1(k) hat determined by the identifier 25 in STEP7 (limited in STEP7-9). If f/id/cal="0", i.e., if the gain coefficients a1, a2, b1 have not been identified by the identifier 25, then the gain coefficients a1, a2, b1 are set to predetermined values, respectively.

Then, the exhaust-side control unit 7a effects a processing operation of the estimator 26 in STEP9.

The estimator 26 calculates the coefficients $\alpha 1$, $\alpha 2$, $\beta j$ (j=1, 2, ..., d) to be used in the equation (14) or (15), using the gain coefficients a1, a2, b1 determined in STEP8 (these values are basically the latest values of the identified gain coefficients a1 hat, a2 hat, b1 hat) and the set dead time d1 of the exhaust system E and the set dead time d2 of the air-fuel ratio manipulating system, which have been set in STEP4, according to the definition with respect to the equation (13).

Then, the estimator 26 calculates the estimated differential output VO2(k+d) bar (estimated value of the differential output VO2 after the total set dead time d from the time of the present control cycle) according to the equation (14), using the time-series data VO2(k), VO2(k−1) of the present and past values of the differential output VO2 of the $O_2$ sensor calculated in each control cycle in STEP5, the time-series data kact(k−j) (j=0, ..., d1) of the present and past values of the differential output kact of the LAF sensor 5, the data kcmd(k−j) (=Usl(k−j), j=1, ..., d2−1) of the past values of the target differential air-fuel ratio kcmd (=the SLD manipulating input Usl) given in each control cycle from the sliding mode controller 27, and the coefficients $\alpha 1$, $\alpha 2$, $\beta j$ (j=1, 2, ..., d) calculated as described above.

Then, if the set dead time d2 of the air-fuel ratio manipulating system is d2=1, then the estimator 26 calculates the estimated differential output VO2(k+d) bar according to the equation (15), using the time-series data VO2(k), $VO_{2(k-}1)$ of the present and past values of the differential output VO2 of the $O_2$ sensor, time-series data kact(k−j) (j=0, ..., d−1) of the present and past values of the differential output kact of the LAF sensor 5, and the coefficients $\alpha 1$, $\alpha 2$, $\beta j$ (j=1, 2, ..., d).

Then, the exhaust-side control unit 7a calculates the SLD manipulating input Usl (=the target differential air-fuel ratio kcmd) with the sliding mode controller 27 in STEP10.

Specifically, the sliding mode controller 27 calculates a present value σ(k+d) bar (corresponding to an estimated value, after the total set dead time d, of the linear function σ defined according to the equation (16)) of the switching function σ bar defined according to the equation (25), using the time-series data VO2(k+d) bar, VO2(k+d−1) bar (the present and preceding values of the estimated differential output VO2 bar) of the estimated differential output VO2 bar determined by the estimator 26 in STEP9.

At this time, the sliding mode controller 27 keeps the value of the switching function a bar within a predetermined allowable range. If the value σ(k+d) bar determined as described above exceeds the upper or lower limit of the allowable range, then the sliding mode controller 27 forcibly limits the value σ(k+d) bar to the upper or lower limit of the allowable range.

Then, the sliding mode controller 27 accumulatively adds values σ(k+d) bar·ΔT, produced by multiplying the present value σ(k+d) bar of the switching function σ bar by the period ΔT of the control cycles of the exhaust-side control unit 7a. That is, the sliding mode controller 27 adds the product σ(k+d) bar·ΔT of the value σ(k+d) bar and the period ΔT calculated in the present control cycle to the sum determined in the preceding control cycle, thus calculating an integrated value a bar (hereinafter represented by "Σσ bar") which is the calculated result of the term Σ(σ bar·T) of the equation (27).

In the present embodiment, the sliding mode controller 27 keeps the integrated value Σσ bar in a predetermined allowable range. If the integrated value Σσ bar exceeds the upper or lower limit of the allowable range, then the sliding mode controller 27 forcibly limits the integrated value Σσ bar to the upper or lower limit of the allowable range.

Then, the sliding mode controller 27 calculates the equivalent control input Ueq, the reaching law input Urch, and the adaptive law input Uadp according to the respective equations (24), (26), (27), using the time-series data VO2 (k+d)bar, VO2(k+d−1) bar of the present and past values of the estimated differential output VO2 bar determined by the estimator 26 in STEP9, the value σ(k+d) bar of the switching function a and its integrated value Σσ bar which are determined as described above, and the gain coefficients a1, a2, b1 determined in STEP 8 (which are basically the latest identified gain coefficients a1(k) hat, a2(k) hat, b1(k) hat).

The sliding mode controller 27 then adds the equivalent control input Ueq, the reaching law input Urch, and the adaptive law input Uadp to calculate the SLD manipulating input Usl, i.e., the input quantity (=the target differential air-fuel ratio kcmd) to be applied to the exhaust system E for converging the output signal VO2/OUT of the $O_2$ sensor 6 to the target value VO2/TARGET.

After having calculated the SLD manipulating input Usl, the exhaust-side control unit 7a determines the stability of the adaptive sliding mode control process (or more specifically, the stability of the controlled state (hereinafter referred to as "SLD controlled state") of the output VO2/OUT of the $O_2$ sensor 6 based on the adaptive sliding mode control process), and sets a value of a flag f/sld/stb indicative of whether the SLD controlled state is stable or not in STEP11. The flag f/sld/stb is "1" when the SLD controlled state is stable, and "0" when the SLD controlled state is not stable.

Figure 17:
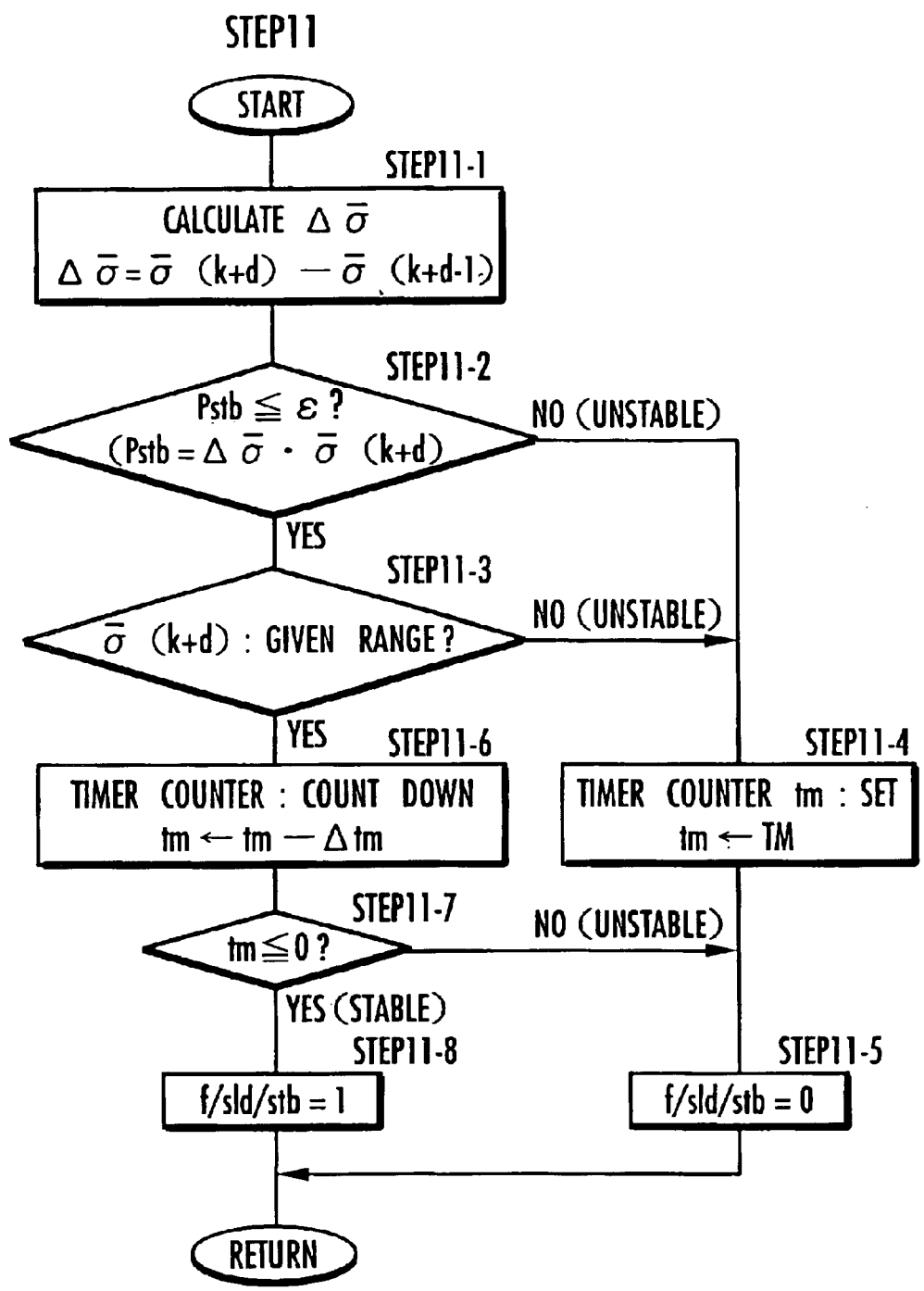
FIG. 17 is a flowchart of a subroutine of the flowchart shown in FIG. 10.

The stability determining process is carried out according to a flowchart shown in FIG. 17.

As shown in FIG. 17, the sliding mode controller 27 calculates a difference Δσ bar (corresponding to a rate of change of the switching function σ bar) between the present value σ(k+d) bar of the switching function σ bar calculated in STEP10 and a preceding value σ(k+d−1) bar thereof in STEP11-1.

Then, the sliding mode controller 27 decides whether or not a product Δσ bar·σ(k+d) bar (corresponding to the time-differentiated function of a Lyapunov function a bar²/2 relative to the σ bar) of the difference Δσ bar and the present value σ(k+d) bar of the switching function σ bar is equal to or smaller than a predetermined value ε (≧0) in STEP11-2.

The product Δσ bar·σ(k+d) bar (hereinafter referred to as "stability determining parameter Pstb") will be described below. If the stability determining parameter Pstb is greater than 0 (Pstb>0), then the value of the switching function σ bar is basically shifting away from "0". If the stability determining parameter Pstb is equal to or smaller than 0 (Pstb≦0), then the value of the switching function σ bar is basically converged or converging to "0". Generally, in order to converge a controlled variable to its target value according to the sliding mode control process, it is necessary that the value of the switching function be stably converged to "0". Basically, therefore, it is possible to determine whether the SLD controlled state is stable or unstable depending on whether or not the value of the stability determining parameter Pstb is equal to or smaller than 0.

If, however, the stability of the SLD controlled state is determined by comparing the value of the stability determining parameter Pstb with "0", then the determined result of the stability is affected even by slight noise contained in the value of the switching function σ bar. According to the present embodiment, therefore, the predetermined value ε with which the stability determining parameter Pstb is to be compared in STEP11-2 is of a positive value slightly greater than "0".

If Pstb>ε in STEP11-2, then the SLD controlled state is judged as being unstable, and the value of a timer counter tm (count-down timer) is set to a predetermined initial value $T_M$ (the timer counter tm is started) in order to inhibit the determination of the target air-fuel ratio KCMD using the SLD manipulating input Usl calculated in STEP10 for a predetermined time in STEP11-4. Thereafter, the value of the flag f/sld/stb is set to "0" in STEP11-5, after which control returns to the main routine shown in FIG. 10.

If Pstb≦ε in STEP11-2, then the sliding mode controller 27 decides whether the present value σ(k+d) bar of the switching function σ bar falls within a predetermined range or not in STEP11-3.

If the present value σ(k+d) bar of the switching function σ bar does not fall within the predetermined range, then since the present value σ(k+d) bar is spaced widely apart from "0", the SLD controlled state is considered to be unstable. Therefore, if the present value σ(k+d) bar of the switching function σ bar does not fall within the predetermined range in STEP11-3, then the SLD controlled state is judged as being unstable, and the processing of STEP11-4 and STEP11-5 is executed to start the timer counter tm and set the value of the flag f/sld/stb to "0".

In the present embodiment, since the value of the switching function σ bar is limited within the allowable range in STEP10, the decision processing in STEP11-3 may be dispensed with.

If the present value σ(k+d) bar of the switching function σ bar falls within the predetermined range in STEP11-3, then the sliding mode controller 27 counts down the timer counter tm for a predetermined time Δtm in STEP11-6. The sliding mode controller 27 then decides whether or not the value of the timer counter tm is equal to or smaller than "0", i.e., whether a time corresponding to the initial value $T_M$ has elapsed from the start of the timer counter tm or not, in STEP11-7.

If tm>0, i.e., if the timer counter tm is still measuring time and its set time has not yet elapsed, then since no substantial time has elapsed after the SLD controlled state is judged as unstable in STEP11-2 or STEP11-3, the SLD controlled state tends to become unstable. Therefore, if tm>0 in STEP11-7, then the value of the flag f/sld/stb is set to "0" in STEP11-5.

If tm≦0 in STEP11-7, i.e., if the set time of the timer counter tm has elapsed, then the SLD controlled stage is judged as being stable, and the value of the flag f/sld/stb is set to "1" in STEP11-8.

According to the above processing, the stability of the SLD controlled state is determined. If the SLD controlled state is judged as being unstable, then the value of the flag f/sld/stb is set to "0", and if the SLD controlled state is judged as being stable, then the value of the flag f/sld/stb is set to "1".

The above process of determining the stability of the SLD controlled state is by way of illustrative example only. The stability of the SLD controlled state may be determined by any of various other processes. For example, in each given period longer than the control cycle, the frequency with which the value of the stability determining parameter Pstb in the period is greater than the predetermined value $\epsilon$ is counted. If the frequency is in excess of a predetermined value, then the SLD controlled state is judged as unstable. Otherwise, the SLD controlled state is judged as stable.

Referring back to FIG. 10, after a value of the flag f/sld/stb indicative of the stability of the SLD controlled state has been set, the sliding mode controller 27 determines the value of the flag f/sld/stb in STEP12. If the value of the flag f/sld/stb is "1", i.e., if the SLD controlled state is judged as being stable, then the sliding mode controller 27 limits the SLD manipulating input Usl calculated in STEP10 in STEP13. Specifically, the sliding mode controller 27 determines whether the present value Usl(k) of the SLD manipulating input Usl calculated in STEP10 falls in a predetermined allowable range or not. If the present value Usl exceeds the upper or lower limit of the allowable range, then the sliding mode controller 27 forcibly limits the present value Usl(k) of the SLD manipulating input Usl to the upper or lower limit of the allowable range.

The SLD manipulating input Usl (=the target differential air-fuel ratio kcmd) limited in STEP13 is stored in a memory (not shown) in a time-series fashion, and will be used in the processing operation of the estimator 26.

Then, the sliding mode controller 27 adds the air-fuel ratio reference value FLAF/BASE to the SLD manipulating input Usl limited in STEP13, thus calculating the target air-fuel ratio KCMD in STEP15. The processing in the present control cycle of the exhaust-side control unit 7a is now put to an end.

If f/sld/stb=0 in STEP12, i.e., if the SLD controlled state is judged as unstable, then the sliding mode controller 27 forcibly sets the value of the SLD manipulating input Usl in the present control cycle to a predetermined value (the fixed value or the preceding value of the SLD manipulating input Usl) in STEP14. The sliding mode controller 27 calculates the target air-fuel ratio KCMD by adding the air-fuel ratio reference value FLAF/BASE to the SLD manipulating input Usl in STEP15. The processing in the present control cycle of the exhaust-side control unit 7a is now put to an end.

The target air-fuel ratio KCMD finally determined in STEP15 is stored in a memory (not shown) in a time-series fashion in each control cycle. When the general feedback controller 15 is to use the target air-fuel ratio KCMD determined by the exhaust-side control unit 7a (see STEPf in FIG. 8), the latest one of the time-series data of the target air-fuel ratio KCMD thus stored is selected.

Details of the operation of the apparatus according to the present embodiment have been described above.

The operation of the apparatus will be summarized as follows: The exhaust-side control unit 7a sequentially determines the target air-fuel ratio KCMD which is a target value for the upstream-of-catalyst air-fuel ratio so as to converge (adjust) the output signal VO2/OUT of the $O_2$ sensor 6 downstream of the catalytic converter 3 to the target value VO2/TARGET therefor. The amount of fuel injected into the internal combustion engine 1 is adjusted to converge the output of the LAF sensor 5 to the target air-fuel ratio KCMD, thereby feedback-controlling the upstream-of-catalyst air-fuel ratio at the target air-fuel ratio KCMD, and hence converging the output VO2/OUT of the $O_2$ sensor 6 to the target value VO2/TARGET. The catalytic converter 3 can thus maintain its optimum exhaust gas purifying performance.

In this case, in order to calculate the target air-fuel ratio KCMD according to the adaptive sliding mode control process of the sliding mode controller 27, the exhaust-side control unit 7a uses the estimated differential output VO2 bar determined by the estimator 27, i.e., the estimated differential output VO2 bar which is an estimated value of the differential output VO2 of the $O_2$ sensor 6 after the total set dead time d which is the sum of the set dead time d1 of the exhaust system E and the set dead time d2 of the air-fuel ratio manipulating system (the system comprising the internal combustion engine 1 and the engine-side control unit 7b). The exhaust-side control unit 7a determines the target air-fuel ratio KCMD so as to converge the estimated value of the output VO2/OUT of the $O_2$ sensor 6 after the total set dead time d which is represented by the estimated differential output VO2 bar.

The estimated differential output VO2 bar determined by the estimator 26 is the estimated value of the differential output VO2 of the $O_2$ sensor 6 after the set dead times d1, d2 set by the dead time setting means 29 depending on the estimated exhaust gas volume ABSV determined by the flow rate data generating means 28, i.e., the total set dead time d determined by the set dead times d1, d2 that are substantially equal to the actual dead times of the exhaust system E and the air-fuel ratio manipulating system. The algorithm for calculating the estimated differential output VO2 bar with the estimator 26 is constructed on the basis of the exhaust system model and the air-fuel ratio manipulating system model which have the respective dead time elements of the set dead times d1, d2. The values of the gain coefficients a1, a2, b1 which are parameters of the exhaust system model are sequentially identified to minimize an error between the identified differential output VO2 hat indicative of the differential output VO2 of the $O_2$ sensor 6 on the exhaust system model and the actual differential output VO2, and the identified values a1 hat, a2 hat, b1 hat thereof are used in the process of calculating the estimated differential output VO2 bar with the estimator 26. Since the set dead time d1 that is substantially equal to the actual dead time of the exhaust system E is used as the dead time of the exhaust system model, the matching between the exhaust system model and the behavioral characteristics of the actual exhaust system E is increased, allowing the identifier 25 to determine the identified gain coefficients a1 hat, a2 hat, b1 hat which accurately reflect the actual behavior of the exhaust system E.

The estimated differential output VO2 bar determined by the estimator 26 is thus highly accurate, not depending on changes in the actual dead times of the exhaust system E and the air-fuel ratio manipulating system, but representing the output of the O₂ sensor 6 after the total dead time which is the sum of those dead times. Using the estimated differential output VO2 bar, the sliding mode controller 27 can determine the target air-fuel ratio KCMD which is capable of optimally compensating for the effect of the dead times of the exhaust system E and the air-fuel ratio manipulating system, and hence can perform the control process of converging the output VO2/OUT of the O₂ sensor 6 to the target value VO2/TARGET accurately with a highly quick response. As a result, the purifying capability of the catalytic converter 3 can be increased.

The algorithm of the adaptive sliding mode control process of the sliding mode controller 27 for determining the target air-fuel ratio KCMD is constructed on the basis of the exhaust system model having the set dead time d1 which is substantially equal to the actual dead time of the exhaust system E, as with the estimator 26, and uses the identified gain coefficients a1 hat, a2 hat, b1h hat that are sequentially determined by the identifier 25 in order to determine the target air-fuel ratio KCMD. Therefore, the target air-fuel ratio KCMD can be determined to as to accurately reflect the actual behavior of the exhaust system E, and the quick response of the control process of converging the output VO2/OUT of the O₂ sensor 6 to the target value VO2/TARGET can be increased to increase the purifying capability of the catalytic converter 3.

The identifier 25 limits combinations of the identified gain coefficients a1 hat, a2 hat to be determined to values within the identifying coefficient limiting range that is variably established depending on the estimated exhaust gas volume ABSV which determines the set dead times d1, d2, and also sets the value of the identified gain coefficient b1 to a value within the range that is also variably established depending on the estimated exhaust gas volume ABSV. The identifier 25 variably adjusts the value of the weighted parameter $\lambda_1$ in the algorithm of the method of weighted least squares for determining the identified gain coefficients a1 hat, a2 hat, b1 hat, depending on the estimated exhaust gas volume ABSV. Therefore, errors and variations of these identified gain coefficients a1 hat, a2 hat, b1 hat can be suppressed and their reliability is increased, without depending on changes in the actual dead times and the response delay characteristics of the exhaust system E and the air-fuel ratio manipulating system. As a result, the accuracy of the estimated differential output VO2 that is determined by the estimator 26 using the identified gain coefficients a1 hat, a2 hat, b1 hat can stably be maintained, and the target air-fuel ratio KCMD that is capable of converging the output VO2/OUT of the O₂ sensor 6 to the target value VO2/TARGET smoothly with a highly quick response can stably be determined. Thus, the high purifying capability of the catalytic converter 3 can stably be maintained.

A second embodiment of the present invention will be described below. The present embodiment is an embodiment relating to the first aspect of the present invention. The present embodiment basically differs from the previous embodiment as to only the processing operation of the estimator 26, and employs the same reference characters as those of the previous embodiment for its description.

In the previous embodiment, the estimated value of the differential output VO2 of the O₂ sensor 6 after the total set dead time d (=d1+d2) is determined in order to compensate for the effect of both the dead time d1 of the exhaust system E and the dead time d2 of the air-fuel ratio manipulating system (the system comprising the internal combustion engine 1 and the engine-side control unit 7b). However, if the dead time d2 of the air-fuel ratio manipulating system is sufficiently small (it can be regarded as d2≈0) compared with the dead time d1 of the exhaust system E, then an estimated value VO2(k+d1) bar (hereinafter referred to as "second estimated differential output VO2(k+d1) bar") of the differential output VO2 of the O₂ sensor 6 after the dead time d1 of the exhaust system E may be determined, and the target air-fuel ratio KCMD may be determined using the second estimated differential output VO2(k+d1) bar. According to the present embodiment, the second estimated differential output VO2(k+d1) bar is determined, and the output VO2/OUT of the O₂ sensor 6 is converged to the target value VO2/TARGET.

The estimator 26 determines the second estimated differential output VO2(k+d1) bar as follows: Using the equation (1) expressing the exhaust system model of the exhaust system E, the second estimated differential output VO2(k+d1) bar which is an estimated value VO2(k+d1) bar of the differential output VO2 of the O₂ sensor 6 after the dead time d1 of the exhaust system E in each control cycle is expressed by the following equation (42), using the time-series data VO2(k), VO2(k−1) of the differential output VO2 of the O₂ sensor 6 and the time-series data kact(k−j) (j=1, 2, . . . , d1) of the past values of the differential output kact (=KACT−FLAF/BASE) of the LAF sensor 5:

$$\overline{VO2}(k+d1) = \alpha 3 \cdot VO2(k) + \alpha 4 \cdot VO2(k-1) + \sum_{j=1}^{d1} \gamma_j \cdot kact(k-j) \quad (42)$$

where
 $\alpha 3$=the first-row, first-column element of $A^{d1}$,
 $\alpha 4$=the first-row, second-column element of $A^{d1}$,
 $\gamma j$=the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

In the equation (42), "$\alpha 3$", "$\alpha 4$" represent the first-row, first-column element and the first-row, second-column element, respectively, of the power $A_{d1}$ (d1: dead time of the exhaust system E) of the matrix A defined as described above with respect to the equation (13), and "$\gamma j$" (j=1, 2, . . . , d1) represents the first-row elements of the product $A^{j-1} \cdot B$ of the power $A^{j-1}$ (j=1, 2, . . . , d1) of the matrix A and the vector B defined as described above with respect to the equation (13).

The equation (42) is an equation for the estimator 26 to calculate the second estimated differential output VO2(k+d1) bar. The equation (42) is obtained from the equation (13) by setting kcmd(k)=kact(k), d=d1 (the dead time d2 of the air-fuel ratio manipulating system is regarded as "0") in the equation (18) described in the first embodiment. In the present embodiment, therefore, the estimator 26 determines, in each control cycle, calculates the equation (42) to determine the second estimated differential output VO2(k+d1) bar of the O₂ sensor 6, using the time-series data VO2(k), VO2(k−1) of the differential output VO2 of the O₂ sensor 6 and the time-series data kact(k−j) (j=1, 2, . . . , d1) of the past values of the differential output kact of the LAF sensor 5.

The values of the coefficients $\alpha 3$, $\alpha 4$, $\gamma j$ (j=1, 2, . . . , d1) required to calculate the second estimated differential output VO2(k+d1) bar according to the equation (42) are calculated using the identified gain coefficients a1 hat, a2 hat, b1 hat which represent the identified values of the gain coefficients a1, a2, b1. The value of the dead time d1 required in the calculation of the equation (42) employs the set dead time d1 that is sequentially determined in each control cycle by the dead time setting means 29, as with the first embodiment. In this case, the dead time setting means 29 is not required to determine the set dead time d2 of the air-fuel ratio manipulating system.

Other processing details than described above are basically the same as those of the first embodiment. However, the sliding mode controller 27 determines the equivalent control input Ueq, the reaching law input Urch, and the adaptive law input Uadp, which are components of the SLD manipulating input Usl, according to the equations (24), (26), (27) where "d" is replaced with "d1".

With the apparatus for controlling the air-fuel ratio of the internal combustion engine according to the present embodiment, the set dead time d1 of the exhaust system E to be taken into account in converging the output VO2/OUT of the $O_2$ sensor 6 to the target value VO2/TARGET is variably set depending on the estimated exhaust gas volume so as to be substantially equal to the actual dead time. Using the value of the set dead time d1, the processing sequences of the identifier 25, the estimator 26, and the sliding mode controller 27 are carried out in the same manner as with the first embodiment. Therefore, the present embodiment offers the same advantages as those of the first embodiment.

The apparatus for controlling the air-fuel ratio according to the present invention is not limited to the above embodiments, but may be modified as follows:

In the first and second embodiments, the $O_2$ sensor 6 is used as the exhaust gas sensor downstream of the catalytic converter 3. However, any of various other sensors may be employed insofar as they can detect the concentration of a certain component of the exhaust gas downstream of the catalytic converter to be controlled. For example, a CO sensor is employed if the carbon monoxide (CO) in the exhaust gas downstream of the catalytic converter is controlled, an NOx sensor is employed if the nitrogen oxide (NOx) in the exhaust gas downstream of the catalytic converter is controlled, and an HC sensor is employed if the hydrocarbon (HC) in the exhaust gas down-stream of the catalytic converter is controlled.

In the above embodiments, the differential output kact of the LAF sensor 5, the differential output VO2 of the $O_2$ sensor 6, and the target differential air-fuel ratio kcmd are employed in the processing sequences of the identifier 25, the estimator 26, and the sliding mode controller 27. However, the processing sequences of the identifier 25, the estimator 26, and the sliding mode controller 27 may be performed directly using the output KACT of the LAF sensor 5, the output VO2/OUT of the $O_2$ sensor 6, and the target air-fuel ratio KCMD.

In the above embodiments, the manipulated variable generated by the exhaust-side control unit 7a is the target air-fuel ratio KCMD (the target input for the exhaust system E), and the air-fuel ratio of the air-fuel mixture to be combusted by the internal combustion engine 1 is manipulated according to the target air-fuel ratio KCMD. However, a corrected amount of the amount of fuel supplied to the internal combustion engine 1 may be determined by the exhaust-side control unit 7a, and the amount of fuel supplied to the internal combustion engine 1 may be adjusted in a feed-forward fashion from the target air-fuel ratio KCMD to manipulate the air-fuel ratio.

In the above embodiments, the sliding mode controller 27 employs an adaptive sliding mode control process which incorporates an adaptive law (adaptive algorithm) taking into account the effect of disturbances. However, the sliding mode controller 27 may employ a normal sliding mode control process which is free from such an adaptive law. Furthermore, the sliding mode controller 27 may be replaced with another type of adaptive controller, e.g., a back-stepping controller or the like.

Industrial Applicability

As described above, the present invention is useful for controlling the air-fuel ratio of an internal combustion engine mounted on an automobile or the like to increase the exhaust gas purifying capability of a catalytic converter.

What is claimed is:

1. An apparatus for controlling the air-fuel ratio of an internal combustion engine having an exhaust gas sensor disposed downstream of a catalytic converter disposed in an exhaust passage of the internal combustion engine, for detecting the concentration of a particular component in an exhaust gas which has passed through the catalytic converter, estimating means for sequentially generating data representative of an estimated value of an output of said exhaust gas sensor after a set dead time, using the set dead time which is set as a dead time of an exhaust system ranging from a position upstream of said catalytic converter to said exhaust gas sensor and including said catalytic converter, manipulated variable generating means for generating a manipulated variable to determine an air-fuel ratio of the exhaust gas which enters said catalytic converter to converge the output of said exhaust gas sensor to a predetermined target value, using the data generated by said estimating means, and air-fuel ratio manipulating means for manipulating the air-fuel ratio of an air-fuel mixture to be combusted by the internal combustion engine depending on the manipulated variable, comprising:

flow rate data generating means for sequentially generating data representative of a flow rate of the exhaust gas supplied to the catalytic converter, and dead time setting means for variably setting a value of said set dead time depending on the value of the data generated by said flow rate data generating means;

wherein a predetermined model of said exhaust system is established for expressing a behavior of the exhaust system which is regarded as a system for generating the output of said exhaust gas sensor via a dead time element and a response delay element of said set dead time from the air-fuel ratio of the exhaust gas which enters said catalytic converter, further comprising identifying means for sequentially identifying the value of a predetermined parameter of said model using the value of the set dead time set by said dead time setting means;

wherein said estimating means generates the data representative of the estimated value of the output of said exhaust gas sensor using the identified value of said parameter determined by said identifying means, according to a predetermined estimating algorithm which is constructed based on the model of said exhaust system; and wherein said identifying means determines the identified value of the parameter of the model of said exhaust system for limiting the identified value to a value within a predetermined range depending on the value of the data generated by said flow rate data generating means.

2. An apparatus for controlling the air-fuel ratio of an internal combustion engine according to claim 1, wherein said identifying means comprises means for identifying the value of said parameter according to an algorithm for minimizing an error between the output of said exhaust gas sensor in the model of said exhaust system and an actual output of said exhaust gas sensor, further comprising means for variably setting the value of a weighted parameter of said algorithm depending on the value of the data generated by said flow rate data generating means.

3. An apparatus for controlling the air-fuel ratio of an internal combustion engine according to claim 1, wherein said manipulated variable generating means generates said manipulated variable using the identified value, determined by said identifying means, of the parameter of said model of said exhaust system.

4. A recording medium readable by a computer and storing an air-fuel ratio control program for enabling said computer to perform a process of sequentially generating data representative of an estimated value of an output of an exhaust gas sensor disposed downstream of a catalytic converter disposed in an exhaust passage of the internal combustion engine, for detecting the concentration of a particular component in an exhaust gas which has passed through the catalytic converter, after a set dead time which is set as a dead time of an exhaust system ranging from a position upstream of said catalytic converter to said exhaust gas sensor and including said catalytic converter, a process of generating a manipulated variable to determine an air-fuel ratio of the exhaust gas which enters said catalytic converter to converge the output of said exhaust gas sensor to a predetermined target value, using the data representative of the estimated value, and a process of manipulating the air-fuel ratio of an air-fuel mixture to be combusted by the internal combustion engine depending on the manipulated variable, said air-fuel ratio control program comprising:

a program of enabling the computer to perform a process of sequentially generate data representative of a flow rate of the exhaust gas supplied to the catalytic converter, and variably setting a value of said set dead time depending on the value of the data representative of the flow rate of the exhaust gas wherein a predetermined model of said exhaust system is established for expressing a behavior of the exhaust system which is regarded as a system for generating the output of said exhaust gas sensor via a dead time element and a response delay element of said set dead time from the air-fuel ratio of the exhaust gas which interes said catalytic converter, said air-fuel ratio control program includes a program for enabling the computer to perform a process of sequentially identifying the value of a predetermined parameter of said model using the value of the set dead time set by said dead time setting means;

wherein the program of said air-fuel ratio control program for generating the data representative of the estimated value of the output of the exhaust gas sensor enables the computer to generate the data representative of the estimated value of the output of said exhaust gas sensor using the identified value of said parameter, according to a predetermined estimating algorithm which is constructed based on the model of said exhaust system; and wherein the program of said air-fuel ratio control program for identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

5. A recording medium storing an air-fuel ratio control program for an internal combustion engine according to claim 4, wherein the program of said air-fuel ratio control program for identifying the parameter of the model of said exhaust system identifies the value of said parameter according to an algorithm for minimizing an error between the output of said exhaust gas sensor in the model of said exhaust system and an actual output of said exhaust gas sensor, and variably sets the value of a weighted parameter of said algorithm depending on the value of the data representing the flow rate of said exhaust gas.

6. A recording medium storing an air-fuel ratio control program for an internal combustion engine according to claim 4, wherein the program of said air-fuel ratio control program for generating said manipulated variable is constructed of an algorithm for using the identified value of the parameter of the model of said exhaust system in order to generate the manipulated variable.

7. A method of controlling the air-fuel ratio of an internal combustion engine, comprising the steps of sequentially generating data representative of an estimated value of an output of an exhaust gas sensor disposed downstream of a catalytic converter disposed in an exhaust passage of the internal combustion engine, for detecting the concentration of a particular component in an exhaust gas which has passed through the catalytic converter, after a set dead time which is set as a dead time of an exhaust system ranging from a position upstream of said catalytic converter to said exhaust gas sensor and including said catalytic converter, and generating a manipulated variable to determine an air-fuel ratio of the exhaust gas which enters said catalytic converter to converge the output of said exhaust gas sensor to a predetermined target value, using the data representative of the estimated value, wherein the air-fuel ratio of an air-fuel mixture to be combusted by the internal combustion engine is manipulated depending on the manipulated variable, comprising the steps of:

sequentially generating data representative of a flow rate of the exhaust gas supplied to the catalytic converter, and variably setting a value of said set dead time depending on the value of the data representative of the flow rate of the exhaust gas;

wherein a predetermined model of said exhaust system is established for expressing a behavior of the exhaust system which is regarded as a system for generating the output of said exhaust gas sensor via a dead time element and a response delay element of said set dead time from the air-fuel ratio of the exhaust gas which enters said catalytic converter, further comprising the step of sequentially identifying the value of a predetermined parameter of said model using the value of said set dead time;

wherein said step of generating data representative of the estimated value of the output of the exhaust gas sensor generates the data representative of the estimated value of the output of said exhaust gas sensor using the identified value of said parameter, according to a predetermined estimating algorithm which is constructed based on the model of said exhaust system; and wherein said step of identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

8. A method of controlling the air-fuel ratio of an internal combustion engine according to claim 7, wherein said step of identifying the parameter of the model of said exhaust system identifies the value of said parameter according to an algorithm for minimizing an error between the output of said exhaust gas sensor in the model of said exhaust system and an actual output of said exhaust gas sensor, and variably sets the value of a weighted parameter of said algorithm depending on the value of the data representative of the flow rate of said exhaust gas.

9. A method of controlling the air-fuel ratio of an internal combustion engine according to claim 7, wherein said step of generating said manipulated variable uses the identified value of the parameter of the model of said exhaust system determined by said identifying means in order to generate said manipulated variable.

10. An apparatus for controlling the air-fuel ratio of an internal combustion engine having an exhaust gas sensor disposed downstream of a catalytic converter disposed in an exhaust passage of the internal combustion engine, for detecting the concentration of a particular component in an exhaust gas which has passed through the catalytic converter, manipulated variable generating means for sequentially generating a manipulated variable to determine an air-fuel ratio of the exhaust gas which enters said catalytic converter to converge an output of said exhaust gas sensor to a predetermined target value, air-fuel ratio manipulating means for manipulating the air-fuel ratio of an air-fuel mixture to be combusted by the internal combustion engine depending on the manipulated variable, and estimating means for sequentially generating data representative of an estimated value of the output of said exhaust gas sensor after a total set dead time which is the sum of a first set dead time and a second set dead time, said first set dead time being set as a dead time of an exhaust system ranging from a position upstream of said catalytic converter to said exhaust gas sensor and including said catalytic converter, said second set dead time being set as a dead time of an air-fuel ratio manipulating system comprising said air-fuel ratio manipulating means and said internal combustion engine, wherein said manipulated variable generating means generates said manipulated variable using the data generated by said estimating means, comprising:

flow rate data generating means for sequentially generating data representative of a flow rate of the exhaust gas supplied to the catalytic converter, and dead time setting means for variably setting values of said first set dead time and said second set dead time depending on the value of the data generated by said flow rate data generating means;

wherein a predetermined model of said exhaust system is established for expressing a behavior of the exhaust system which is regarded as a system for generating the output of said exhaust gas sensor via a dead time element and a response delay element of said first set dead time from the air-fuel ratio of the exhaust gas which enters said catalytic converter, further comprising identifying means for sequentially identifying the value of a predetermined parameter of said model using the value of the first set dead time set by said dead time setting means;

wherein said estimating means generates the estimated value of the output of said exhaust gas sensor using the identified value of said parameter determined by said identifying means, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time; and wherein said identifying means determines the identified value of the parameter of the model of said exhaust system by limiting the identified value to a value within a predetermined range depending on the value of the data generated by said flow rate data generating means.

11. An apparatus for controlling the air-fuel ratio of an internal combustion engine according to claim 10, wherein said identifying means comprises means for identifying the value of said parameter according to an algorithm for minimizing an error between the output of said exhaust gas sensor in the model of said exhaust system and an actual output of said exhaust gas sensor, further comprising means for variably setting the value of a weighted parameter of said algorithm depending on the value of the data generated by said flow rate data generating means.

12. An apparatus for controlling the air-fuel ratio of an internal combustion engine according to claim 10, wherein said manipulated variable generating means generates said manipulated variable using the identified value, determined by said identifying means, of the parameter of said model of said exhaust system.

13. A recording medium readable by a computer and storing an air-fuel ratio control program for enabling said computer to perform a process of sequentially generating a manipulated variable to determine an air-fuel ratio of the exhaust gas which enters said catalytic converter to converge an output of an exhaust gas sensor, which is disposed downstream of a catalytic converter disposed in an exhaust passage of the internal combustion engine, for detecting the concentration of a particular component in an exhaust gas which has passed through the catalytic converter, to a predetermined target value, a process of manipulating the air-fuel ratio of an air-fuel mixture to be combusted by the internal combustion engine depending on the manipulated variable, and a process of sequentially generating data representative of an estimated value of the output of said exhaust gas sensor after a total set dead time which is the sum of a first set dead time and a second set dead time, said first set dead time being set as a dead time of an exhaust system ranging from a position upstream of said catalytic converter to said exhaust gas sensor and including said catalytic converter, said second set dead time being set as a dead time of an air-fuel ratio manipulating system comprising said air-fuel ratio manipulating means and said internal combustion engine, wherein the program of said air-fuel ratio control program for generating the manipulated variable is constructed of an algorithm for generating the manipulated variable using the data representative of the estimated value of the output of the exhaust gas sensor, said air-fuel ratio control program comprising:

a program for enabling the computer to perform a process of sequentially generating data representative of a flow rate of the exhaust gas supplied to the catalytic converter, and variably setting values of said first set dead time and said second set dead time depending on the value of the data representative of the flow rate of the exhaust gas;

wherein a predetermined model of said exhaust system is established for expressing a behavior of the exhaust system which is regarded as a system for generating the output of said exhaust gas sensor via a dead time element and a response delay element of said first set dead time from the air-fuel ratio of the exhaust gas which enters said catalytic converter, said air-fuel ratio control program includes a program for enabling the computer to perform a process of sequentially identifying the value of a predetermined parameter of said model using the value of said first set dead time;

wherein the program of said air-fuel ratio control program for generating the data representative of the estimated value of the output of said exhaust gas sensor enables the computer to generate the estimated value of the output of said exhaust gas sensor using the identified value of said parameter of the model of said exhaust system, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time; and wherein the program of said air-fuel ratio control program for identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

14. A recording medium storing an air-fuel ratio control program for an internal combustion engine according to claim 13, wherein the program of said air-fuel ratio control program for identifying the parameter of the model of said exhaust system identifies the value of said parameter according to an algorithm for minimizing an error between the output of said exhaust gas sensor in the model of said exhaust system and an actual output of said exhaust gas sensor, and variably sets the value of a weighted parameter of said algorithm depending on the value of the data representing the flow rate of said exhaust gas.

15. A recording medium storing an air-fuel ratio control program for an internal combustion engine according to claim 13, wherein the program of said air-fuel ratio control program for generating said manipulated variable is constructed of an algorithm for using the identified value of the parameter of the model of said exhaust system in order to generate the manipulated variable.

16. A method of controlling the air-fuel ratio of an internal combustion engine, comprising the steps of sequentially generating a manipulated variable to determine an air-fuel ratio of the exhaust gas which enters said catalytic converter to converge an output of an exhaust gas sensor, which is disposed downstream of a catalytic converter disposed in an exhaust passage of the internal combustion engine, for detecting the concentration of a particular component in an exhaust gas which has passed through the catalytic converter, to a predetermined target value, manipulating the air-fuel ratio of an air-fuel mixture to be combusted by the internal combustion engine depending on the manipulated variable, and sequentially generating data representative of an estimated value of the output of said exhaust gas sensor after a total set dead time which is the sum of a first set dead time and a second set dead time, said first set dead time being set as a dead time of an exhaust system ranging from a position upstream of said catalytic converter to said exhaust gas sensor and including said catalytic converter, said second set dead time being set as a dead time of an air-fuel ratio manipulating system comprising said air-fuel ratio manipulating means and said internal combustion engine, wherein said step of generating said manipulated variable uses the data representative of the estimated value of the output of the exhaust gas sensor in order to generate said manipulated variable, comprising the steps of:

sequentially generating data representative of a flow rate of the exhaust gas supplied to the catalytic converter, and variably setting values of said first set dead time and said second set dead time depending on the value of the data representative of the flow rate of the exhaust gas;

wherein there is established a predetermined model of said exhaust system for expressing a behavior of the exhaust system which is regarded as a system for generating the output of said exhaust gas sensor via a dead time element and a response delay element of said first set dead time from the air-fuel ratio of the exhaust gas which enters said catalytic converter, further comprising the step of sequentially identifying the value of a predetermined parameter of said model using the value of said first set dead time; and wherein said step of generating the data representative of the estimated value of the output of said exhaust gas sensor generates the estimated value of the output of said exhaust gas sensor using the identified value of said parameter of the model of said exhaust system, according to a predetermined estimating algorithm which is constructed based on the model of said exhaust system and a predetermined model of said air-fuel ratio manipulating means for expressing a behavior of the air-fuel ratio manipulating means which is regarded as a system for generating the air-fuel ratio detected by said air-fuel ratio sensor from said manipulated variable via a dead time element of said second set dead time, and said step of identifying the parameter of the model of said exhaust system determines the identified value of the parameter of the model of said exhaust system by limiting the identified value to a value within a predetermined range depending on the value of the data representative of the flow rate of the exhaust gas supplied to said catalytic converter.

17. A method of controlling the air-fuel ratio of an internal combustion engine according to claim 16, wherein said step of identifying the parameter of the model of said exhaust system identifies the value of said parameter according to an algorithm for minimizing an error between the output of said exhaust gas sensor in the model of said exhaust system and an actual output of said exhaust gas sensor, and variably sets the value of a weighted parameter of said algorithm depending on the value of the data representative of the flow rate of said exhaust gas.

18. A method of controlling the air-fuel ratio of an internal combustion engine according to claim 16, wherein said step of generating said manipulated variable uses the identified value of the parameter of the model of said exhaust system determined by said identifying means in order to generate said manipulated variable.

* * * * *